US012592236B2

(12) United States Patent
Su et al.

(10) Patent No.: US 12,592,236 B2
(45) Date of Patent: Mar. 31, 2026

(54) VOICE INTERACTION METHOD AND APPARATUS

(71) Applicant: SHENZHEN YINWANG INTELLIGENT TECHNOLOGIES CO., LTD., Shenzhen (CN)

(72) Inventors: Qi Su, Shanghai (CN); Weiran Nie, Shanghai (CN); Jingshen Pan, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 212 days.

(21) Appl. No.: 18/488,647

(22) Filed: Oct. 17, 2023

(65) Prior Publication Data

US 2024/0046931 A1    Feb. 8, 2024

Related U.S. Application Data

(63) Continuation of application No. PCT/CN2021/087958, filed on Apr. 17, 2021.

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC ... G10L 15/22; G10L 2015/223; G10L 15/16; G10L 15/1822
See application file for complete search history.

(56) References Cited

U.S. PATENT DOCUMENTS

| 8,996,372 | B1 | 3/2015 | Secker-Walker et al. |
| 10,942,702 | B2 * | 3/2021 | Piersol ..................... G10L 15/22 |
| 11,016,968 | B1 * | 5/2021 | Hoover ................... G10L 15/22 |
| 11,587,559 | B2 * | 2/2023 | Newendorp ............ G06F 13/14 |

(Continued)

FOREIGN PATENT DOCUMENTS

| CN | 102708865 A | 10/2012 |
| CN | 106992009 A | 7/2017 |

(Continued)

OTHER PUBLICATIONS

Extended European Search Report in European Appln No. 21936495. 7, dated Apr. 8, 2024, 11 pages.

(Continued)

*Primary Examiner* — Abul K Azad
(74) *Attorney, Agent, or Firm* — Fish & Richardson P.C.

(57) ABSTRACT

This application provides voice interaction methods and apparatuses. In an implementation, A first apparatus obtains, by using a voice sensor, first voice information including a voice instruction of a user. The first apparatus determines, based on the first voice information, to perform a target operation indicated by the first voice information. The first apparatus may also send the first voice information to a second apparatus. The first apparatus may determine, based on a first preset condition, to perform a first operation or a second operation, wherein the first operation is determined by the first apparatus based on the first semantic recognition result, and wherein the second operation is indicated by a second apparatus.

20 Claims, 10 Drawing Sheets

(56) References Cited

U.S. PATENT DOCUMENTS

| | | | | |
|---|---|---|---|---|
| 11,765,209 B2 * | 9/2023 | Hansen | .................. | H04L 69/28 |
| | | | | 709/204 |
| 2017/0357637 A1 * | 12/2017 | Nell | ........................ | G06F 40/35 |
| 2018/0061401 A1 | 3/2018 | Sarikaya et al. | | |
| 2021/0035572 A1 | 2/2021 | D'Amato et al. | | |

FOREIGN PATENT DOCUMENTS

| | | | | | |
|---|---|---|---|---|---|
| CN | 107564525 A | | 1/2018 | | |
| CN | 109087643 A | * | 12/2018 | ............ | G10L 15/22 |
| CN | 109410927 A | | 3/2019 | | |
| CN | 109859761 A | | 6/2019 | | |
| CN | 110444206 A | | 11/2019 | | |
| CN | 111627435 A | | 9/2020 | | |
| CN | 111696534 A | | 9/2020 | | |
| CN | 112069830 A | | 12/2020 | | |
| CN | 112599128 A | | 4/2021 | | |

OTHER PUBLICATIONS

International Search Report and Written Opinion in International Appln. No. PCT/CN2021/087958, mailed on Jan. 21, 2022, 18 pages (with English translation).

* cited by examiner

100

600

Figure 7:
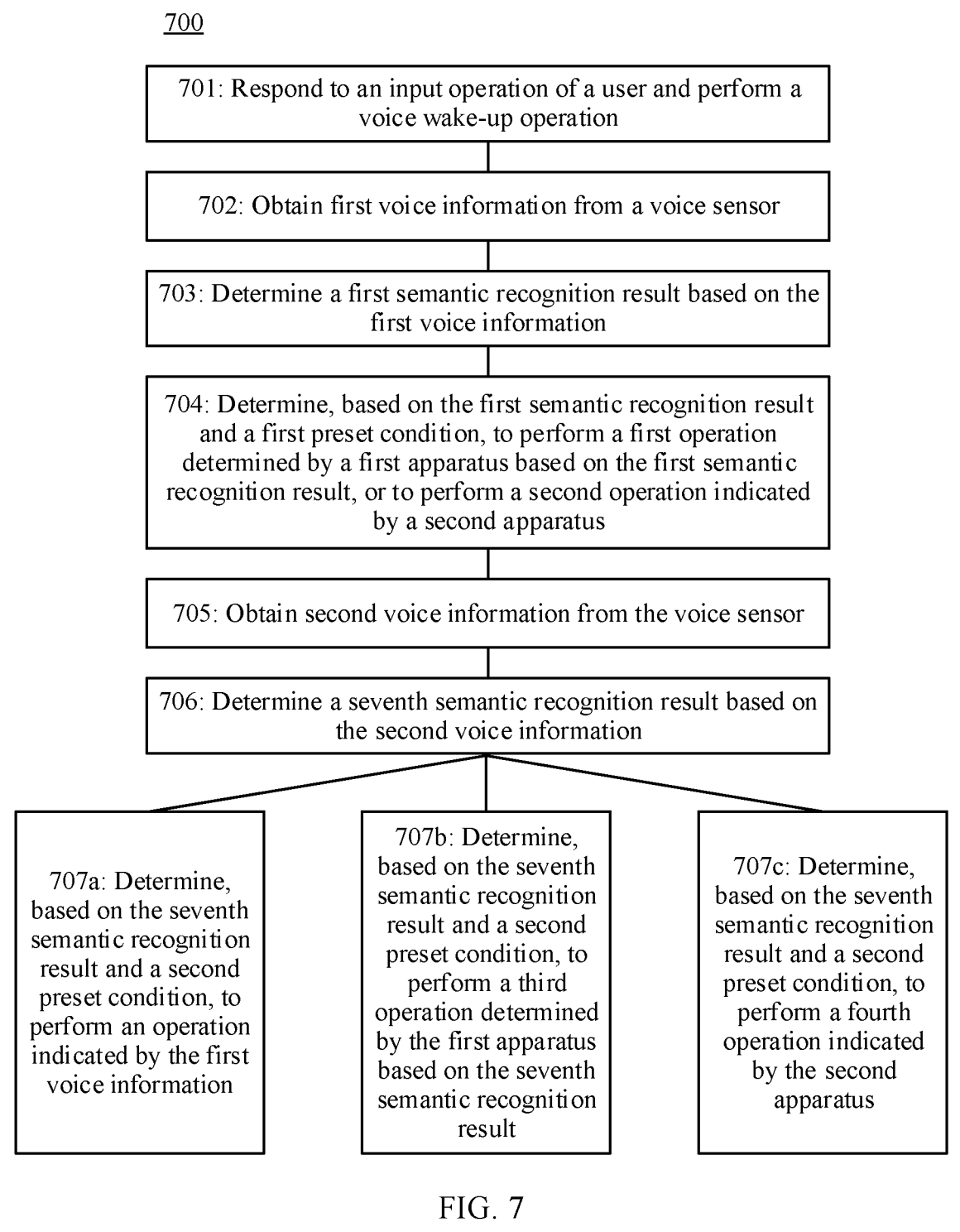

700

701: Respond to an input operation of a user and perform a voice wake-up operation 702: Obtain first voice information from a voice sensor 703: Determine a first semantic recognition result based on the first voice information 704: Determine, based on the first semantic recognition result and a first preset condition, to perform a first operation determined by a first apparatus based on the first semantic recognition result, or to perform a second operation indicated by a second apparatus 705: Obtain second voice information from the voice sensor 706: Determine a seventh semantic recognition result based on the second voice information 707a: Determine, based on the seventh semantic recognition result and a second preset condition, to perform an operation indicated by the first voice information 707b: Determine, based on the seventh semantic recognition result and a second preset condition, to perform a third operation determined by the first apparatus based on the seventh semantic recognition result 707c: Determine, based on the seventh semantic recognition result and a second preset condition, to perform a fourth operation indicated by the second apparatus

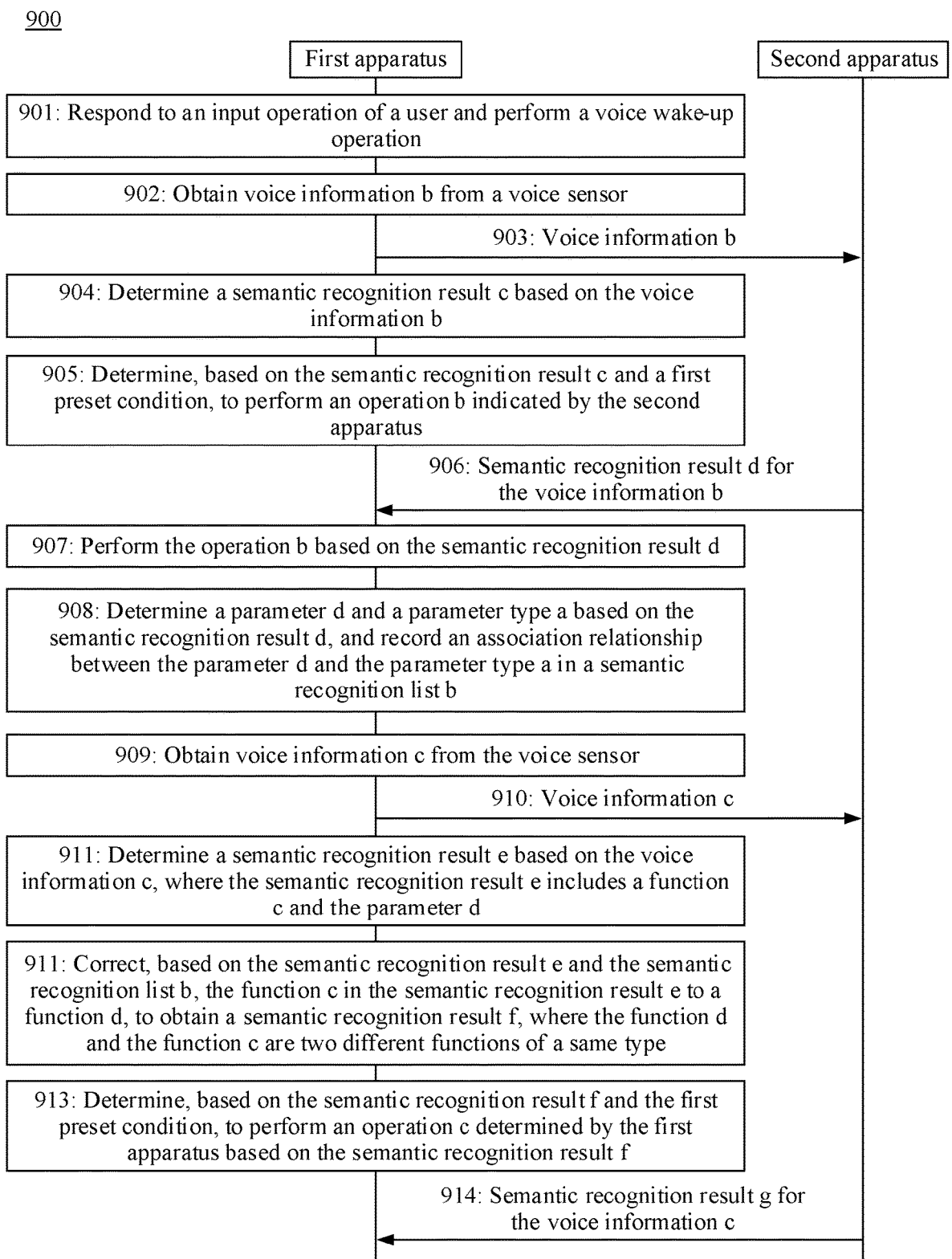

First apparatus                                    Second apparatus

901: Respond to an input operation of a user and perform a voice wake-up operation 902: Obtain voice information b from a voice sensor 903: Voice information b 904: Determine a semantic recognition result c based on the voice information b 905: Determine, based on the semantic recognition result c and a first preset condition, to perform an operation b indicated by the second apparatus 906: Semantic recognition result d for the voice information b 907: Perform the operation b based on the semantic recognition result d 908: Determine a parameter d and a parameter type a based on the semantic recognition result d, and record an association relationship between the parameter d and the parameter type a in a semantic recognition list b 909: Obtain voice information c from the voice sensor 910: Voice information c 911: Determine a semantic recognition result e based on the voice information c, where the semantic recognition result e includes a function c and the parameter d 911: Correct, based on the semantic recognition result e and the semantic recognition list b, the function c in the semantic recognition result e to a function d, to obtain a semantic recognition result f, where the function d and the function c are two different functions of a same type 913: Determine, based on the semantic recognition result f and the first preset condition, to perform an operation c determined by the first apparatus based on the semantic recognition result f 914: Semantic recognition result g for the voice information c

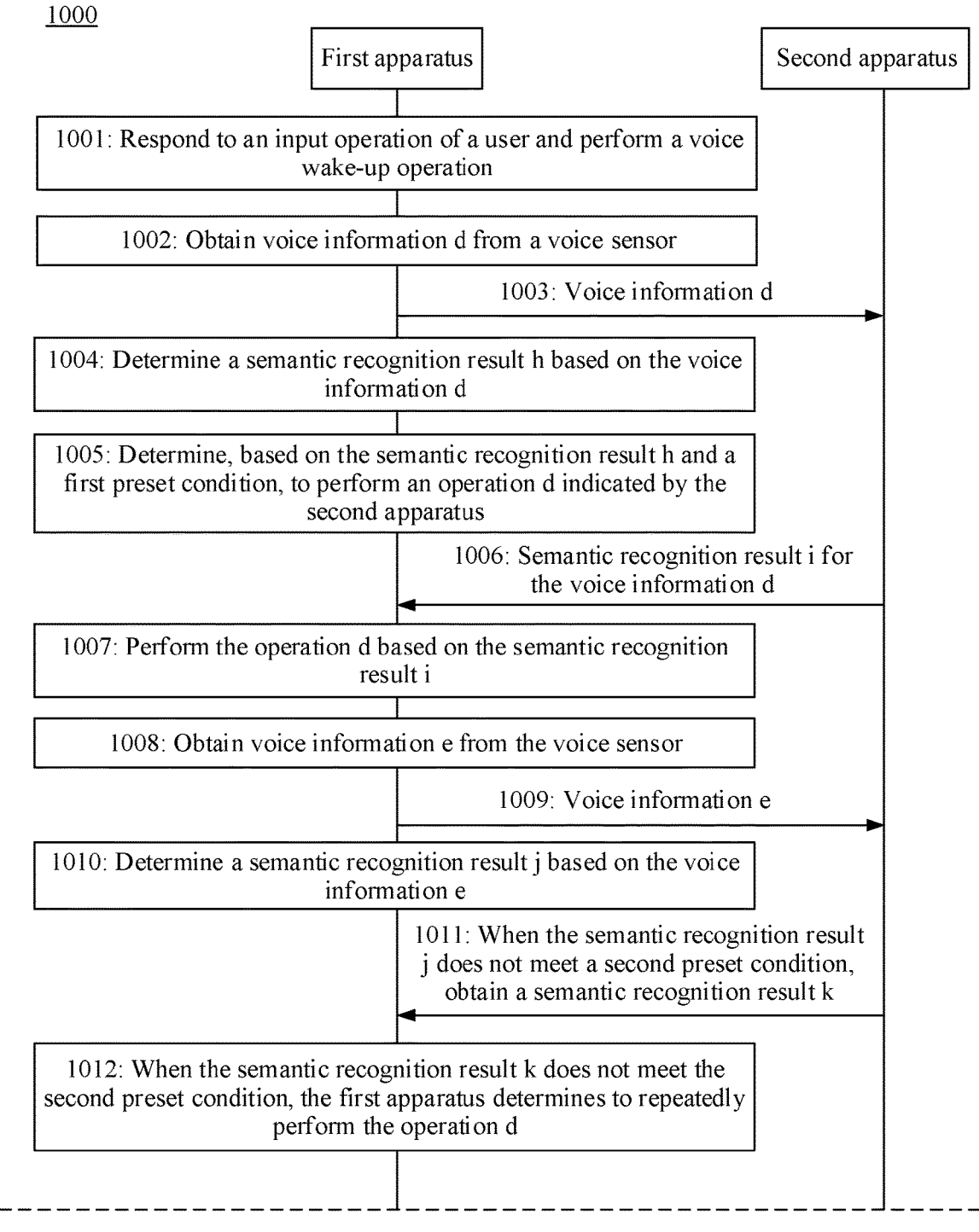

First apparatus

Second apparatus

1001: Respond to an input operation of a user and perform a voice wake-up operation 1002: Obtain voice information d from a voice sensor 1003: Voice information d 1004: Determine a semantic recognition result h based on the voice information d 1005: Determine, based on the semantic recognition result h and a first preset condition, to perform an operation d indicated by the second apparatus 1006: Semantic recognition result i for the voice information d 1007: Perform the operation d based on the semantic recognition result i 1008: Obtain voice information e from the voice sensor 1009: Voice information e 1010: Determine a semantic recognition result j based on the voice information e 1011: When the semantic recognition result j does not meet a second preset condition, obtain a semantic recognition result k 1012: When the semantic recognition result k does not meet the second preset condition, the first apparatus determines to repeatedly perform the operation d

FIG. 10A

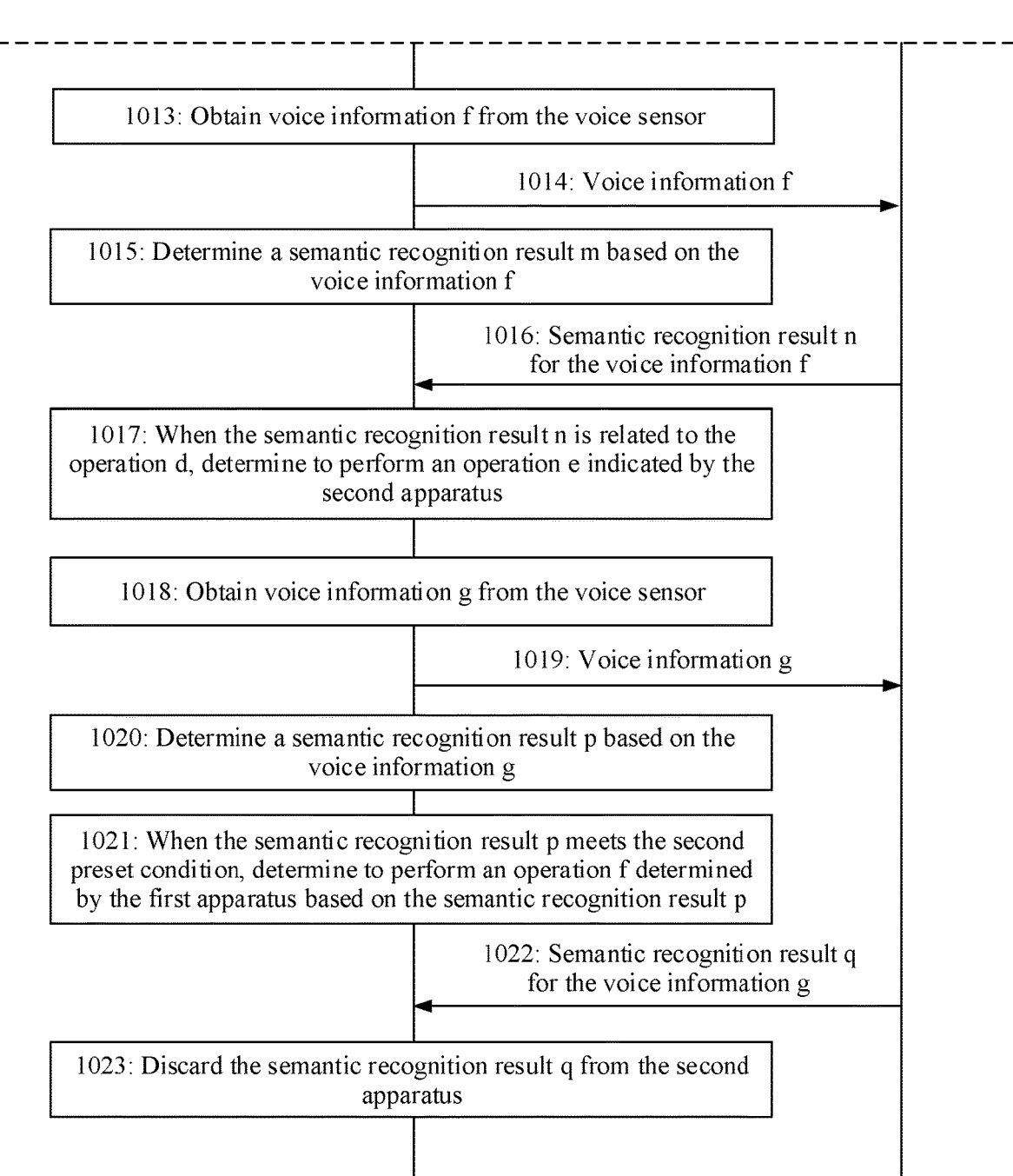

1000

1013: Obtain voice information f from the voice sensor

1014: Voice information f

1015: Determine a semantic recognition result m based on the voice information f 1016: Semantic recognition result n for the voice information f 1017: When the semantic recognition result n is related to the operation d, determine to perform an operation e indicated by the second apparatus 1018: Obtain voice information g from the voice sensor 1019: Voice information g 1020: Determine a semantic recognition result p based on the voice information g 1021: When the semantic recognition result p meets the second preset condition, determine to perform an operation f determined by the first apparatus based on the semantic recognition result p 1022: Semantic recognition result q for the voice information g 1023: Discard the semantic recognition result q from the second apparatus

FIG. 10B

VOICE INTERACTION METHOD AND APPARATUS

CROSS-REFERENCE TO RELATED APPLICATIONS

This application is a continuation of International Application No. PCT/CN2021/087958, filed on Apr. 17, 2021, the disclosure of which is hereby incorporated by reference in its entirety.

TECHNICAL FIELD

This application relates to the field of electronic devices, and more specifically, to a voice interaction method and apparatus.

BACKGROUND

A user and an electronic device may perform voice interaction. The user may speak a voice instruction to the electronic device. The electronic device may obtain the voice instruction, and perform an operation indicated by the voice instruction.

The electronic device can recognize the voice instruction. A capability of recognizing the voice instruction by the electronic device may be relatively limited. If the voice instruction is recognized by using only the electronic device, a recognition result may be inaccurate, and consequently the electronic device may not be able to appropriately respond to the user.

The electronic device may further upload voice information related to the voice instruction to a cloud. The cloud may recognize the voice information, and feed back a recognition result to the electronic device. A voice recognition capability, a natural language understanding capability, and the like of the cloud may be stronger. However, interaction between the electronic device and the cloud may depend on a current network status of the electronic device. In other words, interaction between the electronic device and the cloud may cause a long delay. If the voice instruction is recognized by using the cloud, the electronic device may not be able to obtain the recognition result from the cloud in time, and consequently cannot quickly respond to the user.

SUMMARY

This application provides a voice interaction method and apparatus, to balance accuracy and efficiency of voice recognition, and further help appropriately and quickly respond to a user.

According to a first aspect, a voice interaction method is provided, applied to a first apparatus. The method includes:

obtaining first voice information from a voice sensor;

determining a first semantic recognition result based on the first voice information; and determining, based on the first semantic recognition result and a first preset condition, to perform a first operation determined by the first apparatus based on the first semantic recognition result, or to perform a second operation indicated by a second apparatus.

In a possible example, the second apparatus may send one or more of a semantic recognition result and the operation information to the first apparatus, to indicate the second operation to the first apparatus.

In a voice interaction scenario that the first apparatus is relatively good at, the first apparatus may determine an operation corresponding to a voice instruction of a user, without using information provided by the second apparatus. This helps reduce a response delay of executing the voice instruction of the user by the first apparatus, and improves response efficiency. In a voice interaction scenario that the first apparatus is relatively not good at, the first apparatus may determine, based on information provided by the second apparatus, an operation corresponding to a voice instruction of the user. This helps improve accuracy of responding to the voice instruction of the user by the first apparatus. According to the foregoing solution, a manner of processing a voice instruction can be flexibly selected based on the voice interaction scenario that the first apparatus is good at, to balance a response delay and response accuracy.

Optionally, the method further includes: The first apparatus sends the first voice information to the second apparatus.

The first apparatus sends the first voice information to the second apparatus, and the second apparatus may send a feedback on the first voice information to the first apparatus. If the first apparatus performs the first operation, the first apparatus may adjust a semantic recognition model, a voice control model, and the like of the first apparatus based on the feedback of the second apparatus, to help improve accuracy of outputting a semantic recognition result by the first apparatus, and optimize applicability of an operation of responding to the voice instruction of the user, or ignore the feedback of the second apparatus, for example, ignore the feedback of the second apparatus when a delay of the feedback of the second apparatus is higher than a delay of a voice recognition result of the first apparatus. If the first apparatus performs the second operation, the first apparatus may also obtain the feedback on the first voice information from the second apparatus more quickly. Therefore, this helps shorten duration within which the first apparatus responds to a user instruction.

With reference to the first aspect, in some implementations of the first aspect, the determining, based on the first semantic recognition result and a first preset condition, to perform a first operation determined by the first apparatus based on the first semantic recognition result includes:

when the first semantic recognition result meets the first preset condition, determining to perform the first operation.

Optionally, when the first semantic recognition result does not meet the first preset condition, it is determined to perform the second operation indicated by the second apparatus.

The first preset condition helps the first apparatus determine whether the first apparatus can relatively accurately recognize the current voice information, and further helps balance accuracy and efficiency of voice recognition.

With reference to the first aspect, in some implementations of the first aspect, a plurality of functions are preset on the first apparatus. That the first semantic recognition result meets the first preset condition includes:

the first semantic recognition result indicates a first function, and the first function belongs to the plurality of functions.

Optionally, a plurality of functions are preset on the first apparatus. That the first semantic recognition result does not meet the first preset condition includes: The first semantic recognition result indicates a first function, and the first function does not belong to the plurality of functions.

Optionally, the plurality of functions include one or more of the following functions: a vehicle control function, a navigation function, an audio function, and a video function.

For example, the plurality of functions preset on the first apparatus may include a plurality of functions supported by the first apparatus. The first apparatus may have a stronger semantic recognition capability for the plurality of functions preset on the first apparatus. The first apparatus may have a lower semantic recognition capability for another function that is not preset on the first apparatus. The first apparatus may determine, based on the plurality of functions preset on the first apparatus and the first function, whether the first apparatus can relatively accurately recognize the current voice information, to help balance accuracy and efficiency of voice recognition.

With reference to the first aspect, in some implementations of the first aspect, a plurality of intentions are preset on the first apparatus. That the first semantic recognition result meets the first preset condition includes:

the first semantic recognition result indicates a first intention, and the first intention belongs to the plurality of intentions.

Optionally, the method further includes: A plurality of intentions are preset on the first apparatus. That the first semantic recognition result does not meet the first preset condition includes: The first semantic recognition result indicates a first intention, and the first intention does not belong to the plurality of intentions.

Optionally, the plurality of intentions include one or more of the following intentions: a hardware starting intention, a path planning intention, an audio playing intention, and a video playing intention.

For example, the plurality of intentions preset on the first apparatus may include a plurality of intentions supported by the first apparatus. The first apparatus may have a stronger semantic recognition capability for the plurality of intentions preset on the first apparatus. The first apparatus may have a lower semantic recognition capability for another intention that is not preset on the first apparatus. The first apparatus may determine, based on the plurality of intentions preset on the first apparatus and the first intention, whether the first apparatus can relatively accurately recognize the current voice information, to help balance accuracy and efficiency of voice recognition.

With reference to the first aspect, in some implementations of the first aspect, a plurality of parameters are preset on the first apparatus. That the first semantic recognition result meets the first preset condition includes:

the first semantic recognition result includes a first parameter, and the first parameter belongs to the plurality of parameters.

Optionally, a plurality of parameters are preset on the first apparatus. That the first semantic recognition result does not meet the first preset condition includes: The first semantic recognition result indicates a first parameter, and the first parameter does not belong to the plurality of parameters.

For example, the plurality of parameters preset on the first apparatus may include a plurality of parameters supported by the first apparatus. The first apparatus may have a stronger semantic recognition capability for the plurality of parameters preset on the first apparatus. The first apparatus may have a lower semantic recognition capability for another parameter that is not preset on the first apparatus. The first apparatus may determine, based on the plurality of parameters preset on the first apparatus and the first parameter, whether the first apparatus can relatively accurately recognize the current voice information, to help balance accuracy and efficiency of voice recognition.

With reference to the first aspect, in some implementations of the first aspect, a plurality of intentions corresponding to the first function are preset on the first apparatus. That the first semantic recognition result meets the first preset condition further includes:

the first semantic recognition result further indicates a first intention, and the first intention belongs to the plurality of intentions.

Optionally, a plurality of intentions corresponding to the first function are preset on the first apparatus. That the first semantic recognition result does not meet the first preset condition further includes: The first semantic recognition result further indicates a first intention, and the first intention does not belong to the plurality of intentions.

The intention corresponding to the first function is usually not unlimited. A correspondence is established between the plurality of functions and a plurality of intentions. This helps the first apparatus relatively more accurately determine whether the first apparatus can relatively accurately recognize the current voice information, and further helps balance accuracy and efficiency of voice recognition.

With reference to the first aspect, in some implementations of the first aspect, a plurality of parameters corresponding to the first function are preset on the first apparatus. That the first semantic recognition result meets the first preset condition further includes:

the first semantic recognition result further indicates a first parameter, and the first parameter belongs to the plurality of parameters.

Optionally, a plurality of parameters corresponding to the first function are preset on the first apparatus. That the first semantic recognition result does not meet the first preset condition further includes: The first semantic recognition result further indicates a first parameter, and the first parameter does not belong to the plurality of parameters.

Optionally, the plurality of parameter types include one or more of the following parameter types: a hardware identifier, duration, a temperature, a location, a singer, a song, a playlist, an audio playing mode, a movie, a TV series, an actor, and a video playing mode.

The parameter corresponding to the first function is usually not unlimited. A correspondence is established between the plurality of functions and a plurality of parameters. This helps the first apparatus relatively more accurately determine whether the first apparatus can relatively accurately recognize the current voice information, and further helps balance accuracy and efficiency of voice recognition.

With reference to the first aspect, in some implementations of the first aspect, a plurality of parameters corresponding to the first intention are preset on the first apparatus. That the first semantic recognition result meets the first preset condition further includes:

the first semantic recognition result further indicates a first parameter, and the first parameter belongs to the plurality of parameters.

Optionally, a plurality of parameters corresponding to the first intention are preset on the first apparatus. That the first semantic recognition result does not meet the first preset condition further includes: The first semantic recognition result further indicates a first parameter, and the first parameter does not belong to the plurality of parameters.

The parameter corresponding to the first intention is usually not unlimited. A correspondence is established between the plurality of intentions and the plurality of parameters. This helps the first apparatus relatively more accurately determine whether the first apparatus can relatively accurately recognize the current voice information, and further helps balance accuracy and efficiency of voice recognition.

With reference to the first aspect, in some implementations of the first aspect, the first semantic recognition result indicates the first function and indicates the first parameter. That the first semantic recognition result meets the first preset condition further includes:

the first function indicated by the first semantic recognition result and the first parameter indicated by the first semantic recognition result correspond to a same parameter type.

Optionally, the first semantic recognition result indicates the first function and indicates the first parameter. That the first semantic recognition result does not meet the first preset condition further includes: The first function indicated by the first semantic recognition result and the first parameter indicated by the first semantic recognition result correspond to different parameter types.

The following uses some examples to describe a parameter type that may correspond to the function.

For example, a parameter type corresponding to the vehicle control function may be duration, a temperature, or a hardware identifier.

For another example, a parameter type corresponding to a temperature control function may be a temperature.

For another example, a parameter type corresponding to the navigation function may be a location or duration.

For another example, a parameter type corresponding to the audio function may be a singer, a song, a playlist, duration, or an audio playing mode.

For another example, a parameter type corresponding to the video function may be a movie, a TV series, an actor, duration, or a video playing mode.

The following uses some examples to describe a parameter type that may correspond to the parameter.

For example, a parameter type corresponding to an air conditioner, a camera, a seat, or a vehicle window may be a hardware identifier.

For another example, a parameter type corresponding to 5° C. or 28° C. may be a temperature.

For another example, a parameter type corresponding to 1 hour or 1 minute may be duration.

For another example, a parameter type corresponding to a location A or a location B may be a location.

For another example, a parameter type corresponding to a singer A or a singer B may be a singer.

For another example, a parameter type corresponding to a song A or a song B may be a song.

For another example, a parameter type corresponding to a playlist A or a playlist B may be a playlist.

For another example, a parameter type corresponding to standard playing, high-quality playing, or lossless playing may be an audio playing mode.

For another example, a parameter type corresponding to a movie A or a movie B may be a movie.

For another example, a parameter type corresponding to a TV series A or a TV series B may be a TV series.

For another example, a parameter type corresponding to an actor A or an actor B may be an actor.

For another example, a parameter type corresponding to standard-definition playing, high-definition playing, ultra-high-definition playing, or Blu-ray playing may be a video playing mode.

If the first apparatus obtains in advance that the first parameter corresponds to a first parameter type, and the first function corresponds to the first parameter type, accuracy of recognizing the first voice information by the first apparatus may be higher. If the first apparatus obtains in advance that the first parameter corresponds to a first parameter type, but the first function does not correspond to the first parameter type, accuracy of analyzing the first voice information by the first apparatus may be lower. A relationship between the plurality of parameters and the plurality of functions is established by using a parameter type. This helps the first apparatus relatively more accurately determine whether the first apparatus can relatively accurately recognize the current voice information, and further helps balance accuracy and efficiency of voice recognition.

In addition, if the plurality of functions all correspond to a same type of parameter, the type of parameter may be mutually deduced between the plurality of functions. This helps reduce complexity of establishing the relationship between the parameter and the function.

With reference to the first aspect, in some implementations of the first aspect, the determining a first semantic recognition result based on the first voice information includes:

determining a second semantic recognition result based on the first voice information, where the second semantic recognition result indicates a second function and indicates the first parameter; and when the plurality of functions preset on the first apparatus do not include the second function, and the plurality of parameters preset on the first apparatus include the first parameter, correcting the second function in the second semantic recognition result to the first function, to obtain the first semantic recognition result, where the first function and the second function are two different functions of a same type.

For example, the first function may be a local translation function, and the second function may be a cloud translation function. Both the first function and the second function may be functions of a translation type.

For another example, the first function may be a local navigation function, and the second function may be a cloud navigation function. Both the first function and the second function may be functions of a navigation type.

For another example, the first function may be a local audio function, and the second function may be a cloud audio function. Both the first function and the second function may be functions of an audio playing type.

For another example, the first function may be a local video function, and the second function may be a cloud video function. Both the first function and the second function may be functions of a video playing type.

The second function does not belong to the plurality of functions preset on the first apparatus, which means that the first apparatus may have a weaker semantic recognition capability for the second function. For example, the first apparatus may learn, for a plurality of times, a voice instruction related to the second function, to gradually improve a semantic recognition capability for the second function. In other words, the second function is changed to the first function, so that the first apparatus may apply a learned skill in the field that the first apparatus is relatively not good at. This helps increase an applicable scenario of device-side decision-making, and further helps improve efficiency of voice recognition.

With reference to the first aspect, in some implementations of the first aspect, the first semantic recognition result indicates the first intention and indicates the first parameter. That the first semantic recognition result meets the first preset condition further includes:

the first intention indicated by the first semantic recognition result and the first parameter indicated by the first semantic recognition result correspond to a same parameter type.

Optionally, the first semantic recognition result indicates the first intention and indicates the first parameter. That the first semantic recognition result does not meet the first preset condition further includes: The first intention indicated by the first semantic recognition result and the first parameter indicated by the first semantic recognition result correspond to different parameter types.

The following uses some examples to describe a parameter type that may correspond to the intention.

For example, a parameter type corresponding to the hardware starting intention may be duration, a temperature, or a hardware identifier.

For another example, a parameter type corresponding to the path planning intention may be a location or duration.

For another example, a parameter type corresponding to the audio playing intention may be a singer, a song, a playlist, duration, or an audio playing mode.

For another example, a parameter type corresponding to the video playing intention may be a movie, a TV series, an actor, duration, or a video playing mode.

The following uses some examples to describe a parameter type that may correspond to the parameter.

For example, a parameter type corresponding to an air conditioner, a camera, a seat, or a vehicle window may be a hardware identifier.

For another example, a parameter type corresponding to 5° C. or 28° C. may be a temperature.

For another example, a parameter type corresponding to 1 hour or 1 minute may be duration.

For another example, a parameter type corresponding to a location A or a location B may be a location.

For another example, a parameter type corresponding to a singer A or a singer B may be a singer.

For another example, a parameter type corresponding to a song A or a song B may be a song.

For another example, a parameter type corresponding to a playlist A or a playlist B may be a playlist.

For another example, a parameter type corresponding to standard playing, high-quality playing, or lossless playing may be an audio playing mode.

For another example, a parameter type corresponding to a movie A or a movie B may be a movie.

For another example, a parameter type corresponding to a TV series A or a TV series B may be a TV series.

For another example, a parameter type corresponding to an actor A or an actor B may be an actor.

For another example, a parameter type corresponding to standard-definition playing, high-definition playing, ultra-high-definition playing, or Blu-ray playing may be a video playing mode.

If the first apparatus obtains in advance that the first parameter corresponds to a first parameter type, and the first intention corresponds to the first parameter type, accuracy of analyzing the first voice information by the first apparatus may be higher. If the first apparatus obtains in advance that the first parameter corresponds to a first parameter type, but the first intention does not correspond to the first parameter type, accuracy of analyzing the first voice information by the first apparatus may be lower. A relationship between the plurality of parameters and the plurality of intention is established by using a parameter type. This helps the first apparatus relatively more accurately determine whether the first apparatus can relatively accurately recognize the current voice information, and further helps balance accuracy and efficiency of voice recognition.

In addition, if the plurality of intentions all correspond to a same type of parameter, the type of parameter may be mutually deduced between the plurality of intentions. This helps reduce complexity of establishing the relationship between the parameter and the intention.

With reference to the first aspect, in some implementations of the first aspect, the determining a first semantic recognition result based on the first voice information includes:

determining a third semantic recognition result based on the first voice information, where the third semantic recognition result indicates a second intention and indicates the first parameter; and when the plurality of intentions preset on the first apparatus do not include the second intention, and the plurality of parameters preset on the first apparatus include the first parameter, correcting the second intention in the third semantic recognition result to the first intention, to obtain the first semantic recognition result, where the first intention and the second intention are two different intentions of a same type.

For example, the first intention may be a local English translation intention, and the second intention may be a cloud English translation intention. Both the first intention and the second intention may be intentions of an English translation type.

For another example, the first intention may be a local path planning intention, and the second intention may be a cloud path planning intention. Both the first intention and the second intention may be intentions of a path planning type.

For another example, the first intention may be a local audio playing intention, and the second intention may be a cloud audio playing intension. Both the first intention and the second intention may be intentions of an audio playing type.

For another example, the first intention may be a local video playing intention, and the second intention may be a cloud video playing intention. Both the first intention and the second intention may be intentions of a video playing type.

The second intention does not belong to the plurality of intentions preset on the first apparatus, which means that the first apparatus may have a weaker semantic recognition capability for the second intention. For example, the first apparatus may learn, for a plurality of times, a voice instruction related to the second intention, to gradually improve a semantic recognition capability for the second intention. In other words, the second intention is changed to the first intention, so that the first apparatus may apply a learned skill in the field that the first apparatus is relatively not good at. This helps increase an applicable scenario of device-side decision-making, and further helps improve efficiency of voice recognition.

With reference to the first aspect, in some implementations of the first aspect, that the first semantic recognition result meets the first preset condition includes:

the first semantic recognition result includes a first indicator bit, and the first indicator bit indicates that the first semantic recognition result meets the first preset condition.

Optionally, that the first semantic recognition result does not meet the first preset condition includes: The first semantic recognition result includes a second indicator bit, and the second indicator bit indicates that the first semantic recognition result does not meet the first preset condition.

With reference to the first aspect, in some implementations of the first aspect, the determining a first semantic recognition result based on the first voice information includes:

determining a fourth semantic recognition result based on the first voice information, where the fourth semantic recognition result includes a first function and a first parameter; and when the first function belongs to a plurality of functions preset on the first apparatus, the first parameter belongs to a plurality of parameters preset on the first apparatus, and the first function and the first parameter correspond to a same parameter type, determining the first semantic recognition result, where the semantic recognition result includes the first indicator bit.

The first apparatus may have a weak semantic recognition capability for the first function. For example, the first apparatus may learn, for a plurality of times, a voice instruction related to the first function, to gradually improve a semantic recognition capability for the first function. In other words, the first indicator bit is carried in the semantic recognition result, so that the first apparatus may apply a learned skill in the field that the first apparatus is relatively not good at. This helps increase an applicable scenario of device-side decision-making, and further helps improve efficiency of voice recognition.

With reference to the first aspect, in some implementations of the first aspect, the determining a first semantic recognition result based on the first voice information includes:

determining a fifth semantic recognition result based on the first voice information, where the fifth semantic recognition result includes a first intention and a first parameter; and when the first intention belongs to a plurality of intentions preset on the first apparatus, the first parameter belongs to a plurality of parameters preset on the first apparatus, and the first intention and the first parameter correspond to a same parameter type, determining the first semantic recognition result, where the semantic recognition result includes the first indicator bit.

The first intention may have a weak semantic recognition capability for the first intention. For example, the first apparatus may learn, for a plurality of times, a voice instruction related to the first intention, to gradually improve a semantic recognition capability for the first intention. In other words, the first indicator bit is carried in the semantic recognition result, so that the first apparatus may apply a learned skill in the field that the first apparatus is relatively not good at. This helps increase an applicable scenario of device-side decision-making, and further helps improve efficiency of voice recognition.

With reference to the first aspect, in some implementations of the first aspect, the method further includes:

sending the first voice information to the second apparatus; and discarding a sixth semantic recognition result from the second apparatus.

With reference to the first aspect, in some implementations of the first aspect, the determining, based on the first semantic recognition result and a first preset condition, to perform a second operation indicated by a second apparatus includes:

when the first semantic recognition result does not meet the first preset condition, obtaining a sixth semantic recognition result from the second apparatus, where the sixth semantic recognition result indicates the second operation; and determining, based on the sixth semantic recognition result, to perform the second operation.

The first preset condition helps the first apparatus determine whether the first apparatus can relatively accurately recognize the current voice information, and further helps balance accuracy and efficiency of voice recognition.

With reference to the first aspect, in some implementations of the first aspect, the method further includes:

determining a second parameter and a second parameter type based on the sixth semantic recognition result; and storing an association relationship between the second parameter and the second parameter type.

The first apparatus may learn a new parameter. This helps increase an applicable scenario of device-side decision-making, and further helps improve efficiency of voice recognition.

With reference to the first aspect, in some implementations of the first aspect, the method further includes:

obtaining second voice information from the voice sensor;

determining a seventh semantic recognition result based on the second voice information; and determining, based on the seventh semantic recognition result and a second preset condition, to perform an operation indicated by the first voice information, or to perform a third operation determined by the first apparatus based on the seventh semantic recognition result, or to perform a fourth operation indicated by the second apparatus.

In a multi-round voice interaction scenario, the user and the first apparatus may perform a voice dialog in a special scenario or a special field. In a possible scenario, the user may not be able to completely implement voice control by using one voice instruction. In multi-round voice interaction, two adjacent rounds of voice interaction are usually associated. However, a reply of the user may be random. The reply of the user may be unrelated to voice information queried or to be obtained by the first apparatus. If the first apparatus completely follows the reply of the user, previous voice interaction content may be discarded, and consequently a quantity of times of controlling the first apparatus by the user may be increased. If the first apparatus completely ignores the reply of the user, the first apparatus may not b e able to respond to an indication of the user in some special scenarios, and a voice instruction of the user is ineffective. The second preset condition indicates whether the first apparatus ends multi-round voice interaction, and helps the first apparatus relatively appropriately select whether to jump out of multi-round voice interaction.

With reference to the first aspect, in some implementations of the first aspect, the determining, based on the seventh semantic recognition result and a second preset condition, to perform an operation indicated by the first voice information, or to perform a third operation determined by the first apparatus based on the seventh semantic recognition result, or to perform a fourth operation indicated by the second apparatus includes:

when the seventh semantic recognition result meets the first preset condition and meets the second preset condition, determining to perform the third operation; or when the seventh semantic recognition result does not meet the first preset condition and meets the second preset condition, determining to perform the fourth operation; or

11 when the seventh semantic recognition result does not meet the second preset condition, determining to perform the operation corresponding to the first semantic recognition result.

In an example, if the first operation is performed, and the first apparatus determines to perform the third operation, new device-side voice interaction may end a previous round of device-side voice interaction.

In an example, if the second operation is performed, and the first apparatus determines to perform the third operation, new device-side voice interaction may end a previous round of cloud-side voice interaction.

In an example, if the first operation is performed, and the first apparatus determines to perform the fourth operation, new cloud-side voice interaction may end a previous round of device-side voice interaction.

In an example, if the second operation is performed, and the first apparatus determines to perform the fourth operation, new cloud-side voice interaction may end a previous round of device-cloud voice interaction.

The first apparatus may comprehensively determine the first preset condition and the second preset condition. This helps the first apparatus relatively appropriately select whether to jump out of multi-round voice interaction, and helps balance accuracy and efficiency of voice recognition.

With reference to the first aspect, in some implementations of the first aspect, that the seventh semantic recognition result meets the second preset condition includes:

a priority of the seventh semantic recognition result is higher than a priority of the first semantic recognition result.

The user may end current multi-round voice interaction by using a high-priority voice instruction.

With reference to the first aspect, in some implementations of the first aspect, that the priority of the seventh semantic recognition result is higher than the priority of the first semantic recognition result includes one or more of the following:

a priority of a function indicated by the seventh semantic recognition result is higher than a priority of a function indicated by the first semantic recognition result;

a priority of an intention indicated by the seventh semantic recognition result is higher than a priority of an intention indicated by the first semantic recognition result; and a priority of a parameter indicated by the seventh semantic recognition result is higher than a priority of a parameter indicated by the first semantic recognition result.

A function, an intention, and a parameter can better reflect a current voice interaction scenario. A priority of the function, a priority of the intention, and a priority of the parameter help an apparatus relatively accurately determine whether to jump out of current multi-round voice interaction.

With reference to the first aspect, in some implementations of the first aspect, the determining, based on the first semantic recognition result and a first preset condition, to perform a second operation indicated by a second apparatus includes:

when the first semantic recognition result does not meet the first preset condition, obtaining the sixth semantic recognition result from the second apparatus, where the sixth semantic recognition result indicates the second operation; and determining, based on the sixth semantic recognition result, to perform the second operation.

12

That the seventh semantic recognition result meets the second preset condition includes:

a priority of the seventh semantic recognition result is higher than a priority of the sixth semantic recognition result.

The sixth semantic recognition result is indicated by the second apparatus, and the sixth semantic recognition result may have higher accuracy. The priority of the seventh semantic recognition result is compared with the priority of the sixth semantic recognition result. This helps the first apparatus relatively appropriately select whether to jump out of multi-round voice interaction.

With reference to the first aspect, in some implementations of the first aspect, that the priority of the seventh semantic recognition result is higher than the priority of the sixth semantic recognition result includes one or more of the following:

a priority of a function indicated by the seventh semantic recognition result is higher than a priority of a function indicated by the sixth semantic recognition result;

a priority of an intention indicated by the seventh semantic recognition result is higher than a priority of an intention indicated by the sixth semantic recognition result; and a priority of a parameter indicated by the seventh semantic recognition result is higher than a priority of a parameter indicated by the sixth semantic recognition result.

A function, an intention, and a parameter can better reflect a current voice interaction scenario. A priority of the function, a priority of the intention, and a priority of the parameter help an apparatus relatively accurately determine whether to jump out of current multi-round voice interaction.

With reference to the first aspect, in some implementations of the first aspect, the method further includes:

sending the second voice information to the second apparatus.

The determining, based on the seventh semantic recognition result and a second preset condition, to perform an operation indicated by the first voice information, or to perform a fourth operation indicated by the second apparatus includes:

when the seventh semantic recognition result does not meet the first preset condition, or when the seventh semantic recognition result does not meet the second preset condition and the first semantic recognition result does not meet the first preset condition, obtaining an eighth semantic recognition result from the second apparatus; and determining, based on the eighth semantic recognition result and the second preset condition, to perform the operation indicated by the first voice information, or to perform the fourth operation.

When the seventh semantic recognition result does not meet the first preset condition, the seventh semantic recognition result obtained by the first apparatus through recognition may be more inaccurate, and the eighth semantic recognition result obtained by the second apparatus through recognition may be more accurate. The first apparatus may determine whether the eighth semantic recognition result meets the second preset condition, to help relatively accurately determine whether to end current multi-round voice interaction.

If the seventh semantic recognition result does not meet the second preset condition, it means that the first apparatus may not determine a to-be-performed operation based on the seventh semantic recognition result. When the first semantic recognition result does not meet the first preset condition, it may mean that current multi-round voice interaction is cloud-side voice interaction. In this case, the first apparatus may obtain the eighth semantic recognition result from the second apparatus, to continue current cloud-side multi-round voice interaction. This helps maintain cloud-side multi-round voice interaction.

With reference to the first aspect, in some implementations of the first aspect, the determining, based on the eighth semantic recognition result and the second preset condition, to perform the operation indicated by the first voice information, or to perform the fourth operation includes:

when the eighth semantic recognition result meets the second preset condition, determining to perform the fourth operation; or when the eighth semantic recognition result does not meet the second preset condition, determining to perform the operation indicated by the first voice information.

The eighth semantic recognition result is indicated by the second apparatus, and the eighth semantic recognition result may have higher accuracy. This helps the first apparatus relatively appropriately select, based on a priority of the eighth semantic recognition result, whether to jump out of multi-round voice interaction.

With reference to the first aspect, in some implementations of the first aspect, that the eighth semantic recognition result meets the second preset condition includes:

the priority of the eighth semantic recognition result is higher than a priority of the first semantic recognition result.

The user may end current multi-round voice interaction by using a high-priority voice instruction.

With reference to the first aspect, in some implementations of the first aspect, that the priority of the eighth semantic recognition result is higher than the priority of the first semantic recognition result includes one or more of the following:

a priority of a function indicated by the eighth semantic recognition result is higher than a priority of a function indicated by the first semantic recognition result;

a priority of an intention indicated by the eighth semantic recognition result is higher than a priority of an intention indicated by the first semantic recognition result; and a priority of a fifth parameter indicated by the eighth semantic recognition result is higher than a priority of a parameter indicated by the first semantic recognition result.

A function, an intention, and a parameter can better reflect a current voice interaction scenario. A priority of the function, a priority of the intention, and a priority of the parameter help an apparatus relatively accurately determine whether to jump out of current multi-round voice interaction.

With reference to the first aspect, in some implementations of the first aspect, the determining, based on the first semantic recognition result and a first preset condition, to perform a second operation indicated by a second apparatus includes:

when the first semantic recognition result does not meet the first preset condition, obtaining the sixth semantic recognition result from the second apparatus, where the sixth semantic recognition result indicates the second operation; and determining, based on the sixth semantic recognition result, to perform the second operation.

That the eighth semantic recognition result meets the second preset condition includes:

a priority of the eighth semantic recognition result is higher than a priority of the sixth semantic recognition result.

Both the sixth semantic recognition result and the eighth semantic recognition result are indicated by the second apparatus, and both the sixth semantic recognition result and the eighth semantic recognition result may have higher accuracy. The priority of the eighth semantic recognition result is compared with the priority of the sixth semantic recognition result. This helps the first apparatus relatively appropriately select whether to jump out of multi-round voice interaction.

With reference to the first aspect, in some implementations of the first aspect, that the priority of the eighth semantic recognition result is higher than the priority of the sixth semantic recognition result includes one or more of the following:

a priority of a function indicated by the eighth semantic recognition result is higher than a priority of a function indicated by the sixth semantic recognition result;

a priority of an intention indicated by the eighth semantic recognition result is higher than a priority of an intention indicated by the sixth semantic recognition result; and a priority of a parameter indicated by the eighth semantic recognition result is higher than a priority of a parameter indicated by the sixth semantic recognition result.

A function, an intention, and a parameter can better reflect a current voice interaction scenario. A priority of the function, a priority of the intention, and a priority of the parameter help an apparatus relatively accurately determine whether to jump out of current multi-round voice interaction.

With reference to the first aspect, in some implementations of the first aspect, the second voice information is unrelated to the operation indicated by the first voice information.

For example, association between the second voice information and the operation indicated by the first voice information is less than a second preset threshold. For another example, the first voice information is unrelated to the second voice information. For another example, a degree of association between the first voice information and the second voice information is less than a second preset threshold. For another example, one or more of a function, an intention, and a parameter indicated by the first voice information is or are different from that or those indicated by the second voice information.

With reference to the first aspect, in some implementations of the first aspect, the method further includes:

responding to an input operation of the user and performing a voice wake-up operation.

According to a second aspect, a voice interaction apparatus is provided, including:

an obtaining unit, configured to obtain first voice information from a voice sensor; and a processing unit, configured to determine a first semantic recognition result based on the first voice information, where the processing unit is further configured to determine, based on the first semantic recognition result and a first preset condition, to perform a first operation determined by a first apparatus based on the first semantic recognition result, or to perform a second operation indicated by a second apparatus.

With reference to the second aspect, in some implementations of the second aspect, the processing unit is specifically configured to:

when the first semantic recognition result meets the first preset condition, determine to perform the first operation.

With reference to the second aspect, in some implementations of the second aspect, a plurality of functions are preset on the first apparatus. That the first semantic recognition result meets the first preset condition includes:

the first semantic recognition result indicates a first function, and the first function belongs to the plurality of functions.

With reference to the second aspect, in some implementations of the second aspect, a plurality of intentions are preset on the first apparatus. That the first semantic recognition result meets the first preset condition includes:

the first semantic recognition result indicates a first intention, and the first intention belongs to the plurality of intentions.

With reference to the second aspect, in some implementations of the second aspect, a plurality of parameters are preset on the first apparatus. That the first semantic recognition result meets the first preset condition includes:

the first semantic recognition result indicates a first parameter, and the first parameter belongs to the plurality of parameters.

With reference to the second aspect, in some implementations of the second aspect, the first semantic recognition result indicates the first function and indicates the first parameter. That the first semantic recognition result meets the first preset condition further includes:

the first function indicated by the first semantic recognition result and the first parameter indicated by the first semantic recognition result correspond to a same parameter type.

With reference to the second aspect, in some implementations of the second aspect, the processing unit is specifically configured to:

determine a second semantic recognition result based on the first voice information, where the second semantic recognition result indicates a second function and indicates the first parameter; and when the plurality of functions preset on the first apparatus do not include the second function, and the plurality of parameters preset on the first apparatus include the first parameter, correct the second function in the second semantic recognition result to the first function, to obtain the first semantic recognition result, where the first function and the second function are two different functions of a same type.

With reference to the second aspect, in some implementations of the second aspect, the first semantic recognition result indicates the first intention and indicates the first parameter. That the first semantic recognition result meets the first preset condition further includes:

the first intention indicated by the first semantic recognition result and the first parameter indicated by the first semantic recognition result correspond to a same parameter type.

With reference to the second aspect, in some implementations of the second aspect, the processing unit is specifically configured to:

determine a third semantic recognition result based on the first voice information, where the third semantic recognition result indicates a second intention and indicates the first parameter; and when the plurality of intentions preset on the first apparatus do not include the second intention, and the plurality of parameters preset on the first apparatus include the first parameter, correct the second intention in the third semantic recognition result to the first intention, to obtain the first semantic recognition result, where the first intention and the second intention are two different intentions of a same type.

With reference to the second aspect, in some implementations of the second aspect, that the first semantic recognition result meets the first preset condition includes:

the first semantic recognition result includes a first indicator bit, and the first indicator bit indicates that the first semantic recognition result meets the first preset condition.

With reference to the second aspect, in some implementations of the second aspect, the processing unit is specifically configured to:

determine a fourth semantic recognition result based on the first voice information, where the fourth semantic recognition result includes a first function and a first parameter; and when the first function belongs to a plurality of functions preset on the first apparatus, the first parameter belongs to a plurality of parameters preset on the first apparatus, and the first function and the first parameter correspond to a same parameter type, determine the first semantic recognition result, where the semantic recognition result includes the first indicator bit.

With reference to the second aspect, in some implementations of the second aspect, the processing unit is specifically configured to:

determine a fifth semantic recognition result based on the first voice information, where the fifth semantic recognition result includes a first intention and a first parameter; and when the first intention belongs to a plurality of intentions preset on the first apparatus, the first parameter belongs to a plurality of parameters preset on the first apparatus, and the first intention and the first parameter correspond to a same parameter type, determine the first semantic recognition result, where the semantic recognition result includes the first indicator bit.

With reference to the second aspect, in some implementations of the second aspect, the apparatus further includes:

a sending unit, configured to send the first voice information to the second apparatus; and the processing unit is further configured to discard a sixth semantic recognition result from the second apparatus.

With reference to the second aspect, in some implementations of the second aspect, the processing unit is specifically configured to:

when the first semantic recognition result does not meet the first preset condition, obtain a sixth semantic recognition result from the second apparatus, where the sixth semantic recognition result indicates the second operation; and determine, based on the sixth semantic recognition result, to perform the second operation.

With reference to the second aspect, in some implementations of the second aspect, the processing unit is further configured to:

determine a second parameter and a second parameter type based on the sixth semantic recognition result; and the apparatus further includes a storage unit, configured to store an association relationship between the second parameter and the second parameter type.

With reference to the second aspect, in some implementations of the second aspect, the obtaining unit is further configured to obtain second voice information from the voice sensor;

the processing unit is further configured to determine a seventh semantic recognition result based on the second voice information; and the processing unit is further configured to determine, based on the seventh semantic recognition result and a second preset condition, to perform an operation indicated by the first voice information, or to perform a third operation determined by the first apparatus based on the seventh semantic recognition result, or to perform a fourth operation indicated by the second apparatus.

With reference to the second aspect, in some implementations of the second aspect, the processing unit is specifically configured to:

when the seventh semantic recognition result meets the first preset condition and meets the second preset condition, determine to perform the third operation; or when the seventh semantic recognition result does not meet the first preset condition and meets the second preset condition, determine to perform the fourth operation; or when the seventh semantic recognition result does not meet the second preset condition, determine to perform the operation corresponding to the first semantic recognition result.

With reference to the second aspect, in some implementations of the second aspect, that the seventh semantic recognition result meets the second preset condition includes:

a priority of the seventh semantic recognition result is higher than a priority of the first semantic recognition result.

With reference to the second aspect, in some implementations of the second aspect, that the priority of the seventh semantic recognition result is higher than the priority of the first semantic recognition result includes one or more of the following:

a priority of a function indicated by the seventh semantic recognition result is higher than a priority of a function indicated by the first semantic recognition result;

a priority of an intention indicated by the seventh semantic recognition result is higher than a priority of an intention indicated by the first semantic recognition result; and a priority of a parameter indicated by the seventh semantic recognition result is higher than a priority of a parameter indicated by the first semantic recognition result.

With reference to the second aspect, in some implementations of the second aspect, the processing unit is specifically configured to:

when the first semantic recognition result does not meet the first preset condition, obtain the sixth semantic recognition result from the second apparatus, where the sixth semantic recognition result indicates the second operation; and determine, based on the sixth semantic recognition result, to perform the second operation.

That the seventh semantic recognition result meets the second preset condition includes:

a priority of the seventh semantic recognition result is higher than a priority of the sixth semantic recognition result.

With reference to the second aspect, in some implementations of the second aspect, that the priority of the seventh semantic recognition result is higher than the priority of the sixth semantic recognition result includes one or more of the following:

a priority of a function indicated by the seventh semantic recognition result is higher than a priority of a function indicated by the sixth semantic recognition result;

a priority of an intention indicated by the seventh semantic recognition result is higher than a priority of an intention indicated by the sixth semantic recognition result; and a priority of a parameter indicated by the seventh semantic recognition result is higher than a priority of a parameter indicated by the sixth semantic recognition result.

With reference to the second aspect, in some implementations of the second aspect, the apparatus further includes:

the sending unit, configured to send the second voice information to the second apparatus; and the processing unit is specifically configured to:

when the seventh semantic recognition result does not meet the first preset condition, or when the seventh semantic recognition result does not meet the second preset condition and the first semantic recognition result does not meet the first preset condition, obtain an eighth semantic recognition result from the second apparatus; and determine, based on the eighth semantic recognition result and the second preset condition, to perform the operation indicated by the first voice information, or to perform the fourth operation.

With reference to the second aspect, in some implementations of the second aspect, the processing unit is specifically configured to:

when the eighth semantic recognition result meets the second preset condition, determine to perform the fourth operation; or when the eighth semantic recognition result does not meet the second preset condition, determine to perform the operation indicated by the first voice information.

With reference to the second aspect, in some implementations of the second aspect, that the eighth semantic recognition result meets the second preset condition includes:

a priority of the eighth semantic recognition result is higher than a priority of the first semantic recognition result.

With reference to the second aspect, in some implementations of the second aspect, that the priority of the eighth semantic recognition result is higher than the priority of the first semantic recognition result includes one or more of the following:

a priority of a function indicated by the eighth semantic recognition result is higher than a priority of a function indicated by the first semantic recognition result;

a priority of an intention indicated by the eighth semantic recognition result is higher than a priority of an intention indicated by the first semantic recognition result; and a priority of a parameter indicated by the eighth semantic recognition result is higher than a priority of a parameter indicated by the first semantic recognition result.

With reference to the second aspect, in some implementations of the second aspect, the processing unit is specifically configured to:

when the first semantic recognition result does not meet the first preset condition, obtain the sixth semantic recognition result from the second apparatus, where the sixth semantic recognition result indicates the second operation; and determine, based on the sixth semantic recognition result, to perform the second operation.

That the eighth semantic recognition result meets the second preset condition includes:

a priority of the eighth semantic recognition result is higher than a priority of the sixth semantic recognition result.

With reference to the second aspect, in some implementations of the second aspect, that the priority of the eighth semantic recognition result is higher than the priority of the sixth semantic recognition result includes one or more of the following:

a priority of a function indicated by the eighth semantic recognition result is higher than a priority of a function indicated by the sixth semantic recognition result;

a priority of an intention indicated by the eighth semantic recognition result is higher than a priority of an intention indicated by the sixth semantic recognition result; and a priority of a parameter indicated by the eighth semantic recognition result is higher than a priority of a parameter indicated by the sixth semantic recognition result.

With reference to the second aspect, in some implementations of the second aspect, the second voice information is unrelated to the operation indicated by the first voice information.

With reference to the second aspect, in some implementations of the second aspect, the apparatus further includes:

a wake-up module, configured to: respond to an input operation of a user and perform a voice wake-up operation.

According to a third aspect, a voice interaction apparatus is provided. The apparatus includes a processor and a memory. The processor is coupled to the memory. The memory is configured to store a computer program. The processor is configured to execute the computer program stored in the memory, to enable the apparatus to perform the method according to any one of the possible implementations of the first aspect.

According to a fourth aspect, a computer-readable medium is provided. The computer-readable medium stores program code for execution by a device. The program code is used to perform the method according to any one of the implementations of the first aspect.

According to a fifth aspect, a computer program product including instructions is provided. When the computer program product runs on a computer, the computer is enabled to perform the method according to any one of the implementations of the first aspect.

According to a sixth aspect, a chip is provided. The chip includes a processor and a data interface. The processor reads, through the data interface, instructions stored in a memory, to perform the method according to any one of the implementations of the first aspect.

Optionally, in an implementation, the chip may further include a memory. The memory stores instructions. The processor is configured to execute the instructions stored in the memory. When the instructions are executed, the processor is configured to perform the method according to any one of the implementations of the first aspect.

According to a seventh aspect, a voice interaction system is provided. The voice interaction system includes the first apparatus according to any one of the possible implementations of the first aspect and the second apparatus according to any one of the possible implementations of the first aspect. The first apparatus is configured to perform the method according to any one of the possible implementations of the first aspect.

According to the solutions provided in embodiments of this application, the first apparatus can determine whether the first apparatus has a capability to independently recognize the voice instruction of the user. In the voice interaction scenario that the first apparatus is relatively good at, the first apparatus can independently determine the operation corresponding to the voice instruction of the user. This helps reduce the response delay of executing the voice instruction of the user by the first apparatus, and improves response efficiency. In the voice interaction scenario that the first apparatus is relatively not good at, the first apparatus can choose to perform an operation indicated by another apparatus. This helps improve accuracy of responding to the voice instruction of the user by the first apparatus. In addition, a voice instruction collected by a sensor is not only processed by a local processor, but also sent to a cloud for processing, and an operation fed back by the local processor or the cloud is adaptively selected to be performed. This can balance response efficiency and response accuracy. According to the solutions provided in embodiments of this application, the first apparatus can continuously learn a new voice instruction, to expand the voice interaction scenario that the first apparatus is relatively good at. According to the solutions provided in this application, the first apparatus can appropriately choose whether to jump out of multi-round voice interaction, to help improve a voice interaction effect.

BRIEF DESCRIPTION OF DRAWINGS

FIG. 7 is a schematic flowchart of a voice interaction method according to an embodiment of this application;

FIG. 9 is a schematic flowchart of a voice interaction method according to an embodiment of this application;

FIG. 10A and FIG. 10B are a schematic flowchart of a voice interaction method according to an embodiment of this application;

DESCRIPTION OF EMBODIMENTS

The following describes the technical solutions in embodiments of this application with reference to the accompanying drawings in embodiments of this application. It is clear that the described embodiments are merely a part rather than all of embodiments of this application. All other embodiments obtained by a person of ordinary skill in the art without creative efforts based on embodiments of this application shall fall within the protection scope of this application.

The following describes several possible application scenarios of voice recognition.

Application Scenario 1: An Application Scenario of Intelligent Driving

In the application scenario of intelligent driving, a user may control an intelligent driving device by using a voice. For example, the user may send a voice instruction to an on-board voice assistant, to control the intelligent driving device. In some possible examples, the user may adjust a tilt of a seat back, adjust a temperature of an air conditioner in a vehicle, turn on or off a seat heater, turn on or off a vehicle light, open or close a vehicle window, open or close a trunk, plan a navigation route, play a personalized playlist, or the like by using the voice. In the application scenario of intelligent driving, voice interaction helps provide a convenient driving environment for the user.

Application Scenario 2: An Application Scenario of a Smart Home

In the application scenario of the smart home, a user may control a smart home device by using a voice. For example, the user may send a voice instruction to a device in an internet of things (for example, the smart home device) or a control device in the internet of things (for example, a mobile phone), to control the device in the internet of things. In some possible examples, the user may control a temperature of a smart air conditioner, control a smart television to play a TV series specified by the user, control a smart cooking device to start at a time point specified by the user, control to open or close a smart curtain, control a smart lamp to adjust a color temperature, or the like by using the voice. In the application scenario of the smart home, voice interaction helps provide a comfortable home environment for the user.

Figure 1:
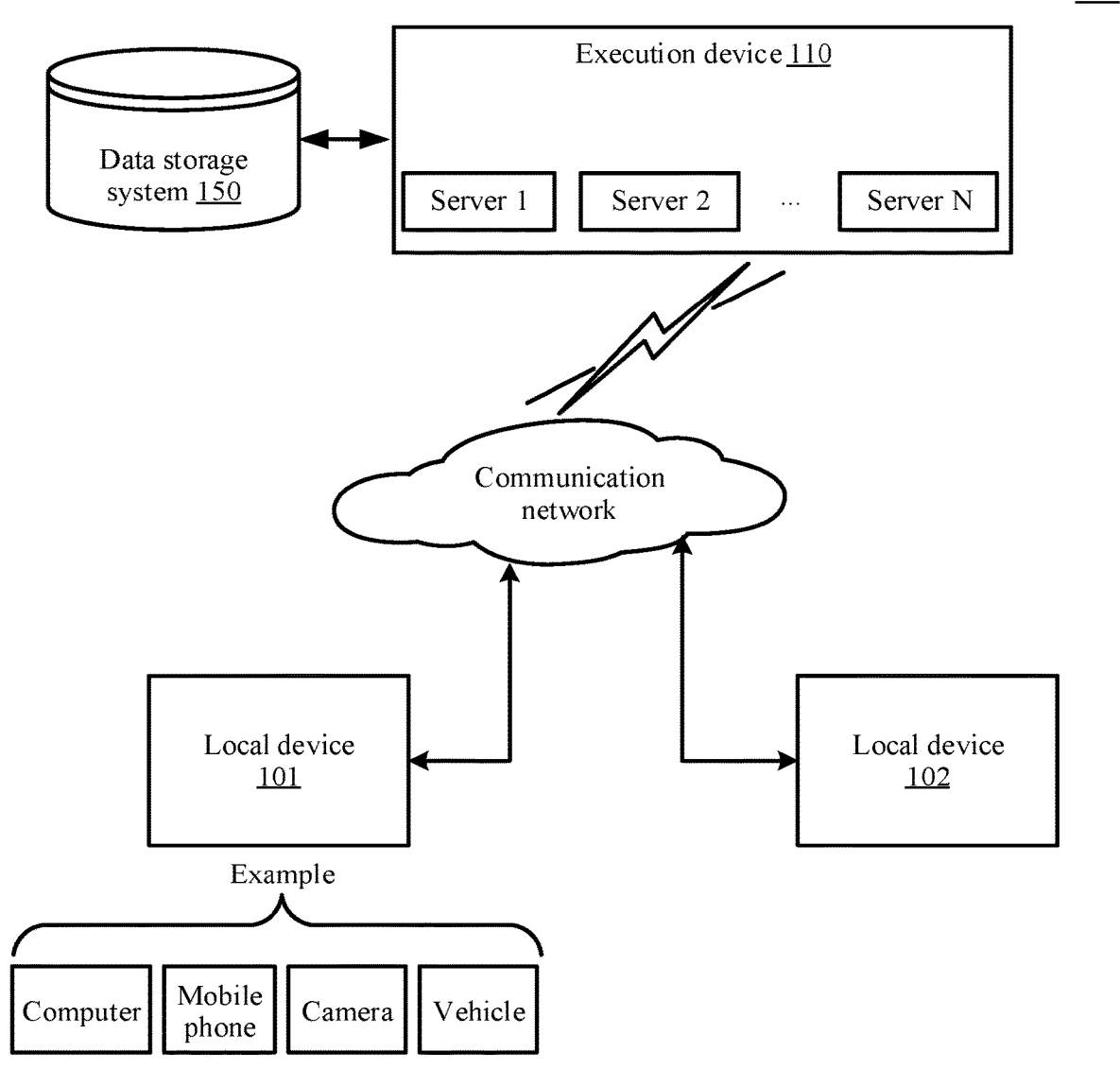
FIG. 1 is a schematic diagram of a voice interaction system.

FIG. 1 is a schematic diagram of a voice interaction system 100.

An execution device 110 may be a device that has a voice recognition capability, a natural language understanding capability, and the like. The execution device 110 may be, for example, a server. Optionally, the execution device 110 may further cooperate with another computing device, for example, a device such as a data storage, a router, or a load balancer. The execution device 110 may be disposed on one physical site, or distributed on a plurality of physical sites. The execution device 110 may implement at least one of functions such as voice recognition, machine learning, deep learning, and model training by using data in a data storage system 150 or by invoking program code in the data storage system 150. The data storage system 150 in FIG. 1 may be integrated on the execution device 110, or may be disposed on a cloud or another network server.

A user may operate a local device (for example, a local device 101 and a local device 102) of the user to interact with the execution device 110. The local device shown in FIG. 1 may represent, for example, various types of voice interaction terminals.

The local device of the user may interact with the execution device 110 through a wired or wireless communication network. A mode or standard of the communication network is not limited, and may be a manner, for example, a wide area network, a local area network, a point-to-point connection, or any combination thereof.

In an implementation, the local device 101 may provide local data or feed back a computing result to the execution device 110.

In another implementation, all or some of functions of the execution device 110 may be implemented by the local device. For example, the local device 101 implements a function of the execution device 110, and provides a service for a user of the local device 101, or provides a service for a user of the local device 102.

Figure 2:
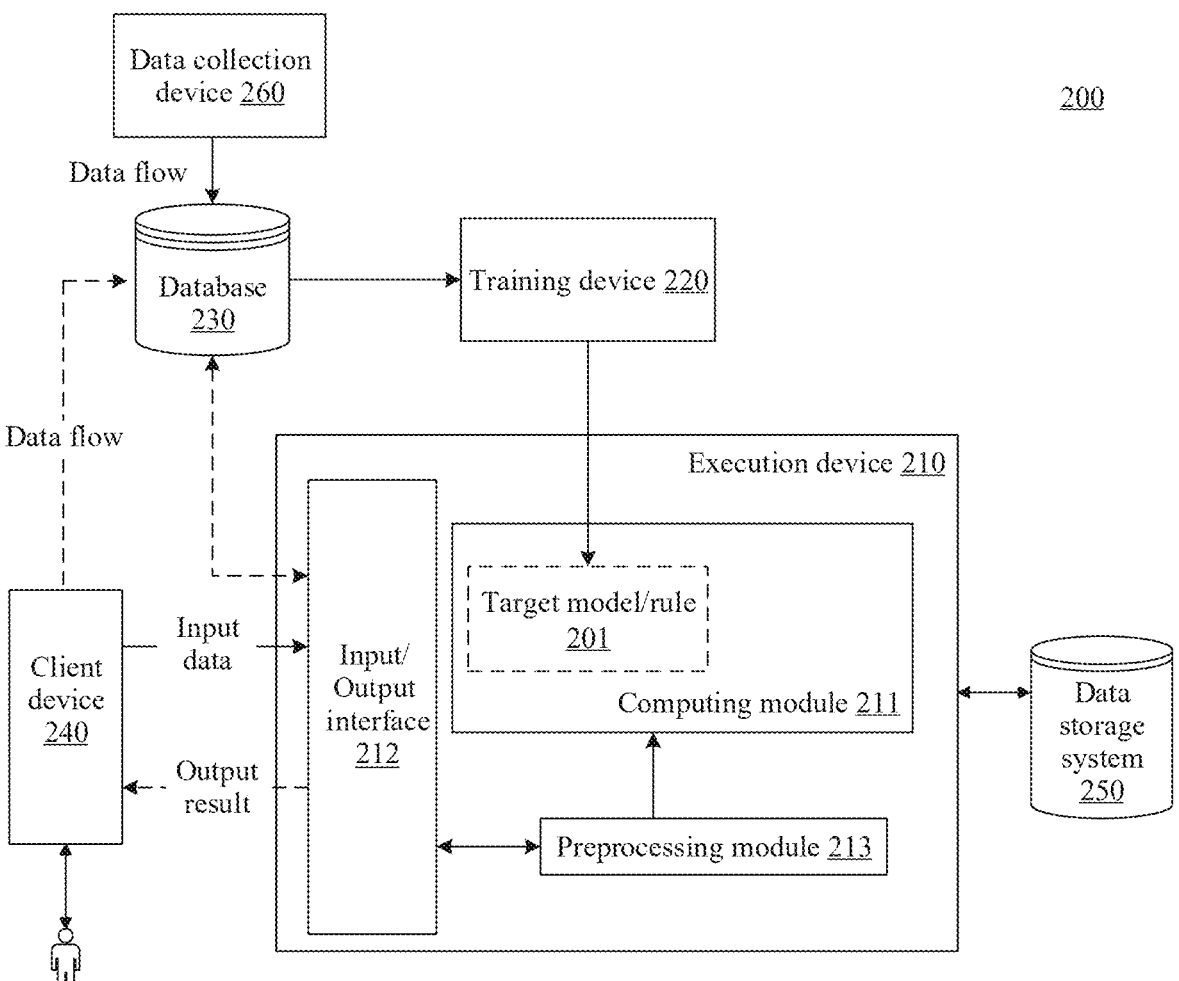
FIG. 2 is a schematic diagram of a system architecture.

FIG. 2 is a schematic diagram of a system architecture 200.

A data collection device 260 may be configured to collect training data. The data collection device 260 may be further configured to store the training data into a database 230. A training device 220 may obtain a target model/rule 201 through training based on training data maintained in the database 230. The target model/rule 201 obtained through training herein may be used to perform a voice interaction method in embodiments of this application. Alternatively, a training device 220 does not necessarily train a target model/rule 201 completely based on training data maintained in the database 230, and may obtain training data from a cloud or another place to perform model training. The foregoing descriptions should not be construed as a limitation on embodiments of this application.

The training data maintained in the database 230 is not necessarily collected by the data collection device 260, and may alternatively be received from another device. In an example, the training data in the database 230 may be obtained by using a client device 240, or may be obtained by using an execution device 210. For example, the client device 240 may include various types of voice interaction terminals. The execution device 210 may be a device that has a voice recognition capability, a natural language understanding capability, and the like. For example, the data collection device 260 obtains voice information and performs related processing, to obtain the training data such as a text feature of an input text and a phonetic alphabet feature of a target voice. The data collection device 260 may alternatively obtain the text feature of the input text and the phonetic alphabet feature of the target voice. For another example, voice information may be directly used as the training data. In another example, a same account may be used to log in to a plurality of client devices 240, and data collected by the plurality of client devices 240 may be maintained in the database 230.

Optionally, for example, the training data may include one or more of data such as a voice, a corpus, and a hot word. The voice may be a sound that carries a specific language meaning. The corpus is a language material, and may be a language that describes the real world by using a text, a context relationship of the text, and the like, and a context relationship of the language. The hot word is a buzzword. The hot word may be a lexical phenomenon, and the hot word may reflect an issue, a topic, a thing, or the like that some persons are relatively concerned about in a period.

In a possible example, for example, the training data may include an input voice (the input voice may be, for example, from a user, or may be a voice obtained by the another device).

In another possible example, for example, the training data may include a feature vector of an input voice (for example, a phonetic alphabet feature, where the phonetic alphabet feature may reflect, for example, a phonetic alphabet of the input voice). The feature vector of the input voice may be obtained by performing feature extraction on the input voice.

In still another possible example, for example, the training data may include a target text corresponding to an input voice.

In yet still another possible example, for example, the training data may include a text feature of a target text corresponding to an input voice. The target text may be obtained after feature preprocessing is performed on the input voice. The text feature of the target text may be obtained by performing feature extraction on the target text.

For example, it is assumed that a pronunciation of the input voice is "nǐhǎo", and a target text corresponding to "nǐhǎo" may be "nihao". Feature extraction is performed on "nǐhǎo" to obtain a phonetic alphabet feature of the input voice. A text feature of the target text "nihao" may be obtained after feature preprocessing and feature extraction are performed on "nǐhǎo".

It should be understood that the input voice may be sent by the client device 240 to the data collection device 260, or may be read by the data collection device 260 from a storage apparatus, or may be obtained through real-time collection.

Optionally, the data collection device 260 may determine the training data from the phonetic alphabet feature and/or the text feature.

Feature preprocessing performed on the input voice may include processing such as normalization, grapheme-to-phoneme conversion, and rhythm pause prediction. Normalization may be semantic conversion of a non-Chinese character, for example, a number or a symbol in a text, into a Chinese character. Voice-to-word conversion may be predicting pinyin corresponding to each voice, and then generating a Chinese character text sequence of each voice. Rhythm pause prediction may be prediction of an accent mark, a rhythm phrase, a tonal phrase mark, and the like.

Feature preprocessing may be performed by the data collection device 260, or may be performed by the client device 240 or the another device. When the data collection device 260 obtains the input voice, the data collection device 260 may perform feature preprocessing and feature extraction on the input voice, to obtain the text feature of the target text. Alternatively, when the client device 240 obtains the input voice, the client device 240 may perform feature preprocessing on the input voice, to obtain the target text. The data collection device 260 may perform feature extraction on the target text.

The following uses Chinese as an example to describe feature extraction of the input voice.

For example, if the pronunciation of the input voice is "nǐmenhǎo", the following phonetic alphabet feature may be generated:

S_n_i_3_SP0_m_en_0_SP1_h_ao_3_E

In the phonetic alphabet feature of "nǐmenhǎo", "S" may be a sentence start mark or may be understood as a start mark; "E" may be a sentence end mark or may be understood as an end mark; numbers "0", "1", "2", "3", and "4" may be tone marks; "SP0" and "SP1" may be different pause level marks; an initial consonant and a vowel of Chinese pinyin may be used as phonemes; and different phonemes/marks may be separated by using a blank "_". In the example, there may be 13 phonetic alphabet feature elements in the phonetic alphabet feature.

For another example, if a target text corresponding to another input voice is "dajiahao", the following text feature may be generated:

S_d_a_4_SP0_j_ja_1_SP1_h_ao_3_E

In the text feature of "dajiahao", "S" may be a sentence start mark or may be understood as a start mark; "E" may be a sentence end mark or may be understood as an end mark;

numbers "0", "1", "3", and "4" may be tone marks; "SP0" and "SP1" may be different pause level marks; an initial consonant and a vowel of Chinese pinyin may be used as phonemes; and different phonemes/marks may be separated by using a blank "_". In the example, there may be 13 text feature elements in the text feature.

It should be noted that, in this embodiment of this application, there is no limitation on a language type. In addition to the foregoing Chinese example, the language type may alternatively be another language, for example, English, German, or Japanese. In this embodiment of this application, Chinese is mainly used as an example for description.

The following describes a process in which the training device 220 obtains the target model/rule 201 through training based on language training data.

The training device 220 may input the obtained training data to the target model/rule 201. For example, a phonetic alphabet feature result output based on the target model/rule 201 may be compared with a phonetic alphabet feature corresponding to a current input voice, or a text feature result output by the target model/rule 201 may be compared with a text feature corresponding to a current input voice, to complete training of the target model/rule 201.

The target model/rule 201 obtained by the training device 220 through training may be a model built based on a neural network. The neural network herein may be a convolutional neural network CNN), a recurrent neural network ( ), a time recursive neural network (LSTM), a bidirectional time recursive neural network (BLSTM), a deep convolutional neural network (DCNN), or the like. Further, the target model/rule 201 may be implemented based on a self-attention neural network (self-attention neural network). A type of the target model/rule 201 may be, for example, an automatic speech recognition (ASR) model or a natural language processing (NLP) model.

The target model/rule 201 obtained by the training device 220 may be applied to different systems or devices. In the system architecture 200 shown in FIG. 2, the execution device 210 may be provided with an input/output (I/O) interface 212. The execution device 210 can exchange data with an external device of the execution device 210 through the I/O interface 212. As shown in FIG. 2, the "user" may input data to the I/O interface 212 by using the client device 240. For example, the user may input an intermediate prediction result to the I/O interface 212 by using the client device 240, and then the client device 240 sends, to the execution device 210 through the I/O interface 212, the intermediate prediction result obtained through specific processing. The intermediate prediction result may be, for example, the target text corresponding to the input voice.

Optionally, the training device 220 may generate corresponding target models/rules 201 for different targets or different tasks based on different training data. The corresponding target models/rules 201 may be used to implement the foregoing targets or complete the foregoing tasks, to provide a required result for the user.

The execution device 210 may invoke data, code, and the like in a data storage system 250, and may also store data, an instruction, and the like into the data storage system 250.

Optionally, the execution device 210 may further segment the target model/rule 201 obtained by the training device 220, to obtain a submodel/subrule of the target model/rule 201, and separately deploy the obtained submodel/subrule on the client device 240 and the execution device 210. In an example, the execution device 210 may send a personalized submodel of the target model/rule 201 to the client device 240, and the client device 240 deploys the personalized submodel on the device. Optionally, no parameter is updated in a general submodel of the target model/rule 201 in a training process, and therefore no change is made.

For example, the training device 220 may obtain the training data by using the database 230. The training device 220 may train the training data to obtain a voice model. The training device 220 may send, to the execution device 210, the voice model obtained through training, and the execution device 210 divides the voice model, to obtain a personalized voice submodel and a general voice submodel. Alternatively, the training device 220 may first divide the voice model obtained through training, to obtain a personalized voice submodel and a general voice submodel, and send the personalized voice submodel and the general voice submodel to the execution device 210.

Optionally, the target model/rule 201 may be obtained through training based on a basic voice model. In a training process, one part of the target model/rule 201 may be updated, and the other part of the target model/rule 201 may not be updated. An updated part of the target model/rule 201 may correspond to the personalized voice submodel. The non-updated part of the target model/rule 201 may correspond to the general voice submodel. The basic voice model may be pre-trained by the training device 220 by using voices, corpora, and the like of a plurality of persons, or may be an existing voice model.

The client device 240 and a computing module 211 may work cooperatively. The client device 240 and the computing module 211 may process, based on the personalized voice submodel and the general voice submodel, data input to the client device 240 and/or data (for example, the intermediate prediction result from the client device 240) input to the execution device 210. In an example, the client device 240 may process an input user voice, to obtain a phonetic alphabet feature or a text feature corresponding to the user voice. Then, the client device 240 may input the phonetic alphabet feature or the text feature to the computing module 211. In another example, a preprocessing module 213 of the execution device 210 may receive the input voice from the I/O interface 112, and perform feature preprocessing and feature extraction on the input voice, to obtain the text feature of the target text. The preprocessing module 213 may input the text feature of the target text to the computing module 211. The computing module 211 may input the phonetic alphabet feature or the text feature to the target model/rule 201, to obtain an output result (for example, a semantic recognition result or an operation corresponding to a voice instruction) of voice recognition. The computing module 211 may input the output result to the client device 240, so that the client device 240 may perform the corresponding operation to respond to the voice instruction of the user.

The I/O interface 212 may send the input data to a corresponding module of the execution device 210, and may also return the output result to the client device 240, to provide the output result for the user. For example, the I/O interface 212 may send the intermediate prediction result corresponding to the input voice to the computing module 211, and may also return, to the client device 240, the result obtained after voice recognition.

In the system architecture 200 shown in FIG. 2, the user may input the data, for example, the voice or the corpus, to the client device 240, and may view, on the client device 240, the result output by the execution device 210. A specific presentation form may be a specific manner, for example, a sound or a combination of a sound and display. The client device 240 may also be used as a data collection end to store the collected data, for example, the voice or the corpus, into the database 230. Certainly, alternatively, the data may not be collected by the client device 240, but the another device stores the data, for example, the voice or the corpus of the user, and the output result of the I/O interface 212 into the database 230 as new sample data.

In the system architecture 200 shown in FIG. 2, the execution device 210 and the data storage system 250 may be integrated into different devices based on different data processing capabilities of the client device 240. For example, when the client device 240 has a stronger data processing capability, the execution device 210 and the data storage system 250 may be integrated into the client device 240. When the client device 240 has a weaker data processing capability, the execution device 210 and the data storage system 250 may be integrated into a dedicated data processing device. The database 230, the training device 220, and the data collection device 260 in FIG. 2 may be integrated into a dedicated data processing device, or may be disposed on another server on a cloud or a network, or may be separately disposed in the client device 240 and a data processing device.

It should be noted that FIG. 2 is merely the schematic diagram of the system architecture according to this embodiment of this application, and a location relationship between devices, components, modules, and the like shown in FIG. 2 does not constitute any limitation. For example, in FIG. 2, the data storage system 250 is an external memory relative to the execution device 210. In another case, the data storage system 250 may alternatively be disposed in the execution device 210. For another example, in some possible examples, the execution device 210 may be disposed in the client device 240. The general voice submodel of the target model/rule 201 may be a factory voice model of the client device 240. After delivery of the client device 240, the personalized voice submodel of the target model/rule 201 may be updated based on data collected by the client device 240.

Figure 3:
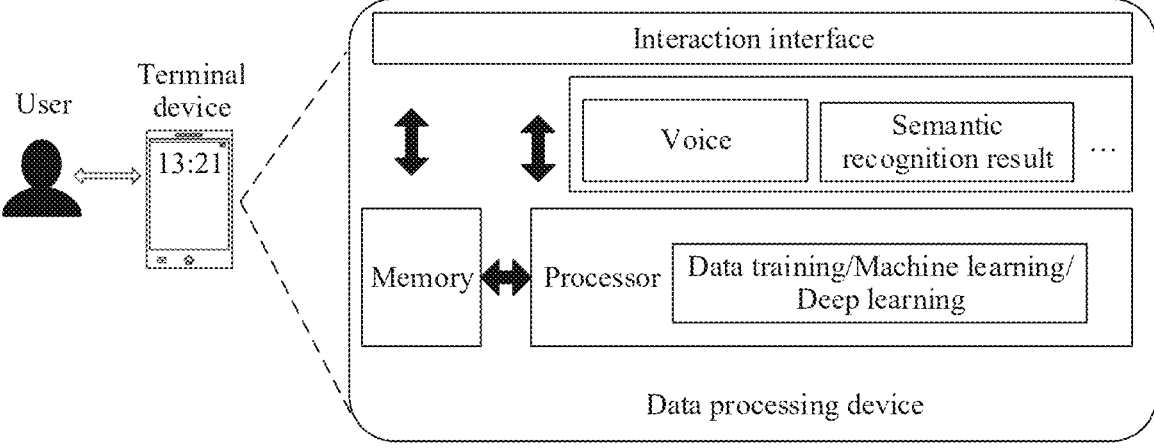
FIG. 3 is a schematic diagram of a voice interaction system.
Figure 4:
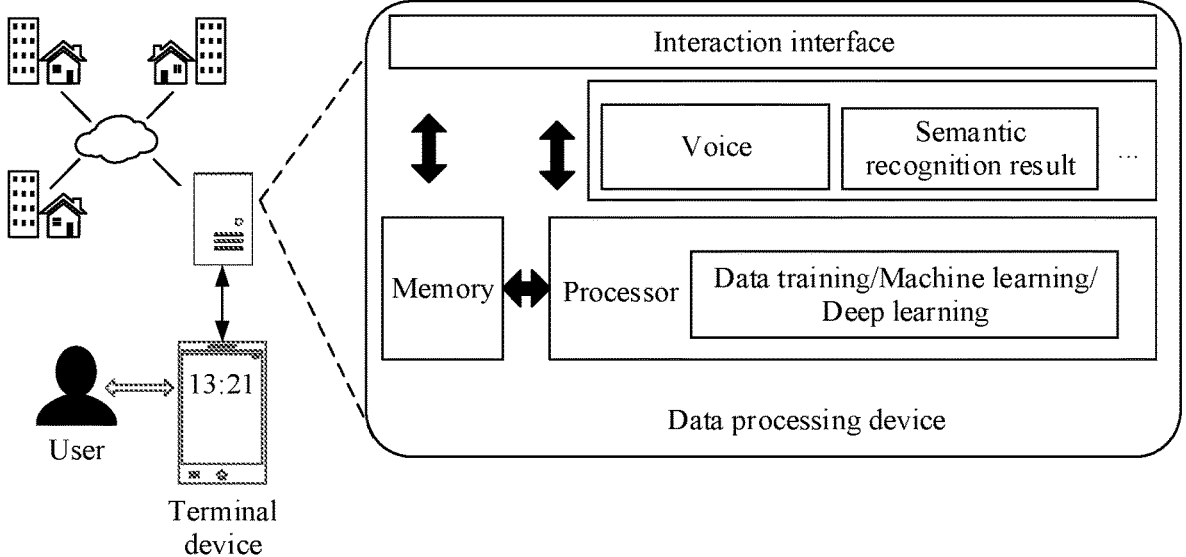
FIG. 4 is a schematic diagram of a voice interaction system.

To better understand the solutions in embodiments of this application, the following first describes some voice interaction systems with reference to FIG. 3 and FIG. 4. FIG. 3 and FIG. 4 may be schematic diagrams of two voice interaction systems.

A voice interaction system 300 shown in FIG. 3 may include at least one first apparatus. The first apparatus may be various types of voice interaction terminals.

In the voice interaction system 300 shown in FIG. 3, the first apparatus may obtain a voice instruction of a user through an interaction interface. The first apparatus may recognize the voice instruction, and obtain a recognition result. The first apparatus may perform a corresponding operation based on the recognition result, to respond to the voice instruction of the user. Optionally, the first apparatus may further perform related processing such as machine learning, deep learning, and model training by using a memory that stores data and a processor that processes data.

There may be a specific correspondence between the voice interaction system 300 shown in FIG. 3 and the voice interaction system 100 shown in FIG. 1. In the voice interaction system 300 shown in FIG. 3, the first apparatus may be, for example, equivalent to the local device 101 or the local device 102 shown in FIG. 1.

There may be a specific correspondence between the voice interaction system 300 shown in FIG. 3 and the system architecture 200 shown in FIG. 2. In the voice interaction system 300 shown in FIG. 3, the first apparatus may be, for example, equivalent to the client device 240 shown in FIG. 2. Optionally, the first apparatus shown in FIG. 3 may have some or all functions of the execution device 210 shown in FIG. 2.

In the voice interaction system 300 shown in FIG. 3, voice recognition may mainly depend on the first apparatus. When the first apparatus has a stronger voice recognition capability, natural language understanding capability, and the like, the first apparatus may usually quickly respond to the voice instruction of the user. This means that the voice interaction system 300 shown in FIG. 3 has a higher requirement on a processing capability of the first apparatus. If the first apparatus has a weaker voice recognition capability, natural language understanding capability, and the like, the first apparatus cannot accurately respond to the voice instruction of the user. Consequently, this may reduce voice interaction experience of the user.

A voice interaction system 400 shown in FIG. 4 may include at least one first apparatus and at least one second apparatus. The first apparatus may be various types of voice interaction terminals. The second apparatus may be a cloud device, for example, a server, that has a voice recognition capability, a natural language understanding capability, and the like.

In the voice interaction system 400 shown in FIG. 4, the first apparatus may receive or obtain a voice of a user. The voice may include a voice instruction of the user. The first apparatus may forward the voice of the user to the second apparatus. The first apparatus may obtain, from the second apparatus, a result obtained after voice recognition. The first apparatus may perform an operation based on the result obtained after voice recognition, to respond to the voice instruction of the user.

In the voice interaction system 400 shown in FIG. 4, the second apparatus may obtain the voice from the first apparatus through an interaction interface, and perform voice recognition on the voice. The second apparatus may further forward, to the first apparatus, the result obtained after voice recognition. A memory shown in FIG. 4 may be a general term, and includes a local storage and a database that stores historical data. The database in FIG. 4 may be on the second apparatus, or may be on another apparatus.

Optionally, both the first apparatus and the second apparatus may perform related processing such as machine learning, deep learning, model training, and voice recognition by using the memory that stores the data and the processor that processes the data.

There may be a specific correspondence between the voice interaction system 400 shown in FIG. 4 and the voice interaction system 100 shown in FIG. 1. In the voice interaction system 400 shown in FIG. 4, the first apparatus may be, for example, equivalent to the local device 101 or the local device 102 shown in FIG. 1. The second apparatus may be, for example, equivalent to the execution device 110 shown in FIG. 1.

There may be a specific correspondence between the voice interaction system 400 shown in FIG. 4 and the system architecture 200 shown in FIG. 2. In the voice interaction system 400 shown in FIG. 4, the first apparatus may be, for example, equivalent to the client device 240 shown in FIG. 2. The second apparatus may be, for example, equivalent to the execution device 210 shown in FIG. 2.

In the voice interaction system 400 shown in FIG. 4, voice recognition may mainly depend on the second apparatus. The first apparatus may perform no processing on the voice, or perform only simple preprocessing on the voice. The voice interaction system 400 shown in FIG. 4 helps reduce a requirement on a processing capability of the first apparatus. However, interaction between the second apparatus and the first apparatus may cause a delay. This may be unfavorable for the first apparatus to quickly respond to the voice instruction of the user, and may further reduce voice interaction experience of the user.

Figure 5:
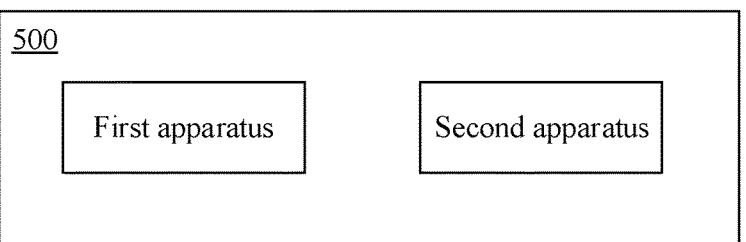
FIG. 5 shows a voice interaction system according to an embodiment of this application.

FIG. 5 shows a voice interaction system 500 according to an embodiment of this application. The voice interaction system 500 may include a first apparatus and a second apparatus.

The first apparatus may be various types of voice interaction devices, for example, a vehicle, a head unit, an on-board computer (On-board PC), a chip (for example, an on-board chip or a voice processing chip), a processor, a mobile phone, a personal computer, a smart band, a tablet computer, a smart camera, a set-top box, a game console, an on-board voice device, an intelligent vehicle, a media consumption device, a smart home device, a smart voice assistant on a wearable device that can make a sound, a smart speaker, or various types of machines or devices that can talk to a person. The first apparatus may be, for example, the local device 101 or the local device 102 shown in FIG. 1, or a unit or module of the local device 101 or the local device 102. The first apparatus may be, for another example, the client device 240 shown in FIG. 2, or a unit or module of the client device 240.

Optionally, for example, the first apparatus may include a semantic recognition module, an operation decision-making module, and a transceiver module.

The semantic recognition module may be configured to recognize voice information from a voice sensor. The voice information may be, for example, an audio directly obtained by the voice sensor, or a processed signal that carries content of the audio. The semantic recognition module may output a semantic recognition result obtained after semantic recognition. The semantic recognition result may be structured information that can reflect voice content of a user. For example, the semantic recognition module may store a voice interaction model, for example, an ASR model or an NLP model. The semantic recognition module may perform semantic recognition on the voice information by using the voice interaction model.

The first transceiver module may be configured to: forward the voice information from the voice sensor to the second apparatus, and obtain, from the second apparatus, a voice analysis result indicated by the second apparatus. For example, the voice analysis result may include a semantic recognition result and/or operation information.

The operation decision-making module may be configured to determine an operation of responding to the user. For example, the operation decision-making module may obtain the semantic recognition result from the semantic recognition module. The operation decision-making module may determine, based on the semantic recognition result, to perform a corresponding operation. For another example, the operation decision-making module may obtain, from the transceiver module, the voice analysis result indicated by the second apparatus, and then determine to perform an operation indicated by the second apparatus. For another example, the operation decision-making module may determine whether an operation of responding to the voice information is indicated by the semantic recognition module or the second apparatus.

The second apparatus may be independent of the first apparatus. For example, the second apparatus may be a remote service platform or a service end. The second apparatus may be implemented by one or more servers. For example, the server may include one or more of servers such as a network server, an application server, a management server, a cloud server, an edge server, and a virtual server (a server virtualized by using a plurality of physical resources). The second apparatus may alternatively be another device that has a voice recognition capability, a natural language understanding capability, and the like, for example, a device that has a data processing function, for example, a head unit, an on-board computer, a chip (for example, an on-board chip or a voice processing chip), a processor, a mobile phone, a personal computer, or a tablet computer. For example, the second apparatus may be the execution device 110 shown in FIG. 1, or a unit or module of the execution device 110. The second apparatus may be, for another example, the execution device 210 shown in FIG. 2, or a unit or module of the execution device 210.

Optionally, for example, the second apparatus may include a second transceiver module and a voice analysis module.

The second transceiver module may be configured to obtain the voice information from the first apparatus. The second transceiver module may be further configured to send, to the first apparatus, the voice analysis result output by the voice analysis module.

The voice analysis module may be configured to obtain, from the second transceiver module, the voice information from the first apparatus, and may perform voice analysis on the voice information. For example, the voice analysis module may store a voice interaction model, an ASR model, and an NLP model. The voice analysis module may perform voice processing on the voice information by using the voice interaction model.

In an example, the voice analysis module may output the semantic recognition result obtained after semantic recognition.

In another example, the voice analysis module may analyze the semantic recognition result, to obtain the operation information corresponding to the voice information. The operation information may indicate an operation performed by the first apparatus. For example, a representation form of the operation information may be an instruction.

Figure 6:
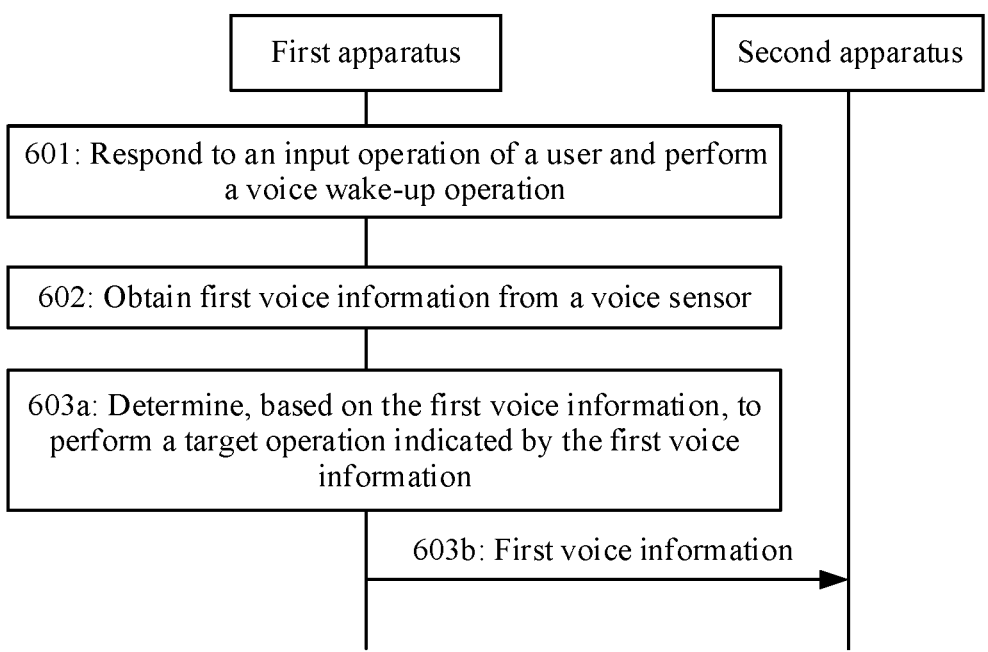
FIG. 6 is a schematic flowchart of a voice interaction method according to an embodiment of this application.

FIG. 6 is a schematic flowchart of a voice interaction method 600 according to an embodiment of this application. For example, the method 600 shown in FIG. 6 may be applied to the voice interaction system 500 shown in FIG. 5.

601: A first apparatus responds to an input operation of a user and performs a voice wake-up operation.

For example, the user may speak a wake-up word to the first apparatus; and the first apparatus may detect the wake-up word that is input by the user, and then wake up a voice interaction function of the first apparatus.

For another example, the user may press a wake-up button to input an operation to the first apparatus; and the first apparatus may detect the input operation performed by the user on the wake-up button, and then wake up a voice interaction function of the first apparatus.

Herein, 601 may be an optional step. Optionally, the first apparatus may include a wake-up module. The wake-up module may be configured to detect the input operation of the user.

602: The first apparatus obtains first voice information from a voice sensor.

The voice sensor may be configured to record a voice of the user. The voice sensor may be an apparatus that has a recording function. For example, the voice sensor may include a microphone.

Optionally, the voice sensor may be, for another example, an apparatus that has a recording function and a data processing capability. For example, the voice sensor may further perform related voice processing on the voice of the user, for example, noise reduction processing, amplification processing, or coding and modulation processing.

In another example, voice processing may alternatively be performed by another module.

For example, the first voice information may be an audio directly obtained by the voice sensor, or a processed signal that carries content of the audio.

In an example, the user speaks a first voice instruction. The first voice instruction indicates the first apparatus to perform a target operation. The first voice instruction may be converted into the first voice information by using the voice sensor, so that the first voice information may indicate the target operation.

603a: The first apparatus determines, based on the first voice information, to perform the target operation indicated by the first voice information.

By analyzing the first voice information, the first apparatus may sense or learn of a specific meaning of the first voice instruction, and then may determine the target operation indicated by the first voice information. Optionally, the first apparatus may perform the target operation to respond to the first voice instruction of the user.

Optionally, that the first apparatus determines, based on the first voice information, to perform the target operation indicated by the first voice information includes: The first apparatus determines a first semantic recognition result based on the first voice information; and the first apparatus determines, based on the first semantic recognition result, to perform a first operation. The first operation may be an operation determined by the first apparatus based on the first voice information. The first operation may correspond to the foregoing target operation.

For example, a process of converting the first voice information into the first semantic recognition result may include: converting the first voice information including the content of the audio into first literal information, and performing semantic extraction on the first literal information, to obtain the structured first semantic recognition result. The first semantic recognition result may include one or more of the following structured information: a function, an intention, and a parameter. The function of the first semantic recognition result may be a specific value of a function result. The function of the first semantic recognition result may represent a type of policy. The function of the first semantic recognition result may also be referred to as a field. The intention may be a specific value of an intention result. The parameter may be a specific value of a slot result.

The following describes, by using an example, a possible method in which the first apparatus determines the first operation based on the first semantic information.

The user may speak the first voice instruction to the first apparatus. The first voice instruction may be converted into the first literal information. For example, the first literal information may be "turn on a device A". For example, the device A may be an air conditioner. A natural meaning of the first literal information may indicate the first operation. However, depending on only the first literal information, the first apparatus usually cannot directly determine a natural meaning of the first voice instruction, and cannot determine an operation indicated by the first voice instruction either.

The first literal information may be converted into the first semantic recognition result, and the first semantic recognition result may indicate the first operation.

In an example, the first semantic recognition result may include a first function, a first intention, and a first parameter. For example, the first function may be a "vehicle control function", the first intention may be "turn on", and the first parameter may be "device A". The first apparatus may determine, based on the first semantic recognition result, that the first operation may be an operation in the vehicle control function, an intention of the first operation may be turning on or starting, and an object to be turned on or started may be the device A.

In an example, the first semantic recognition result may include a first function, a first intention, and a first parameter. For example, the first function may be a "vehicle control function". The first intention may be "turn on a device A". The first parameter may be "void". The first apparatus may determine, based on the first semantic recognition result, that the first operation may be an operation in the vehicle control function, and an intention of the first operation may be turning on the device A or setting the device A to a turned-on state. The first semantic recognition result may not include a specific parameter (for example, a temperature parameter, a timing parameter, or a mode parameter) of the turned-on state of the device A.

In an example, the first semantic recognition result may include a first function and a first parameter. For example, the first function may be a "vehicle control function", and the first parameter may be "device A". The first apparatus may determine, based on the first semantic recognition result, that the first operation may be an operation in the vehicle control function, and an object of the first operation may be the device A.

In an example, the first semantic recognition result may include a first intention and a first parameter. For example, the first function may be that the first intention may be "turn on", and the first parameter may be "device A". The first apparatus may determine, based on the first semantic recognition result, that an intention of the first operation may be turning on or starting, and an object to be turned on or started may be the device A.

In an example, the first semantic recognition result may include a first intention. The first intention may be "turn on a device A". The first apparatus may determine, based on the first semantic recognition result, that an intention of the first operation may be turning on the device A or setting the device A to a turned-on state. The first semantic recognition result may not include a specific parameter (for example, a temperature parameter, a timing parameter, or a mode parameter) of the turned-on state of the device A.

In an example, the first semantic recognition result may include a first parameter. The first parameter may be "device A". The first apparatus may determine, based on the first semantic recognition result, that an object of the first operation may be the device A.

Optionally, that the first apparatus determines, based on the first voice information, to perform the target operation indicated by the first voice information includes: The first apparatus determines the first semantic recognition result based on the first voice information; and the first apparatus determines, based on the first semantic recognition result and a first preset condition, to perform a first operation determined by the first apparatus based on the first semantic recognition result.

In other words, the first apparatus may determine whether the first preset condition is met, and then determine, based on a determining result, whether to perform the first operation determined by the first apparatus based on the first semantic recognition result. For example, when the first semantic recognition result meets the first preset condition, the first apparatus may perform 603a.

603b: The first apparatus sends the first voice information to a second apparatus.

For example, the first apparatus is a mobile phone, and the second apparatus is a server. In other words, the mobile phone may send the first voice information to the server.

For another example, the first apparatus is a mobile phone, and the second apparatus is a mobile phone. In other words, the mobile phone may send the first voice information to the mobile phone.

In a possible manner, the first apparatus sends the first voice information to the second apparatus by using another apparatus. For example, the another apparatus may be a mobile phone.

In an example, 603b and 603a may be synchronously performed or sequentially performed within specific duration. An execution sequence of 603b and 603a may not be limited in this embodiment of this application. Optionally, when the first semantic recognition result meets the first preset condition, the first apparatus may further perform 603b.

Both the first apparatus and the second apparatus may perform semantic recognition on the first voice information.

Optionally, the second apparatus may send a sixth semantic recognition result to the first apparatus based on the first voice information.

In other words, the second apparatus may feed back a recognition result to the first apparatus for the first voice information.

Optionally, the first apparatus and the second apparatus may obtain a same semantic recognition result or different semantic recognition results based on the first voice information. For example, the first apparatus may determine the first semantic recognition result based on the first voice information. The first semantic recognition result may indicate the first operation. The second apparatus may determine the sixth semantic recognition result based on the first voice information. The sixth semantic recognition result may indicate a second operation. At least one of the first operation and the second operation may correspond to the foregoing target operation.

In content related to 603a, some possible examples in which the first apparatus determines the first semantic recognition result based on the first voice information are described. For a manner in which the second apparatus determines the sixth semantic recognition result based on the first voice information, refer to 603a. Details are not described herein again.

Optionally, in addition to a semantic recognition result, the second apparatus may alternatively indicate the target operation to the first apparatus by using target operation information. For example, the target operation information may be represented as operation signaling.

In a possible case, the first apparatus may determine, based on the first semantic recognition result obtained by the first apparatus through analysis, the first operation of responding to the first voice instruction. Optionally, the first apparatus may obtain the sixth semantic recognition result and/or the target operation information from the second apparatus. The sixth semantic recognition result and/or the target operation information may be determined by the second apparatus based on the first voice information. The sixth semantic recognition result may be used to reflect a meaning of the first voice information, and indirectly indicates the first apparatus to perform the second operation. The target operation information may directly indicate the first apparatus to perform the second operation. There may be a delay when the second apparatus feeds back the sixth semantic recognition result and/or the target operation information. Therefore, the first apparatus may obtain the sixth semantic recognition result and/or the target operation information after performing the first operation. The first apparatus may adjust a semantic recognition model, a voice control model, and the like of the first apparatus based on the sixth semantic recognition result and/or the target operation information, to help improve accuracy of outputting a semantic recognition result by the first apparatus, and optimize applicability of an operation of responding to a voice instruction of the user.

Optionally, the first apparatus may discard the sixth semantic recognition result from the second apparatus.

The first apparatus may discard the sixth semantic recognition result after receiving the sixth semantic recognition result. Alternatively, the first apparatus may not receive the sixth semantic recognition result. In other words, if the first apparatus may determine a to-be-performed operation based on the first voice information, the first apparatus may skip or discard a result fed back by the second apparatus based on the first voice information.

In another possible case, before the first apparatus determines the to-be-performed target operation based on the first voice information, the first apparatus may not determine whether the first apparatus has a capability of recognizing voice information. In other words, the first apparatus may not be able to determine, based on the first voice information, the target operation indicated by the first voice information. The first apparatus may send the first voice information to the second apparatus in advance. The second apparatus may recognize and process the first voice information, to obtain the sixth semantic recognition result and/or the target operation information. The sixth semantic recognition result may be used to reflect the meaning of the first voice information, and indirectly indicates the first apparatus to perform the target operation. The target operation information may directly indicate the first apparatus to perform the target operation. If the first apparatus may determine the target operation based on the first voice information, the first apparatus may skip or discard a result fed back by the second apparatus based on the first voice information. If the first apparatus cannot determine the target operation based on the first voice information, because the first apparatus sends the first voice information to the second apparatus in advance, the first apparatus may obtain the sixth semantic recognition result and/or the target operation information from the second apparatus relatively more quickly. Therefore, this helps shorten duration within which the first apparatus responds to a user instruction.

In another example, only one of 603b and 603a is performed by the first apparatus.

In other words, the first apparatus may determine that only one of the following is performed: The first apparatus determines the to-be-performed first operation based on the first voice information, and the first apparatus determines the to-be-performed second operation based on a result fed back by the second apparatus.

For example, in a voice interaction scenario that the first apparatus is relatively good at, the first apparatus may determine an operation corresponding to a voice instruction of the user, without using information provided by the second apparatus. This helps improve efficiency of responding to the voice instruction of a user by the first apparatus. In addition, the first apparatus may choose not to send the first voice information to the second apparatus. This helps reduce a quantity of signaling transmitted by the first apparatus. In a voice interaction scenario that the first apparatus is relatively not good at, the first apparatus may determine, based on information provided by the second apparatus, an operation corresponding to a voice instruction of the user. This helps improve accuracy of responding to the voice instruction of the user by the first apparatus.

Optionally, the first apparatus determines the first semantic recognition result based on the first voice information. The first apparatus determines, based on the first semantic recognition result and the first preset condition, to perform a second operation indicated by the second apparatus.

The first apparatus may determine whether the first preset condition is met, and then determine, based on a determining result, whether to perform the second operation indicated by the second apparatus. For example, when the first semantic recognition result does not meet the first preset condition, the first apparatus may perform 603b, and does not perform 603a. When the first semantic recognition result meets the first preset condition, the first apparatus may perform 603a, and does not perform 603b.

The following describes, by using some examples, how the first apparatus determines, based on the first semantic recognition result and the first preset condition, whether to perform the first operation determined by the first apparatus based on the first semantic recognition result or perform the second operation indicated by the second apparatus.

Optionally, when the first semantic recognition result meets the first preset condition, the first apparatus may determine to perform the first operation determined by the first apparatus based on the first semantic recognition result.

When the first semantic recognition result meets the first preset condition, the first apparatus may determine, based on the first semantic recognition result, to perform the corresponding operation, so that the first apparatus can respond to the voice instruction of the user.

Optionally, when the first semantic recognition result does not meet the first preset condition, it is determined to perform the second operation indicated by the second apparatus.

When the first semantic recognition result does not meet the first preset condition, the first apparatus may determine a to-be-performed operation according to the indication of the second apparatus, so that the first apparatus can respond to the voice instruction of the user. In a possible example, the second apparatus may indicate the second operation to the first apparatus by using a semantic recognition result and/or operation information.

Optionally, the determining, based on the first semantic recognition result and the first preset condition, to perform a second operation indicated by the second apparatus includes: when the first semantic recognition result does not meet the first preset condition, obtaining the sixth semantic recognition result from the second apparatus, where the sixth semantic recognition result indicates the second operation; and determining, based on the sixth semantic recognition result, to perform the second operation.

The second apparatus may recognize the first voice information, to obtain the sixth semantic recognition result. The second apparatus may indirectly indicate, to the first apparatus by using the sixth semantic recognition result, the second operation to be performed by the first apparatus, so that the first apparatus can respond to the voice instruction of the user. In other words, the first apparatus may determine, based on the sixth semantic recognition result, that an operation to be performed by the first apparatus is the second operation.

Optionally, that the first semantic recognition result meets the first preset condition means that the function included in (corresponding to or indicated by) the first semantic recognition result is a function that has a priority processing level and that is preset on the first apparatus. A plurality of functions may be preset on the first apparatus. When a first function included in (corresponding to or indicated by) the first semantic recognition result belongs to the plurality of functions, the first semantic recognition result meets the first preset condition. An example in which the plurality of preset functions are a first semantic recognition list is used for description. Another form of the plurality of preset functions is similar to the first semantic recognition list. The method further includes: The first apparatus obtains the first semantic recognition list. The first semantic recognition list includes the plurality of functions. That the first semantic recognition result meets the first preset condition includes: The first semantic recognition result includes the first function, and the first function belongs to the plurality of functions.

Optionally, that the first semantic recognition result does not meet the first preset condition means that the function included in (corresponding to or indicated by) the first semantic recognition result is not a function that has a priority processing level and that is preset on the first apparatus. A plurality of functions may be preset on the first apparatus. When a first function included in (corresponding to or indicated by) the first semantic recognition result does not belong to the plurality of functions, the first semantic recognition result does not meet the first preset condition. An example in which the plurality of preset functions are a first semantic recognition list is used for description. Another form of the plurality of preset functions is similar to the first semantic recognition list. The method further includes: The first apparatus obtains the first semantic recognition list. The first semantic recognition list includes the plurality of functions. That the first semantic recognition result does not meet the first preset condition includes: The first semantic recognition result includes the first function, and the first function does not belong to the plurality of functions.

In other words, the first apparatus may perform semantic recognition on the first voice information, to obtain the first semantic recognition result. The first semantic recognition result may include the first function. The first apparatus may search for the first function in the first semantic recognition list. In an example, if the first semantic recognition list includes the first function, the first apparatus may determine that the first semantic recognition result meets the first preset condition. Then, the first apparatus may determine to perform the first operation determined by the first apparatus based on the first semantic recognition result. In another example, if the first semantic recognition list does not include the first function, the first apparatus may determine that the first semantic recognition result does not meet the first preset by the second apparatus.

For example, the first semantic recognition list may be a list prestored on the first apparatus. For example, the first semantic recognition list may include a plurality of functions supported by the first apparatus. The first apparatus may have a stronger semantic recognition capability for the plurality of functions in the first semantic recognition list. The first apparatus may have a weaker semantic recognition capability for another function that is not in the first semantic recognition list. If the first function is included in the first semantic recognition list, it may mean that accuracy of the first semantic recognition result is higher. If the first function is not included in the first semantic recognition list, it may mean that accuracy of the first semantic recognition result is lower.

For example, the plurality of functions in the first semantic recognition list may include the "vehicle control function". In other words, for the "vehicle control function", a semantic recognition capability of the first apparatus may be better. For example, the first literal information may be "turn on a device A". The first literal information may indicate the "vehicle control function". The first semantic recognition result may include the first function, and the first function may be the "vehicle control function". The first apparatus may determine, based on the first semantic recognition list and the first semantic recognition result, that the first semantic recognition result meets the first preset condition, and determine to perform the first operation determined by the first apparatus based on the first semantic recognition result.

For another example, the plurality of functions in the first semantic recognition list may include a "local translation function", but do not include a "cloud translation function". In other words, for the "local translation function", a semantic recognition capability of the first apparatus may be better. For the "cloud translation function", a semantic recognition capability of the first apparatus may be poorer (for example, the first apparatus may not be able to learn a current hot word in time, and implement translation of all foreign languages). For example, the first literal information may be "translate the following content in a foreign language A". The "foreign language A" may not be a foreign language that can be translated by the first apparatus. The first semantic recognition result may include the first function, and the first function may be the "cloud translation function". The first apparatus may determine, based on the first semantic recognition list and the first semantic recognition result, that the first semantic recognition result does not meet the first preset condition. Optionally, the first apparatus may determine to perform the second operation indicated by the second apparatus.

Optionally, that the first semantic recognition result meets the first preset condition means that the intention included in (corresponding to or indicated by) the first semantic recognition result is an intention that has a priority processing level and that is preset on the first apparatus. A plurality of intentions may be preset on the first apparatus. When a first intention included in (corresponding to or indicated by) the first semantic recognition result belongs to the plurality of intentions, the first semantic recognition result meets the first preset condition. An example in which the plurality of preset intentions are a second semantic recognition list is used for description. Another form of the plurality of preset intentions is similar to the second semantic recognition list. The method further includes: The first apparatus obtains the second semantic recognition list. The second semantic recognition list includes the plurality of intentions. That the first semantic recognition result meets the first preset condition includes: The first semantic recognition result includes the first intention, and the first intention belongs to the plurality of intentions.

Optionally, that the first semantic recognition result does not meet the first preset condition means that the intention included in (corresponding to or indicated by) the first semantic recognition result is not an intention that has a priority processing level and that is preset on the first apparatus. A plurality of intentions may be preset on the first apparatus. When a first intention included in (corresponding to or indicated by) the first semantic recognition result does not belong to the plurality of intentions, the first semantic recognition result does not meet the first preset condition. An example in which the plurality of preset intentions are a second semantic recognition list is used for description. Another form of the plurality of preset intentions is similar to the second semantic recognition list. The method further includes: The first apparatus obtains the second semantic recognition list. The second semantic recognition list includes the plurality of intentions. That the first semantic recognition result does not meet the first preset condition includes: The first semantic recognition result includes the first intention, and the first intention does not belong to the plurality of intentions.

The first apparatus may perform semantic recognition on the first voice information, to obtain the first semantic recognition result. The first semantic recognition result may include the first intention. The first apparatus may search for the first intention in the second semantic recognition list. In an example, if the second semantic recognition list includes the first intention, the first apparatus may determine that the first semantic recognition result meets the first preset condition. Then, the first apparatus may determine to perform the first operation determined by the first apparatus based on the first semantic recognition result. In another example, if the second semantic recognition list does not include the first intention, the first apparatus may determine that the first semantic recognition result does not meet the first preset by the second apparatus.

For example, the second semantic recognition list may be a list prestored on the first apparatus. For example, the second semantic recognition list may include a plurality of intentions supported by the first apparatus. The first apparatus may have a stronger semantic recognition capability for the plurality of intentions in the second semantic recognition list. The first apparatus may have a weaker semantic recognition capability for another intention that is not in the second semantic recognition list. If the first intention is included in the second semantic recognition list, it may mean that accuracy of the first semantic recognition result is higher. If the first intention is not included in the second semantic recognition list, it may mean that accuracy of the first semantic recognition result is lower.

For example, the plurality of intentions in the second semantic recognition list may include "turn on a device A". In other words, for the intention "turn on a device A", a semantic recognition capability of the first apparatus may be better. For example, the first literal information may be "turn on a device A". The first literal information may indicate "turn on a device A". The first semantic recognition result may include the first intention. The first intention may be "turn on a device A". The first apparatus may determine, based on the second semantic recognition list and the first semantic recognition result, that the first semantic recognition result meets the first preset condition, and determine to perform the first operation determined by the first apparatus based on the first semantic recognition result.

For another example, the plurality of intentions in the second semantic recognition list may include a "local audio playing intention", but do not include a "cloud audio playing intention". In other words, for the "local audio playing intention", a semantic recognition capability of the first apparatus may be better (for example, the first apparatus may identify, based on locally stored audio data, an audio resource indicated in a voice instruction). For the "cloud audio playing intention", a semantic recognition capability of the first apparatus may be poorer (for example, the first apparatus may not support a capability of identifying cloud audio data). For example, the first literal information may be "start to play from one minute of a song A". The "song A" may belong to the cloud audio data. The first semantic recognition result may include the first intention. The first intention may be "play the song A". The first apparatus may determine, based on the second semantic recognition list and the first semantic recognition result, that the first semantic recognition result does not meet the first preset condition. Optionally, the first apparatus may determine to perform the second operation indicated by the second apparatus.

Optionally, that the first semantic recognition result meets the first preset condition means that the parameter included in (corresponding to or indicated by) the first semantic recognition result indicates information, for example, a function, an intention, a scenario, a device, or a location that has a priority processing level and that is preset on the first apparatus. A plurality of parameters may be preset on the first apparatus. When a first parameter included in the first semantic recognition result belongs to the plurality of parameters, the first semantic recognition result meets the first preset condition. An example in which the plurality of preset parameters are a third semantic recognition list is used for description. Another form of the plurality of preset parameters is similar to the third semantic recognition list. The method further includes: The first apparatus obtains the third semantic recognition list. The third semantic recognition list includes the plurality of parameters. That the first semantic recognition result meets the first preset condition includes: The first semantic recognition result includes the first parameter, and the first parameter belongs to the plurality of parameters.

Optionally, that the first semantic recognition result does not meet the first preset condition means that the parameter included in (corresponding to or indicated by) the first semantic recognition result indicates information, for example, a function, an intention, a scenario, a device, or a location that does not have a priority processing level and that is preset on the first apparatus. A plurality of parameters may be preset on the first apparatus. When a first parameter included in the first semantic recognition result does not belong to the plurality of parameters, the first semantic recognition result does not meet the first preset condition. An example in which the plurality of preset parameters are a third semantic recognition list is used for description. Another form of the plurality of preset parameters is similar to the third semantic recognition list. The method further includes: The first apparatus obtains the third semantic recognition list. The third semantic recognition list includes the plurality of parameters. That the first semantic recognition result does not meet the first preset condition includes: The first semantic recognition result includes the first parameter, and the first parameter does not belong to the plurality of parameters.

The first apparatus may perform semantic recognition on the first voice information, to obtain the first semantic recognition result. The first semantic recognition result may include the first parameter. The first apparatus may search for the first parameter in the third semantic recognition list. In an example, if the third semantic recognition list includes the first parameter, the first apparatus may determine that the first semantic recognition result meets the first preset condition. Then, the first apparatus may determine to perform the first operation determined by the first apparatus based on the first semantic recognition result. In another example, if the third semantic recognition list does not include the first parameter, the first apparatus may determine that the first semantic recognition result does not meet the first preset condition. Then, the first apparatus may determine to perform the second operation indicated by the second apparatus.

For example, the third semantic recognition list may be a list prestored on the first apparatus. For example, the third semantic recognition list may include a plurality of parameters supported by the first apparatus. The first apparatus may have a stronger semantic recognition capability for the plurality of parameters in the third semantic recognition list. The first apparatus may have a weaker semantic recognition capability for another parameter that is not in the third semantic recognition list. If the first parameter is included in the third semantic recognition list, it may mean that accuracy of the first semantic recognition result is higher. If the first parameter is not included in the third semantic recognition list, it may mean that accuracy of the first semantic recognition result is lower.

For example, the plurality of parameters in the third semantic recognition list may include "device A". In other words, for the parameter "device A", a semantic recognition capability of the first apparatus may be better. For example, the first literal information may be "turn on the device A". The first literal information may indicate "device A". The first semantic recognition result may include the first parameter. The first parameter may be "device A". The first apparatus may determine, based on the third semantic recognition list and the first semantic recognition result, that the first semantic recognition result meets the first preset condition, and determine to perform the first operation determined by the first apparatus based on the first semantic recognition result.

For another example, the plurality of parameters in the third semantic recognition list may not include a "location A". In other words, for the parameter "location A", a semantic recognition capability of the first apparatus may be poorer. For example, the first literal information may be "navigate to a location B via the location A". The first semantic recognition result may include the first parameter. The first parameter may be the "location A". The first apparatus may determine, based on the third semantic recognition list and the first semantic recognition result, that the first semantic recognition result does not meet the first preset condition. Optionally, the first apparatus may determine to perform the second operation indicated by the second apparatus.

The plurality of foregoing implementations of determining whether the first semantic recognition result meets the first preset condition may be independently used as implementation means, or may be combined as an implementation means. For example, optionally, that the first semantic recognition result meets the first preset condition may include at least two of the following: The first semantic recognition result includes the first function, and the first function belongs to the first semantic recognition list; the first semantic recognition result includes the first intention, and the first intention belongs to the second semantic recognition list; and the first semantic recognition result includes the first parameter, and the first parameter belongs to the third semantic recognition list.

For example, the first function of the first semantic recognition result is the "vehicle control function", the first intention of the first semantic recognition result is "turn on", and the first parameter of the first semantic recognition result is "device A". When the "vehicle control function" belongs to the first semantic recognition list, "turn on" belongs to the second semantic recognition list, and "device A" belongs to the third semantic recognition list, the first semantic recognition result may meet the first preset condition.

In a possible example, for example, the first semantic recognition list, the second semantic recognition list, and the third semantic recognition list may be three lists that are independent of each other.

In another possible example, at least two of the first semantic recognition list, the second semantic recognition list, and the third semantic recognition list may be from a same list. For example, the first semantic recognition list, the second semantic recognition list, and the third semantic recognition list may belong to a general table. For example, the general table may include a plurality of sublists. For example, the first semantic recognition list, the second semantic recognition list, and the third semantic recognition list may be three sublists of the general table.

Optionally, the first semantic recognition list further includes a plurality of intentions corresponding to the first function. That the first semantic recognition result meets the first preset condition further includes: The first semantic recognition result further includes a first intention, and the first intention belongs to the plurality of intentions.

Optionally, the first semantic recognition list further includes a plurality of intentions corresponding to the first function. That the first semantic recognition result does not meet the first preset condition further includes: The first semantic recognition result further includes a first intention, and the first intention does not belong to the plurality of intentions.

The intention corresponding to the first function is usually not unlimited. For example, a navigation function may correspond to an intention, for example, a path planning intention or a voice packet intention. The navigation function usually does not correspond to a hardware starting intention or a hardware disabling intention. For another example, an audio function may correspond to an audio playing intention or a lyric intention. The audio function usually does not correspond to an intention, for example, path planning. The first apparatus may pre-record a correspondence between the plurality of functions and the plurality of intentions in the first semantic recognition list.

If the first semantic recognition list indicates that the first function of the first semantic recognition result corresponds to the first intention, the first semantic recognition list may meet the first preset condition.

If both the first function and the first intention of the first semantic recognition result belong to the first semantic recognition list, but there is no correspondence between the first intention and the first function in the first semantic recognition list, it may be determined that the first semantic recognition result does not meet the first preset condition.

If one or more of the first function and the first intention of the first semantic recognition result do not belong to the first semantic recognition list, it may be determined that the first semantic recognition result does not meet the first preset condition.

For example, the first function of the first semantic recognition result is the "vehicle control function", and the first intention of the first semantic recognition result is "turn on a device A". When both the "vehicle control function" and "turn on a device A" belong to the first semantic recognition list, and "turn on a device A" in the first semantic recognition list corresponds to the "vehicle control function", the first semantic recognition result may meet the first preset condition. The first apparatus may determine to perform the first operation determined by the first apparatus based on the first semantic recognition result.

For another example, the first function of the first semantic recognition result is the "navigation function", and the first intention of the first semantic recognition result is "play a song A". A title of the "song A" and a place name of a "location A" may be the same in literal. In other words, a same literal may represent different meanings. The plurality of functions of the first semantic recognition list may include the "navigation function", and the plurality of intentions of the first semantic recognition list may include "play the song A". However, in the first semantic recognition list, the "navigation function" does not correspond to "play the song A". In the first semantic recognition list, the "navigation function" may correspond to "via the location A", a "destination location A", a "departure location A", or the like. In the first semantic recognition list, the "audio function" may correspond to "play a song A", or the like. Therefore, it may be determined that the first semantic recognition result does not meet the first preset condition. Optionally, the first apparatus may determine to perform the second operation indicated by the second apparatus.

For another example, the first function of the first semantic recognition result is the "vehicle control function", and the first intention of the first semantic recognition result is "turn on an apparatus B". The plurality of functions in the first semantic recognition list may include the "vehicle control function", and the plurality of intentions in the first semantic recognition list may not include "turn on an apparatus B" (for example, no apparatus B is disposed in a vehicle). Therefore, it may be determined that the first semantic recognition result does not meet the first preset condition. Optionally, the first apparatus may determine to perform the second operation indicated by the second apparatus.

Optionally, the first semantic recognition list further includes a plurality of parameters corresponding to the first function. That the first semantic recognition result meets the first preset condition further includes: The first semantic recognition result further includes a first parameter, and the first parameter belongs to the plurality of parameters.

Optionally, the first semantic recognition list further includes a plurality of parameters corresponding to the first function. That the first semantic recognition result does not meet the first preset condition further includes: The first semantic recognition result further includes a first parameter, and the first parameter does not belong to the plurality of parameters.

The parameter corresponding to the first function is usually not unlimited. For example, a navigation function may correspond to a parameter, for example, a location. The navigation function usually does not correspond to a parameter, for example, an audio playing mode. For another example, an audio function may correspond to a parameter, for example, a singer or a song. The audio function usually does not correspond to a parameter, for example, a temperature. The first apparatus may pre-record a correspondence between the plurality of functions and the plurality of parameters in the first semantic recognition list.

If the first semantic recognition list indicates that the first function of the first semantic recognition result corresponds to the first parameter, the first semantic recognition list may meet the first preset condition.

If both the first function and the first parameter of the first semantic recognition result belong to the first semantic recognition list, but there is no correspondence between the first parameter and the first function in the first semantic recognition list, it may be determined that the first semantic recognition result does not meet the first preset condition.

If one or more of the first function and the first parameter of the first semantic recognition result do not belong to the first semantic recognition list, it may be determined that the first semantic recognition result does not meet the first preset condition.

For example, the first function of the first semantic recognition result is a "temperature control function", and the first parameter of the first semantic recognition result is "28° C.". When both the "temperature control function" and "28° C." belong to the first semantic recognition list, and in the first semantic recognition list, the "temperature control function" corresponds to "28° C.", the first semantic recognition result may meet the first preset condition. The first apparatus may determine to perform the first operation determined by the first apparatus based on the first semantic recognition result.

For another example, the first function of the first semantic recognition result is an "audio function", and the first parameter of the first semantic recognition result is "high-definition playing". The plurality of functions in the first semantic recognition list may include the "audio function", and the plurality of parameters in the first semantic recognition list may include "high-definition playing". However, in the first semantic recognition list, the "audio function" does not correspond to "high-definition playing". In the first semantic recognition list, the "audio function" may correspond to "standard playing", "high-quality playing", or "lossless playing". In the first semantic recognition list, the "audio function" may correspond to "standard-definition playing", "high-definition playing", "ultra-high-definition playing", "Blu-ray playing", or the like. Therefore, it may be determined that the first semantic recognition result does not meet the first preset condition. Optionally, the first apparatus may determine to perform the second operation indicated by the second apparatus.

For another example, the first function of the first semantic recognition result is a "playing function", and the first parameter of the first semantic recognition result is "a singer A". The plurality of functions in the first semantic recognition list may include the "playing function", and the plurality of parameters in the first semantic recognition list may not include the "singer A" (for example, the first apparatus has not played a song of the singer A). Therefore, it may be determined that the first semantic recognition result does not meet the first preset condition. Optionally, the first apparatus may determine to perform the second operation indicated by the second apparatus.

Optionally, that the first semantic recognition result meets the first preset condition further includes: In the first semantic recognition list, the first parameter corresponds to the first intention.

Optionally, that the first semantic recognition result does not meet the first preset condition further includes: In the first semantic recognition list, the first parameter does not correspond to the first intention.

There may be a correspondence between the first function and the first intention, there may be a correspondence between the first function and the first parameter, and there may also be a correspondence between the first intention and the first parameter.

For example, the first function of the first semantic recognition result is the "vehicle control function", the first intention of the first semantic recognition result is "turn on an air conditioner", and the first parameter of the first semantic recognition result is "28° C.". When the "vehicle control function", "turn on an air conditioner", and "28° C." all belong to the first semantic recognition list, and in the first semantic recognition list, the "vehicle control function" corresponds to "turn on an air conditioner" and "turn on an air conditioner" corresponds to "28° C.", the first semantic recognition result may meet the first preset condition. The first apparatus may determine to perform the first operation determined by the first apparatus based on the first semantic recognition result.

For another example, the first function of the first semantic recognition result is the "vehicle control function", the first intention of the first semantic recognition result is "turn on an air conditioner", and the first parameter of the first semantic recognition result is "5° C.". The plurality of functions in the first semantic recognition list may include the "vehicle control function". The plurality of parameters in the first semantic recognition list may include "turn on an air conditioner". The plurality of parameters in the first semantic recognition list may include "5° C.". In the first semantic recognition list, the "vehicle control function" may correspond to "turn on an air conditioner", and the "vehicle control function" may correspond to "5° C.". However, in the first semantic recognition list, "turn on an air conditioner" may not correspond to "5° C.". In the first semantic recognition list, for example, "turn on an air conditioner" may correspond to a temperature value of 17° C. to 30° C., and "5° C." may exceed an adjustable temperature range of the air conditioner. In the first semantic recognition list, for example, "turn on an on-board refrigerator" may correspond to "5° C.". Therefore, it may be determined that the first semantic recognition result does not meet the first preset condition. Optionally, the first apparatus may determine to perform the second operation indicated by the second apparatus.

Optionally, the second semantic recognition list further includes a plurality of parameters corresponding to the first intention. That the first semantic recognition result meets the first preset condition further includes: The first semantic recognition result further includes a first parameter, and the first parameter belongs to the plurality of parameters.

Optionally, the second semantic recognition list further includes a plurality of parameters corresponding to the first intention. That the first semantic recognition result does not meet the first preset condition further includes: The first semantic recognition result further includes a first parameter, and the first parameter does not belong to the plurality of parameters.

The parameter corresponding to the first intention is usually not unlimited. For example, a hardware starting intention may correspond to a parameter, for example, a hardware identifier. The hardware starting intention usually does not correspond to a parameter, for example, a location. For another example, a path planning intention may correspond to a parameter, for example, a location. The path planning intention usually does not correspond to a parameter, for example, a song. The first apparatus may pre-record a correspondence between the plurality of intentions and the plurality of parameters in the second semantic recognition list.

If the second semantic recognition list indicates that the first intention of the first semantic recognition result corresponds to the first parameter, the second semantic recognition list may meet the first preset condition.

If both the first intention and the first parameter of the first semantic recognition result belong to the second semantic recognition list, but there is no correspondence between the first parameter and the first intention in the second semantic recognition list, it may be determined that the first semantic recognition result does not meet the first preset condition.

If one or more of the first intention and the first parameter of the first semantic recognition result do not belong to the second semantic recognition list, it may be determined that the first semantic recognition result does not meet the first preset condition.

For example, the first intention of the first semantic recognition result is "turn on a device A", and the first parameter of the first semantic recognition result is "1 hour". When both "turn on a device A" and "1 hour" belong to the second semantic recognition list, and in the second semantic recognition list, "turn on a device A" corresponds to "1 hour", the first semantic recognition result may meet the first preset condition. The first apparatus may determine to perform the first operation determined by the first apparatus based on the first semantic recognition result.

For another example, the first intention of the first semantic recognition result is "play an audio", and the first parameter of the first semantic recognition result is a "photo A". The plurality of intentions in the second semantic recognition list may include "play an audio". The plurality of parameters in the second semantic recognition list may include the "photo A". However, in the second semantic recognition list, "play an audio" may not correspond to the "photo A". In the second semantic recognition list, for example, "play an audio" may correspond to a parameter, for example, a "singer", a "song", or a "playlist". In the second semantic recognition list, for example, the "photo A" may correspond to an intention, for example, "sharing" or "uploading". Therefore, it may be determined that the first semantic recognition result does not meet the first preset condition. Optionally, the first apparatus may determine to perform the second operation indicated by the second apparatus.

For another example, the first intention of the first semantic recognition result is "play a video", and the first parameter of the first semantic recognition result is an "actor A". The plurality of intentions in the second semantic recognition list may include "play a video", and the plurality of parameters in the second semantic recognition list may not include the "actor A" (for example, the first apparatus has not played a movie or television work of the actor A). Therefore, it may be determined that the first semantic recognition result does not meet the first preset condition. Optionally, the first apparatus may determine to perform the second operation indicated by the second apparatus.

Optionally, the first semantic recognition result may indicate at least two of the first function, the first intention, and the first parameter. For example, the first semantic recognition result may indicate the first function and the first parameter. When the first function indicated by the first semantic recognition result and the first parameter indicated by the first semantic recognition result correspond to a same parameter type, the first semantic recognition result meets the first preset condition. When the first function indicated by the first semantic recognition result and the first parameter indicated by the first semantic recognition result correspond to different parameter types, the first semantic recognition result does not meet the first preset condition. For another example, the first semantic recognition result may indicate the first intention and the first parameter. When the first intention indicated by the first semantic recognition result and the first parameter indicated by the first semantic recognition result correspond to a same parameter type, the first semantic recognition result meets the first preset condition. When the first intention indicated by the first semantic recognition result and the first parameter indicated by the first semantic recognition result correspond to different parameter types, the first semantic recognition result does not meet the first preset condition.

When the first function indicated by the first semantic recognition result and the first parameter indicated by the first semantic recognition result correspond to the same parameter type, the first semantic recognition result meets the first preset condition. In an implementation, the third semantic recognition list further indicates that the first parameter corresponds to a first parameter type. The method further includes: obtaining the first semantic recognition list. The first semantic recognition list includes the plurality of functions and a plurality of parameter types corresponding to the plurality of functions. That the first semantic recognition result meets the first preset condition further includes: The first semantic recognition result further includes the first function, the first function belongs to the plurality of functions, and in the first semantic recognition list, the first function corresponds to the first parameter type.

When the first function indicated by the first semantic recognition result and the first parameter indicated by the first semantic recognition result correspond to the different parameter types, the first semantic recognition result does not meet the first preset condition. In an implementation, the third semantic recognition list further indicates that the first parameter corresponds to a first parameter type. The method further includes: obtaining the first semantic recognition list. The first semantic recognition list includes the plurality of functions and a plurality of parameter types corresponding to the plurality of functions. That the first semantic recognition result does not meet the first preset condition further includes: The first semantic recognition result further includes the first function, the first function belongs to the plurality of functions, and in the first semantic recognition list, the first function does not correspond to the first parameter type.

The first apparatus may record the function and one or more corresponding parameter types in advance. A correspondence (or an association relationship) between the plurality of functions and the plurality of parameter types may be stored in the first semantic recognition list.

For example, a parameter type corresponding to the vehicle control function may be duration, a temperature, or a hardware identifier.

For another example, a parameter type corresponding to a temperature control function may be a temperature.

For another example, a parameter type corresponding to the navigation function may be a location or duration.

For another example, a parameter type corresponding to the audio function may be a singer, a song, a playlist, duration, or an audio playing mode.

For another example, a parameter type corresponding to the video function may be a movie, a TV series, an actor, duration, or a video playing mode.

The first apparatus may store the parameter and one or more corresponding parameter types in advance. A correspondence or an association relationship between the plurality of parameters and the plurality of parameter types may be stored in the third semantic recognition list.

For example, a parameter type corresponding to an air conditioner, a camera, a seat, or a vehicle window may be a hardware identifier.

For another example, a parameter type corresponding to 5° C. or 28° C. may be a temperature.

For another example, a parameter type corresponding to 1 hour or 1 minute may be duration.

For another example, a parameter type corresponding to a location A or a location B may be a location.

For another example, a parameter type corresponding to a singer A or a singer B may be a singer.

For another example, a parameter type corresponding to a song A or a song B may be a song.

For another example, a parameter type corresponding to a playlist A or a playlist B may be a playlist.

For another example, a parameter type corresponding to standard playing, high-quality playing, or lossless playing may be an audio playing mode.

For another example, a parameter type corresponding to a movie A or a movie B may be a movie.

For another example, a parameter type corresponding to a TV series A or a TV series B may be a TV series.

For another example, a parameter type corresponding to an actor A or an actor B may be an actor.

For another example, a parameter type corresponding to standard-definition playing, high-definition playing, ultra-high-definition playing, or Blu-ray playing may be a video playing mode.

The user may implement a type of function of the first apparatus by using various types of voice information. For this type of function, a slot in the voice information is usually filled with a limited type of parameter. For example, there may be a plurality of parameters corresponding to one parameter type.

For example, the user may indicate, by using a voice instruction, the first apparatus to perform an operation related to the navigation function. The voice instruction may be converted into a semantic recognition result related to the navigation function. For example, a parameter type corresponding to a slot of the semantic recognition result may be a parameter type, for example, a location or duration. The parameter type corresponding to the slot of the semantic recognition result may not be a temperature, a song, a playlist, an audio playing mode, a movie, a TV series, a video playing mode, or the like.

For another example, the user may indicate, by using a voice instruction, the first apparatus to perform a related operation of the vehicle control function. The voice instruction may be converted into a semantic recognition result related to the vehicle control function. For example, a parameter type corresponding to a slot of the semantic recognition result may be duration, a temperature, or a hardware identifier. The parameter type corresponding to the slot of the semantic recognition result may not be a location, a singer, a song, a playlist, an audio playing mode, a movie, a TV series, an actor, a video playing mode, or the like.

The first semantic recognition result may include the first function and the first parameter.

If the first apparatus obtains in advance that the first parameter corresponds to the first parameter type, and the first function corresponds to the first parameter type, accuracy of analyzing the first voice information by the first apparatus may be higher. In this case, the first apparatus may determine a corresponding operation based on the first semantic recognition result obtained by the first apparatus.

For example, it is assumed that the first semantic recognition list may include the navigation function, and in the first semantic recognition list, a parameter type corresponding to the navigation function may include a location. It is assumed that the third semantic recognition list may include a location A, and in the first semantic recognition list, a parameter type corresponding to the location A may be a location. In a possible scenario, the user may indicate, by using a voice instruction "navigate to the location A", the first apparatus to perform the operation related to the navigation function. The voice instruction may be converted into the first semantic recognition result. The first function of the first semantic recognition result may be the navigation function, and the first parameter of the first semantic recognition result may be the location A. The first apparatus may determine, based on the first semantic recognition list and the third semantic recognition list, that the first semantic recognition result meets the first preset condition. The first apparatus may determine, based on the first semantic recognition result, the first operation to be performed by the first apparatus.

If the first apparatus obtains in advance that the first parameter corresponds to the first parameter type, but the first function does not correspond to the first parameter type, accuracy of analyzing the first voice information by the first apparatus may be lower. For example, a specific meaning of the first parameter may be incorrect. In this case, if the first apparatus determines a corresponding operation only based on the first semantic recognition result obtained by the first apparatus, a response error may occur. The first apparatus may choose to perform an operation indicated by the second apparatus, to respond to the voice instruction of the user.

For example, it is assumed that the first semantic recognition list may include the navigation function, and in the first semantic recognition list, a parameter type corresponding to the navigation function may include a location. It is assumed that the third semantic recognition list may include the song A, and in the first semantic recognition list, a parameter type corresponding to the song A may be a song. The song A may have a same name as the location A, but the location A is not included in the third semantic recognition list. In a possible scenario, the user may indicate, by using a voice instruction "navigate to the location A", the first apparatus to perform the operation related to the navigation function. However, because the location A has the same name as the song A, the first apparatus may recognize the location A as the song A. For example, the first function of the first semantic recognition result may be the navigation function, and the first parameter of the first semantic recognition result may be the song A. The first apparatus may determine, based on the first semantic recognition list and the third semantic recognition list, that the first semantic recognition result does not meet the first preset condition. Optionally, the first apparatus may determine to perform the second operation indicated by the second apparatus.

Optionally, the first apparatus may correct a semantic recognition result. The first apparatus determines a semantic recognition result (referred to as a second semantic recognition result for differentiation) based on the first voice information. The second semantic recognition result indicates a second function and indicates a second parameter (which may be a same parameter as the first parameter). When the plurality of preset functions do not include the second function and the plurality of preset parameters include the second parameter, the second function in the second semantic recognition result is corrected to the first function, to obtain the first semantic recognition result. The first function and the second function are two different functions of a same type.

In an implementation, the determining a first semantic recognition result based on the first voice information includes: determining the second semantic recognition result based on the first voice information, where the second semantic recognition result includes the second function and the first parameter; when the first semantic recognition list does not include the second function, correcting, based on the third semantic recognition list, the second function in the second semantic recognition result to the first function, to obtain the first semantic recognition result, where the first function and the second function are the two different functions of the same type.

The first apparatus may recognize the first voice information, to obtain the second semantic recognition result. For example, the second semantic recognition result may be an initial result obtained after semantic recognition. The second function of the second semantic recognition result does not belong to the first semantic recognition list, which means that the first apparatus may have a weak semantic recognition capability for the second function.

However, for example, the first apparatus may have a learning capability and a training capability. For example, the first apparatus may learn, for a plurality of times, a voice instruction related to the second function, to gradually improve a semantic recognition capability for the second function. Some voice instructions related to the second function may not be recognized by the first apparatus at first. However, with learning and training of the first apparatus for the semantic instruction related to the second function, the voice instruction related to the second function may be accurately recognized gradually by the first apparatus. In addition, a quantity of voice instructions that are related to the second function and that are accurately recognized by the first apparatus may gradually increase.

In a possible scenario, parameter types corresponding to the second function may be diversified, and the first apparatus may not be able to reserve all parameters corresponding to the second function. In other words, a probability that the first voice information indicating the second function can be accurately recognized by the first apparatus may be low. However, if the first parameter belongs to the third semantic recognition list, it means that the first apparatus may have learned the first parameter in advance. In this case, the first apparatus may modify the second function in the second semantic recognition result to the first function, to obtain the first semantic recognition result. The first semantic recognition result may be a corrected semantic recognition result.

It should be noted that the first function and the second function should be the two different functions of the same type.

For example, the first function may be a local translation function, and the second function may be a cloud translation function. Both the first function and the second function may be functions of a translation type.

For another example, the first function may be a local navigation function, and the second function may be a cloud navigation function. Both the first function and the second function may be functions of a navigation type.

For another example, the first function may be a local audio function, and the second function may be a cloud audio function. Both the first function and the second function may be functions of an audio playing type.

For another example, the first function may be a local video function, and the second function may be a cloud video function. Both the first function and the second function may be functions of a video playing type.

For example, it is assumed that the first semantic recognition list may include the local navigation function, but does not include the cloud navigation function, and in the first semantic recognition list, a parameter type corresponding to the local navigation function may include a location. It is assumed that the third semantic recognition list may include a location A, and in the third semantic recognition list, a parameter type corresponding to the location A may be a location. In a possible scenario, the user may indicate, by using a voice instruction "navigate to the location A", the first apparatus to perform the operation related to the navigation function. The voice instruction may be converted into the second semantic recognition result. The second function of the second semantic recognition result may be the cloud navigation function, and the first parameter of the second semantic recognition result may be the location A. Because the first parameter belongs to the third semantic recognition list (for example, the first apparatus has navigated to the location A), the first apparatus may modify the second function of the second semantic recognition result to the local navigation function, to obtain the first semantic recognition result. The first function of the first semantic recognition result is the local navigation function. Both the local navigation function and the cloud navigation function belong to a navigation type, and the local navigation function and the cloud navigation function may be two different functions. Then, the first apparatus may determine, based on the first semantic recognition list and the third semantic recognition list, whether the first semantic recognition result meets the first preset condition. The local navigation function belongs to the first semantic recognition list, the parameter type corresponding to the local navigation function in the first semantic recognition list includes the location, and the parameter type corresponding to the location A in the third semantic recognition list is the location. Therefore, the first apparatus may determine that the first semantic recognition result meets the first preset condition. The first apparatus may determine, based on the first semantic recognition result, the first operation to be performed by the first apparatus.

When the first intention indicated by the first semantic recognition result and the first parameter indicated by the first semantic recognition result correspond to the same parameter type, the first semantic recognition result meets the first preset condition. In an implementation, the third semantic recognition list further indicates that the first parameter corresponds to a first parameter type. The method further includes: obtaining the second semantic recognition list. The second semantic recognition list includes the plurality of intentions and a plurality of parameter types corresponding to the plurality of intentions. That the first semantic recognition result meets the first preset condition further includes: The first semantic recognition result further includes the first intention, the first intention belongs to the plurality of intentions, and in the second semantic recognition list, the first intention corresponds to the first parameter type.

When the first intention indicated by the first semantic recognition result and the first parameter indicated by the first semantic recognition result correspond to the different parameter types, the first semantic recognition result does not meet the first preset condition. In an implementation, the third semantic recognition list further indicates that the first parameter corresponds to a first parameter type. The method further includes: obtaining the second semantic recognition list. The second semantic recognition list includes the plurality of intentions and a plurality of parameter types corresponding to the plurality of intentions. That the first semantic recognition result does not meet the first preset condition further includes: The first semantic recognition result further includes the first intention, the first intention belongs to the plurality of intentions, and in the second semantic recognition list, the first intention does not correspond to the first parameter type.

The first apparatus may store the intention and the corresponding parameter type in advance. A correspondence (or an association relationship) between the plurality of intentions and the plurality of parameter types may be stored in the second semantic recognition list.

For example, a parameter type corresponding to the hardware starting intention may be duration, a temperature, or a hardware identifier.

For another example, a parameter type corresponding to the path planning intention may be a location or duration.

For another example, a parameter type corresponding to the audio playing intention may be a singer, a song, a playlist, duration, or an audio playing mode.

For another example, a parameter type corresponding to the video playing intention may be a movie, a TV series, an actor, duration, or a video playing mode.

The first apparatus may record the parameter and the corresponding parameter type in advance. A correspondence or an association relationship between the plurality of parameters and the plurality of parameter types may be stored in the third semantic recognition list. The foregoing has described the correspondence between the plurality of parameters and the plurality of parameter types. Details are not described herein again.

The user may implement a type of intention of the first apparatus by using various types of voice information. For this type of intention, a slot in the voice information is usually filled with a limited type of parameter. For example, there may be a plurality of parameters corresponding to one parameter type.

For example, the user indicates, by using a voice instruction, the first apparatus to perform an operation related to the path planning intention. The voice instruction may be converted into a semantic recognition result related to the path planning intention. For example, a parameter type corresponding to a slot of the semantic recognition result may be a parameter type, for example, a location or duration. The parameter type corresponding to the slot of the semantic recognition result may not be a temperature, a singer, a song, a playlist, an audio playing mode, a movie, a TV series, an actor, a video playing mode, or the like.

For another example, the user indicates, by using a voice instruction, the first apparatus to perform an operation related to the hardware starting intention. The voice instruction may be converted into a semantic recognition result related to the hardware starting intention. For example, a parameter type corresponding to a slot of the semantic recognition result may be duration, a temperature, or a hardware identifier. The parameter type corresponding to the slot of the semantic recognition result may not be a location, a singer, a song, a playlist, an audio playing mode, a movie, a TV series, an actor, a video playing mode, or the like.

The first semantic recognition result may include the first intention and the first parameter.

If the first apparatus obtains in advance that the first parameter corresponds to a first parameter type, and the first intention corresponds to the first parameter type, accuracy of analyzing the first voice information by the first apparatus may be higher. In this case, the first apparatus may determine a corresponding operation based on the first semantic recognition result obtained by the first apparatus.

For example, it is assumed that the second semantic recognition list may include the path planning intention, and in the second semantic recognition list, the parameter type corresponding to the path planning intention may include the location. It is assumed that the third semantic recognition list may include a location A and a location B, and in the second semantic recognition list, parameter types corresponding to the location A and the location B each may be a location. In a possible scenario, the user may indicate, by using a voice instruction "navigate to the location A via the location B", the first apparatus to perform an operation related to the path planning intention. The voice instruction may be converted into the first semantic recognition result. The first intention of the first semantic recognition result may be the path planning intention, and the first parameter of the first semantic recognition result may include the location A and the location B. The first apparatus may determine, based on the second semantic recognition list and the third semantic recognition list, that the first semantic recognition result meets the first preset condition. The first apparatus may determine, based on the first semantic recognition result, the first operation to be performed by the first apparatus.

If the first apparatus obtains in advance that the first parameter corresponds to the first parameter type, but the first intention does not correspond to the first parameter type, accuracy of analyzing the first voice information by the first apparatus may be lower. For example, a specific meaning of the first parameter may be incorrect. In this case, if the first apparatus determines a corresponding operation only based on the first semantic recognition result obtained by the first apparatus, a voice response error may occur. The first apparatus may choose to perform an operation indicated by the second apparatus, to respond to the voice instruction of the user.

For example, it is assumed that the second semantic recognition list may include the audio playing intention, and in the second semantic recognition list, the parameter type corresponding to the navigation intention may include the singer. It is assumed that the third semantic recognition list may include an actor A, and in the second semantic recognition list, a parameter type corresponding to the actor A may be an actor. The actor A may further have a singer identity, and the actor A is not only an actor but also a singer. However, in the third semantic recognition list, the parameter type corresponding to the actor A does not include the singer. In a possible scenario, the user may indicate, by using a voice instruction "play a song of the actor A", the first apparatus to perform an operation related to the audio playing intention. However, because the first apparatus may not be able to recognize the actor A as a singer, the first apparatus may recognize the actor A as an actor. For example, the first intention of the first semantic recognition result may be the audio playing intention, and the first parameter of the first semantic recognition result may be the actor A. The first apparatus may determine, based on the second semantic recognition list and the third semantic recognition list, that the first semantic recognition result does not meet the first preset condition. Optionally, the first apparatus may determine to perform the second operation indicated by the second apparatus.

The first apparatus may correct a semantic recognition result. The first apparatus determines a semantic recognition result (referred to as a third semantic recognition result for differentiation) based on the first voice information. The third semantic recognition result indicates a second intention and indicates a third parameter (which may be a same parameter as the first parameter). When the plurality of preset intentions do not include the second intention and the plurality of preset parameters include the third parameter, the second intention in the second semantic recognition result is corrected to the first intention, to obtain the first semantic recognition result. The first intention and the second intention are two different intentions of a same type.

In an implementation, the determining a first semantic recognition result based on the first voice information includes: determining the third semantic recognition result based on the first voice information, where the third semantic recognition result includes the second intention and the first parameter; when the second semantic recognition list does not include the second intention, correcting, based on the third semantic recognition list, the second intention in the third semantic recognition result to the first intention, to obtain the first semantic recognition result, where the first intention and the second intention are the two different intentions of the same type.

The first apparatus may recognize the first voice information, to obtain the third semantic recognition result. For example, the third semantic recognition result may be an initial result obtained after semantic recognition. The second intention of the third semantic recognition result does not belong to the second semantic recognition list, which means that the first apparatus may have a weak semantic recognition capability for the second intention.

However, for example, the first apparatus may have a learning capability and a training capability. For example, the first apparatus may learn, for a plurality of times, a voice instruction related to the second intention, to gradually improve a semantic recognition capability for the second intention. Some voice instructions related to the second intention may not be recognized by the first apparatus at first. However, with learning and training of the first apparatus for the semantic instruction related to the second intention, the voice instruction related to the second intention may be accurately recognized gradually by the first apparatus. In addition, a quantity of voice instructions that are related to the second intention and that are accurately recognized by the first apparatus may gradually increase.

In a possible scenario, parameter types corresponding to the second intention may be diversified, and the first apparatus may not be able to reserve all parameters corresponding to the second intention. In other words, a probability that the first voice information indicating the second intention can be accurately recognized by the first apparatus may be low. However, if the first parameter belongs to the third semantic recognition list, it means that the first apparatus may have learned the first parameter in advance. In this case, the first apparatus may modify the second intention in the third semantic recognition result to the first intention, to obtain the first semantic recognition result. The first semantic recognition result may be a corrected semantic recognition result.

It should be noted that the first intention and the second intention should be the two different intentions of the same type.

For example, the first intention may be a local English translation intention, and the second intention may be a cloud English translation intention. Both the first intention and the second intention may be intentions of an English translation type.

For another example, the first intention may be a local path planning intention, and the second intention may be a cloud path planning intention. Both the first intention and the second intention may be intentions of a path planning type.

For another example, the first intention may be a local audio playing intention, and the second intention may be a cloud audio playing intension. Both the first intention and the second intention may be intentions of an audio playing type.

For another example, the first intention may be a local video playing intention, and the second intention may be a cloud video playing intention. Both the first intention and the second intention may be intentions of a video playing type.

For example, it is assumed that the second semantic recognition list may include the local audio playing intention, and does not include the cloud audio playing intention, and in the second semantic recognition list, a parameter type corresponding to the local audio playing intention may include a singer. It is assumed that the third semantic recognition list may include a singer A, and in the second semantic recognition list, a parameter type corresponding to the singer A may be a singer. In a possible scenario, the user may indicate, by using a voice instruction "play a song of the singer A", the first apparatus to perform an operation related to the audio playing intention. The voice instruction may be converted into the third semantic recognition result. The second intention of the third semantic recognition result may be the cloud audio playing intention. The first parameter of the third semantic recognition result may be the singer A. Because the first parameter belongs to the third semantic recognition list (for example, the first apparatus has played a song of the singer A), the first apparatus may modify the second intention of the third semantic recognition result to the local audio playing intention, to obtain the first semantic recognition result. The first intention of the first semantic recognition result is the local audio playing intention. Both the local audio playing intention and the cloud audio playing intention belong to an audio playing type, and the local audio playing intention and the cloud audio playing intention may be two different intentions. Then, the first apparatus may determine, based on the second semantic recognition list and the third semantic recognition list, whether the first semantic recognition result meets the first preset condition. The local audio playing intention belongs to the second semantic recognition list, the parameter type corresponding to the local audio playing intention in the second semantic recognition list includes the singer, and the parameter type corresponding to the singer A in the third semantic recognition list is the singer. Therefore, the first apparatus may determine that the first semantic recognition result meets the first preset condition. The first apparatus may determine, based on the first semantic recognition result, the first operation to be performed by the first apparatus.

Optionally, that the first semantic recognition result meets the first preset condition includes: The first semantic recognition result includes a first indicator bit, and the first indicator bit indicates that the first semantic recognition result meets the first preset condition.

Optionally, that the first semantic recognition result does not meet the first preset condition includes: The first semantic recognition result includes a second indicator bit, and the second indicator bit indicates that the first semantic recognition result does not meet the first preset condition.

If the first semantic recognition result carries the first indicator bit, the first apparatus may determine to perform the first operation determined by the first apparatus based on the first semantic recognition result. Specific content of the first indicator bit may include information such as "local" and a "terminal side", to indicate the first apparatus to determine a to-be-performed operation.

If the first semantic recognition result carries the second indicator bit, the first apparatus may determine to perform the second operation indicated by the second apparatus. Specific content of the second indicator bit may include information such as a "cloud" and a "cloud side", to indicate the first apparatus to perform the operation according to the indication of the second apparatus.

Optionally, if the first semantic recognition result does not carry the first indicator bit, and other content of the first semantic recognition result does not meet the first preset condition, the first apparatus may determine to perform the second operation indicated by the second apparatus.

Optionally, if the first semantic recognition result carries the second indicator bit, and other content of the first semantic recognition result does not meet the first preset condition, the first apparatus may determine to perform the first operation determined by the first apparatus based on the first semantic recognition result.

A fourth semantic recognition result may indicate at least two of a first function, a first intention, and a first parameter. For example, the fourth semantic recognition result may indicate the first function and the first parameter. When the first function indicated by the fourth semantic recognition result and the first parameter indicated by the fourth semantic recognition result correspond to a same parameter type, the first semantic recognition result carrying the first indicator bit may be determined. When the first function indicated by the fourth semantic recognition result and the first parameter indicated by the fourth semantic recognition result correspond to different parameter types, the first semantic recognition result carrying the second indicator bit may be determined. For another example, the fourth semantic recognition result may indicate the first intention and the first parameter. When the first intention indicated by the fourth semantic recognition result and the first parameter indicated by the fourth semantic recognition result correspond to a same parameter type, the first semantic recognition result carrying the first indicator bit may be determined. When the first intention indicated by the fourth semantic recognition result and the first parameter indicated by the fourth semantic recognition result correspond to different parameter types, the first semantic recognition result carrying the second indicator bit may be determined.

When the first function indicated by the fourth semantic recognition result and the first parameter indicated by the fourth semantic recognition result correspond to the same parameter type, it may be determined that the first semantic recognition result carries the first indicator bit. In an implementation, the determining a first semantic recognition result based on the first voice information includes: determining the fourth semantic recognition result based on the first voice information, where the fourth semantic recognition result includes the first function and the first parameter; and when a fourth semantic recognition list includes the first function, the fourth semantic recognition list indicates that the first function corresponds to a first parameter type, a third semantic recognition list includes the first parameter, and the third semantic recognition list indicates that the first parameter corresponds to the first parameter type, determining the first semantic recognition result, where the semantic recognition result includes the first indicator bit.

The first apparatus may recognize the first voice information, to obtain the fourth semantic recognition result. For example, the fourth semantic recognition result may be an initial result obtained after semantic recognition. The first function of the fourth semantic recognition result does not belong to a first semantic recognition list, which means that the first apparatus may have a weak semantic recognition capability for the first function.

However, for example, the first apparatus may have a learning capability and a training capability. For example, the first apparatus may learn, for a plurality of times, a voice instruction related to the first function, to gradually improve a semantic recognition capability for the first function. Some voice instructions related to the first function may not be recognized by the first apparatus at first. However, with learning and training of the first apparatus for the semantic instruction related to the first function, the voice instruction related to the first function may be accurately recognized gradually by the first apparatus. In addition, a quantity of voice instructions that are related to the first function and that are accurately recognized by the first apparatus may gradually increase. Optionally, for example, the fourth semantic recognition list may be used to record a function newly learned (or trained or updated) by the first apparatus.

In a possible scenario, parameter types corresponding to the first function may be diversified, and the first apparatus may not be able to reserve all parameters corresponding to the first function. In other words, a probability that the first voice information indicating the first function can be accurately recognized by the first apparatus may be lower. However, if the first parameter belongs to the third semantic recognition list, it means that the first apparatus may have learned the first parameter in advance. In the fourth semantic recognition list, the first function corresponds to the first parameter type, and in the third semantic recognition list, the first parameter corresponds to the first parameter type. Therefore, a probability that the first apparatus accurately recognizes the first voice information is higher. The first apparatus may determine the first semantic recognition result, and indicate, by using the first indicator bit in the first semantic recognition result, that the first semantic recognition result meets the first preset condition. The first semantic recognition result may be a corrected semantic recognition result.

For example, it is assumed that the first semantic recognition list may not include a navigation function, the fourth semantic recognition list may include a navigation function, and in the fourth semantic recognition list, a parameter type corresponding to the navigation function may include a location. It is assumed that the third semantic recognition list may include a location A, and in the third semantic recognition list, a parameter type corresponding to the location A may be a location. In a possible scenario, the user may indicate, by using a voice instruction "navigate to the location A", the first apparatus to perform an operation related to the navigation function. The voice instruction may be converted into the fourth semantic recognition result. The first function of the fourth semantic recognition result may be the navigation function, and the first parameter of the fourth semantic recognition result may be the location A. The location A belongs to the third semantic recognition list (for example, the first apparatus has navigated to the location A), the parameter type corresponding to the location A in the third semantic recognition list is the location, and in the fourth semantic recognition list, the parameter type corresponding to the navigation function includes the location. Therefore, the first apparatus may determine the first semantic recognition result based on the fourth semantic recognition result, the first semantic recognition list, the third semantic recognition list, and the fourth semantic recognition list. The first semantic recognition result may include the first indicator bit. The first apparatus may determine that the first semantic recognition result meets the first preset condition. The first apparatus may determine, based on the first semantic recognition result, the first operation to be performed by the first apparatus.

When the first intention indicated by the fourth semantic recognition result and the first parameter indicated by the fourth semantic recognition result correspond to the same parameter type, the first semantic recognition result carrying the first indicator bit may be determined. In an implementation, the method further includes: obtaining a fifth semantic recognition list, where the fifth semantic recognition list includes a plurality of intentions and a plurality of parameter types corresponding to the plurality of intentions; and obtaining a third semantic recognition list, where the third semantic recognition list includes a plurality of parameters and a plurality of parameter types corresponding to the plurality of intentions. The determining a first semantic recognition result based on the first voice information includes: determining a fifth semantic recognition result based on the first voice information, where the fifth semantic recognition result includes a first intention and a first parameter; and when the fifth semantic recognition list includes the first intention, the fifth semantic recognition list indicates that the first intention corresponds to a first parameter type, the third semantic recognition list includes the first parameter, and the third semantic recognition list indicates that the first parameter corresponds to the first parameter type, determining the first semantic recognition result, where the semantic recognition result includes the first indicator bit.

The first apparatus may recognize the first voice information, to obtain the fifth semantic recognition result. For example, the fifth semantic recognition result may be an initial result obtained after semantic recognition. The first intention of the fifth semantic recognition result does not belong to a second semantic recognition list, which means that the first apparatus may have a weak semantic recognition capability for the first intention.

However, for example, the first apparatus may have a learning capability and a training capability. For example, the first apparatus may learn, for a plurality of times, a voice instruction related to the first intention, to gradually improve a semantic recognition capability for the first intention. Some voice instructions related to the first intention may not be recognized by the first apparatus at first. However, with learning and training of the first apparatus for the semantic instruction related to the first intention, the voice instruction related to the first intention may be accurately recognized gradually by the first apparatus. In addition, a quantity of voice instructions that are related to the first intention and that are accurately recognized by the first apparatus may gradually increase. Optionally, for example, the fifth semantic recognition list may be used to record an intention newly learned (or trained or updated) by the first apparatus.

In a possible scenario, parameter types corresponding to the first intention may be diversified, and the first apparatus may not be able to reserve all parameters corresponding to the first intention. In other words, a probability that the first voice information indicating the first intention can be accurately recognized by the first apparatus may be lower. However, if the first parameter belongs to the third semantic recognition list, it means that the first apparatus may have learned the first parameter in advance. In the fifth semantic recognition list, the first intention corresponds to the first parameter type, and in the third semantic recognition list, the first parameter corresponds to the first parameter type. Therefore, a probability that the first apparatus accurately recognizes the first voice information is higher. The first apparatus may determine the first semantic recognition result, and indicate, by using the first indicator bit in the first semantic recognition result, that the first semantic recognition result meets the first preset condition. The first semantic recognition result may be a corrected semantic recognition result.

For example, it is assumed that the second semantic recognition list may not include an audio playing intention, the fifth semantic recognition list may include the audio playing intention, and in the fifth semantic recognition list, a parameter type corresponding to the audio playing intention may include a singer. It is assumed that the third semantic recognition list may include a singer A, and in the third semantic recognition list, a parameter type corresponding to the singer A may be a singer. In a possible scenario, the user may indicate, by using a voice instruction "navigate to the singer A", the first apparatus to perform an operation related to the audio playing intention. The voice instruction may be converted into the fifth semantic recognition result. The first intention of the fifth semantic recognition result may be the audio playing intention. The first parameter of the fifth semantic recognition result may be the singer A. The singer A belongs to the third semantic recognition list (for example, the first apparatus has navigated to the singer A), the parameter type corresponding to the singer A in the third semantic recognition list is the singer, and in the fifth semantic recognition list, the parameter type corresponding to the audio playing intention includes the singer. Therefore, the first apparatus may determine the first semantic recognition result based on the fifth semantic recognition result, the second semantic recognition list, the third semantic recognition list, and the fifth semantic recognition list. The first semantic recognition result may include the first indicator bit. The first apparatus may determine that the first semantic recognition result meets the first preset condition. The first apparatus may determine, based on the first semantic recognition result, the first operation to be performed by the first apparatus.

In the foregoing example, the third semantic recognition list may include the first parameter, and in the third semantic recognition list, the first parameter may correspond to the first parameter type. In some other possible cases, the third semantic recognition list does not include the first parameter, or in the third semantic recognition list, the first parameter may correspond to another parameter type other than the first parameter type. In this case, the first semantic recognition result obtained by the first apparatus by recognizing the first voice information may be inaccurate. The first apparatus may obtain a sixth semantic recognition result from the second apparatus. The sixth semantic recognition result may be determined by the second apparatus based on the first voice information.

Optionally, the first apparatus may determine the second parameter and a second parameter type based on the sixth semantic recognition result indicated by the second apparatus, and store an association relationship between the second parameter and the second parameter type. In an implementation, the method further includes: determining the second parameter and the second parameter type based on the sixth semantic recognition result; and recording the association relationship between the second parameter and the second parameter type in the third semantic recognition list.

The sixth semantic recognition result may include the second parameter and the second parameter type. The first apparatus may record the association relationship between the second parameter and the second parameter type in the third semantic recognition list. In a subsequent voice interaction process, if the first apparatus encounters a voice instruction related to the second parameter and the second parameter type again, because the third semantic recognition list includes the association relationship between the second parameter and the second parameter type, the first apparatus can more easily and accurately recognize the voice instruction of the user.

Optionally, the method further includes: obtaining N semantic recognition results from the second apparatus. The recording the association relationship between the second parameter and the second parameter type in the third semantic recognition list includes: when each semantic recognition result in the N semantic recognition results includes the second parameter, the second parameter of each semantic recognition result corresponds to the second parameter type, and N is greater than a first preset threshold, recording the association relationship between the second parameter and the second parameter type in the third semantic recognition list.

After the association relationship between the second parameter and the second parameter type appears for a plurality of times, the first apparatus may record the association relationship between the second parameter and the second parameter type in the third semantic recognition list. In other words, the first apparatus may learn the association relationship between the second parameter and the second parameter type for a large quantity of times. For an association relationship between a parameter and a parameter type, single-time voice recognition may have low representativeness. The first apparatus learns the association relationship between the second parameter and the second parameter type for a plurality of times, so that the association relationship between the second parameter and the second parameter type may be accurate or important. This helps improve accuracy of recognizing a voice instruction by the first apparatus.

FIG. 7 is a schematic flowchart of a voice interaction method 700 according to an embodiment of this application. For example, the method 700 shown in FIG. 7 may be applied to the voice interaction system 500 shown in FIG. 5.

701: A first apparatus responds to an input operation of a user and performs a voice wake-up operation.

702: The first apparatus obtains first voice information from a voice sensor.

In a possible example, the first voice information may be indicated by the user in a first round of voice interaction. The first round of voice interaction may be a $1^{st}$ round of voice interaction or a non-Pt round of voice interaction in multi-round voice interaction, and the first round of voice interaction may not be a last round of voice interaction in the multi-round voice interaction.

703: The first apparatus determines a first semantic recognition result based on the first voice information.

704: The first apparatus determines, based on the first semantic recognition result and a first preset condition, to perform a first operation determined by the first apparatus based on the first semantic recognition result, or to perform a second operation indicated by a second apparatus.

For specific implementations of 701 to 704, refer to 601, 602, 603a, and 603b shown in FIG. 6. Details are not described herein again.

Optionally, before and after the first round of voice interaction ends, the first apparatus may perform the first operation or the second operation. In other words, that the first apparatus performs the first operation or the second operation may mean that the first round of voice interaction ends, or mean that a next round of voice interaction starts.

705: The first apparatus obtains second voice information from the voice sensor.

The second voice information may be indicated by the user in a second round of voice interaction. Optionally, the second round of voice interaction may be a next round of voice interaction of the first round of voice interaction.

706: The first apparatus determines a seventh semantic recognition result based on the second voice information.

For specific implementations of 705 and 706, refer to 702 and 703. Details are not described herein again.

Multi-round voice interaction may be applied to a scenario in which there is a large amount of voice interaction information. In a multi-round voice interaction scenario, the user and the first apparatus may perform a voice dialog in a special scenario or a special field. In a possible scenario, the user may not be able to completely implement voice control by using one voice instruction. For example, through voice interaction, the user may control the first apparatus to buy an air ticket from a city A to a city B. However, there may be a large quantity of flights from the city A to the city B. The user may perform voice interaction with the first apparatus for a plurality of times, to finally determine flight information of the air ticket that needs to be bought.

In multi-round voice interaction, two adjacent rounds of voice interaction are usually associated. For example, the first apparatus may ask the user about a time period in which an air ticket of a flight may be preferably bought, and the user may reply to the first apparatus with a time period. For another example, the first apparatus may ask the user about a singer whose work is preferred for listening, and the user may reply to the first apparatus with a name of a singer. In other words, the second voice information may be related to an operation indicated by the first voice information. In this case, the first apparatus may determine to perform an operation indicated by the second voice information, to continue current multi-round voice interaction.

However, a reply of the user may be random. The reply of the user may be unrelated to voice information queried or to be obtained by the first apparatus. For example, the first apparatus asks the user about a time period in which an air ticket of a flight may be preferably bought, but the user replies to the first apparatus with a name of a singer. For another example, the first apparatus asks the user about a time period in which an air ticket of a flight may be preferably bought, but the user replies to the first apparatus that a traffic accident currently occurs.

If the first apparatus completely follows the reply of the user, previous voice interaction content may be discarded, and consequently a quantity of times of controlling the first apparatus by the user may be increased. For example, through multi-round voice interaction, the user may indicate, to the first apparatus, the flight information of the air ticket to be bought and identity information of the user. However, before final payment, the user unintentionally indicates, to the first apparatus, voice information unrelated to a flight, the air ticket, and the like. If the first apparatus ends multi-round voice interaction related to buying of the air ticket, and responds to the indication made by the user unintentionally, this not only does not satisfy an expectation of the user, but also causes the flight information, the identity information, and the like, that are previously indicated by the user, to be discarded. If the user wants to re-buy the air ticket, the user needs to indicate the flight information, the identity information, and the like to the first apparatus again.

If the first apparatus completely ignores the reply of the user, the first apparatus may not be able to respond to an indication of the user in some special scenarios, and a voice instruction of the user is ineffective.

In a process of two adjacent rounds of voice interaction, if two pieces of voice information obtained by the first apparatus are not associated or are weakly associated, or voice information in a next round of voice interaction does not correspond to or is unrelated to an operation in a previous round of voice interaction, the first apparatus may choose, based on a case, whether to end multi-rounds voice interaction. For example, when the first voice information is unrelated to the second voice information or association between the first voice information and the second voice information is less than a second preset threshold, or when the second voice information is not a feedback for the first operation or the second operation, to meet voice control experience of the user, the first apparatus may determine, based on a second preset condition, whether to end multi-round voice interaction currently. The second preset condition may be a preset condition indicating whether to end multi-round voice interaction. For example, when the second preset condition is met, the first apparatus may end multi-round voice interaction, and start new voice interaction. When the second preset condition is not met, the first apparatus may continue current multi-round voice interaction.

Optionally, the first apparatus may determine whether the second voice information is related to the operation indicated by the first voice information. For example, the first operation is used to ask the user about a question A, and the second voice information is a reply to the question A.

For example, that the second voice information is related to the operation indicated by the first voice information may include that the first voice information is related to the second voice information, or a degree of association between the first voice information and the second voice information is greater than the second preset threshold. For example, when both the first voice information and the second voice information indicate one or more of the following, the second voice information is related to the operation indicated by the first voice information: a same function, a same intention, and a same parameter.

The following further describes the following scenario: The second voice information is unrelated to the operation indicated by the first voice information, or association between the second voice information and the operation indicated by the first voice information is less than the second preset threshold, or the first voice information is unrelated to the second voice information, or the degree of association between the first voice information and the second voice information is less than the second preset threshold. In this scenario, the first apparatus may need to end current multi-round voice interaction, or may need to repeat an operation corresponding to a previous round of voice interaction, to continue current multi-round voice interaction.

707a: The first apparatus determines, based on the seventh semantic recognition result and the second preset condition, to perform the operation indicated by the first voice information.

707c: The first apparatus determines, based on the seventh semantic recognition result and the second preset condition, to perform a third operation determined by the first apparatus based on the seventh semantic recognition result.

707d: The first apparatus determines, based on the seventh semantic recognition result and the second preset condition, to perform a fourth operation indicated by the second apparatus.

Any one of 707a, 707b, and 707c may be performed.

In 707a, even if the first apparatus obtains the second voice information, the first apparatus may still perform the operation in the previous round of voice interaction.

The operation indicated by the first voice information may be the first operation or the second operation. In an example, if an operation performed by the first apparatus in 704 is the first operation, in 707a, the first apparatus may still determine to perform the first operation. In this case, current multi-round voice interaction may be device-side multi-round voice interaction. If an operation performed by the first apparatus in 704 is the second operation, in 707a, the first apparatus may still determine to perform the second operation. In this case, current multi-round voice interaction may be cloud-side multi-round voice interaction.

In 707b and 707c, the first apparatus obtains the second voice information, and may indicate the operation indicated by the second voice information. In 707b, the first apparatus may determine to perform the third operation determined by the first apparatus based on the seventh semantic recognition result. In 707c, the first apparatus may determine to perform the fourth operation indicated by the second apparatus. For a specific implementation in which the first apparatus determines the third operation, refer to 603a shown in FIG. 6. Details are not described herein again. For a specific implementation in which the first apparatus determines the fourth operation, refer to 603b shown in FIG. 6. Details are not described herein again.

In an example, if an operation performed by the first apparatus in 704 is the first operation, in 707b, the first apparatus determines to perform the third operation. In this case, new device-side voice interaction may end a previous round of device-side voice interaction.

In an example, if an operation performed by the first apparatus in 704 is the first operation, in 707c, the first apparatus determines to perform the fourth operation. In this case, new cloud-side voice interaction may end a previous round of device-side voice interaction.

In an example, if an operation performed by the first apparatus in 704 is the second operation, in 707b, the first apparatus determines to perform the third operation. In this case, new device-side voice interaction may end a previous round of cloud-side voice interaction.

In an example, if an operation performed by the first apparatus in 704 is the second operation, in 707c, the first apparatus determines to perform the fourth operation. In this case, new cloud-side voice interaction may end a previous round of cloud-side voice interaction.

With reference to the foregoing descriptions, it can be learned that the first preset condition may indicate whether the first apparatus determines a corresponding operation based on a semantic recognition result determined by the first apparatus, and the second preset condition may indicate whether the first apparatus ends multi-round voice interaction. The first apparatus may determine, based on the seventh semantic recognition result, the first preset condition, and the second preset condition, an operation to be performed by the first apparatus for the second voice information.

For example, the seventh semantic recognition result may not meet the second preset condition, which means that the first apparatus may not end multi-round voice interaction, and determine to perform the operation indicated by the first voice information, that is, perform 707a. The first apparatus may determine whether the seventh semantic recognition result meets the first preset condition, or may not determine whether the seventh semantic recognition result meets the first preset condition.

For another example, the seventh semantic recognition result may meet the second preset condition, and may meet the first preset condition. That the seventh semantic recognition result meets the second preset condition means that the first apparatus may end multi-round voice interaction, and determine to perform the operation indicated by the second voice information. That the seventh semantic recognition result meets the first preset condition means that the first apparatus may determine to perform an operation determined by the first apparatus based on the seventh semantic recognition result, that is, perform 707b.

For another example, the seventh semantic recognition result may meet the second preset condition, and may not meet the first preset condition. That the seventh semantic recognition result meets the second preset condition means that the first apparatus may end multi-round voice interaction, and determine to perform the operation indicated by the second voice information. That the seventh semantic recognition result does not meet the first preset condition means that the first apparatus may determine to perform an operation indicated by the second apparatus, that is, perform 707c.

Optionally, the method further includes: sending the second voice information to the second apparatus. The determining, based on the seventh semantic recognition result and the second preset condition, to perform a fourth operation indicated by the second apparatus includes: when the seventh semantic recognition result, or when the seventh semantic recognition result does not meet the second preset condition and the first semantic recognition result does not meet the first preset condition, obtaining an eighth semantic recognition result from the second apparatus; and determining, based on the eighth semantic recognition result and the second preset condition, to perform an operation indicated by the first voice information, or to perform the fourth operation.

When the seventh semantic recognition result does not meet the first preset condition, the seventh semantic recognition result obtained by the first apparatus through recognition may be more inaccurate, and the eighth semantic recognition result obtained by the second apparatus through recognition may be more accurate. The first apparatus may determine whether the eighth semantic recognition result meets the second preset condition, to determine whether to end current multi-round voice interaction.

In a possible scenario, the first semantic recognition result may meet the first preset condition, which may mean that current multi-round voice interaction may be device-side multi-round voice interaction. If the seventh semantic recognition result does not meet the first preset condition, and the eighth semantic recognition result meets the second preset condition, it may mean that current device-side multi-round voice interaction may be ended, and new voice interaction may be cloud-side voice interaction.

If the seventh semantic recognition result does not meet the second preset condition, it means that the first apparatus may not determine a to-be-performed operation based on the seventh semantic recognition result. When the first semantic recognition result does not meet the first preset condition, it may mean that current multi-round voice interaction is cloud-side voice interaction. In this case, the first apparatus may obtain the eighth semantic recognition result from the second apparatus, to continue current cloud-side multi-round voice interaction. The first apparatus may determine whether the eighth semantic recognition result meets the second preset condition, to determine whether to end current cloud-side multi-round voice interaction.

For example, the eighth semantic recognition result may not meet the second preset condition, which means that the first apparatus may not end multi-round voice interaction, and determine to perform the operation indicated by the first voice information, that is, perform 707a.

For another example, the eighth semantic recognition result may meet the second preset condition, which means that the first apparatus may end multi-round voice interaction, and determine to perform an operation indicated by the second apparatus, that is, perform 707c.

It is assumed that a priority of a semantic recognition result related to the operation indicated by the first voice information is a first priority, and a priority of a semantic recognition result unrelated to the operation indicated by the first voice information is a second priority.

In a possible example, if a priority of the seventh semantic recognition result is the first priority, it may be considered that the second voice information is related to the operation indicated by the first voice information. The first apparatus may determine to perform the operation indicated by the second voice information. If a priority of the seventh semantic recognition result is the second priority, it may be considered that the second voice information is unrelated to the operation indicated by the first voice information. If the second priority is higher than the first priority, the second apparatus may end current multi-round voice interaction, and may determine to perform the operation indicated by the second voice information. If the second priority is lower than the first priority, the second apparatus may continue current multi-round voice interaction, and may determine to perform the operation indicated by the first voice information.

In another possible example, if a priority of the eighth semantic recognition result is a first priority, it may be considered that the second voice information is related to the operation indicated by the first voice information. The first apparatus may determine to perform the operation indicated by the second apparatus. If a priority of the eighth semantic recognition result is a second priority, it may be considered that the second voice information is unrelated to the operation indicated by the first voice information. If the second priority is higher than the first priority, the second apparatus may end current multi-round voice interaction, and may determine to perform the operation indicated by the second apparatus. If the second priority is lower than the first priority, the second apparatus may continue current multi-round voice interaction, and may determine to perform the operation indicated by the first voice information.

Optionally, that the seventh semantic recognition result meets the second preset condition includes: The priority of the seventh semantic recognition result is higher than a priority of the first semantic recognition result.

The first apparatus may compare the priority of the seventh semantic recognition result with the priority of the first semantic recognition result, to determine whether to end current multi-round voice interaction. Optionally, in 704, the first apparatus may determine to perform the first operation, or may determine to perform the second operation. Optionally, when the seventh semantic recognition result meets the second preset condition, the first apparatus may perform 707b, or may perform 707c.

Optionally, the determining, based on the first semantic recognition result and a first preset condition, to perform a second operation indicated by a second apparatus includes: when the first semantic recognition result does not meet the first preset condition, obtaining a sixth semantic recognition result from the second apparatus, where the sixth semantic recognition result indicates the second operation; and determining, based on the sixth semantic recognition result, to perform the second operation. That the seventh semantic recognition result meets the second preset condition includes: The priority of the seventh semantic recognition result is higher than a priority of the sixth semantic recognition result.

In a possible example, in 704, the first apparatus may obtain the sixth semantic recognition result from the second apparatus, to determine to perform the second operation indicated by the second apparatus. In this case, the first apparatus may compare the priority of the seventh semantic recognition result with the priority of the sixth semantic recognition result, to determine whether to end current multi-round voice interaction.

Optionally, that the eighth semantic recognition result meets the second preset condition includes: The priority of the eighth semantic recognition result is higher than a priority of the first semantic recognition result.

The first apparatus may compare the priority of the eighth semantic recognition result with the priority of the first semantic recognition result, to determine whether to end current multi-round voice interaction. Optionally, in 704, the first apparatus may determine to perform the first operation, or may determine to perform the second operation.

Optionally, the determining, based on the first semantic recognition result and a first preset condition, to perform a second operation indicated by a second apparatus includes: when the first semantic recognition result does not meet the first preset condition, obtaining a sixth semantic recognition result from the second apparatus, where the sixth semantic recognition result indicates the second operation; and determining, based on the sixth semantic recognition result, to perform the second operation. That the eighth semantic recognition result meets the second preset condition includes: The priority of the eighth semantic recognition result is higher than a priority of the sixth semantic recognition result.

In a possible example, in 704, the first apparatus may obtain the sixth semantic recognition result from the second apparatus, to determine to perform the second operation indicated by the second apparatus. In this case, the first apparatus may compare the priority of the eighth semantic recognition result with the priority of the sixth semantic recognition result, to determine whether to end current multi-round voice interaction.

In other words, the user may end current multi-round voice interaction by using a high-priority voice instruction. In a possible example, for example, the first apparatus may record some high-priority instructions. If the seventh semantic recognition result or the eighth semantic recognition result is corresponding to a high-priority instruction, the first apparatus may end current multi-round voice interaction.

Optionally, that the priority of the seventh semantic recognition result is higher than the priority of the first semantic recognition result includes one or more of the following: A priority of a function indicated by the seventh semantic recognition result is higher than a priority of a function indicated by the first semantic recognition result; a priority of an intention indicated by the seventh semantic recognition result is higher than a priority of an intention indicated by the first semantic recognition result; and a priority of a parameter indicated by the seventh semantic recognition result is higher than a priority of a parameter indicated by the first semantic recognition result.

The first apparatus may compare a priority of a third function with a priority of a first function, and/or compare a priority of a third intention with a priority of a first intention, and/or compare a priority of a third parameter with a priority of a first parameter, to determine whether to end current multi-round voice interaction. In other words, the first apparatus may record some high-priority functions, and/or high-priority intentions, and/or high-priority parameters. If the first apparatus identifies one or more of the high-priority function, the high-priority intention, and the high-priority parameter, the first apparatus may end current multi-round voice interaction, and determine to perform the operation indicated by the second voice information.

For example, the seventh semantic recognition result includes the third function, and the third function may be a "security control function". The first semantic recognition result includes the first function, and the first function may be a "navigation function". To ensure device security, a priority of the "security control function" may be higher than that of another function, for example, higher than that of the "navigation function". Therefore, the first apparatus may determine, based on the priority of the third function and the priority of the first function, that the seventh semantic recognition result meets the second preset condition, and then determine to perform the operation indicated by the second voice information.

For another example, the seventh semantic recognition result includes the third intention, and the third intention may be an "accident mode intention". The first semantic recognition result includes the first intention, and the first intention may be an "audio playing intention". The "accident mode intention" may mean that the user has an intention to enable an accident mode. Due to specific urgency of accident safety, a priority of the "accident mode intention" may be higher than that of another intention, for example, higher than that of the "audio playing intention". Therefore, the first apparatus may determine, based on the priority of the third intention and the priority of the first intention, that the seventh semantic recognition result meets the second preset condition, and then determine to perform the operation indicated by the second voice information.

For another example, the seventh semantic recognition result includes the third parameter, and the third parameter may be a "door lock". The first semantic recognition result includes the first parameter, and the first parameter may be a "song A". The user may indicate, by using the second voice information, the first apparatus to perform an operation related to the "door lock". Enabling or disabling of the "door lock" relatively likely affects driving safety and parking safety of a vehicle. Therefore, a priority of the "door lock" may be higher than that of another parameter, for example, higher than that of the "song A". Therefore, the first apparatus may determine, based on the priority of the third parameter and the priority of the first parameter, that the seventh semantic recognition result meets the second preset condition, and then determine to perform the operation indicated by the second voice information.

Optionally, that the priority of the seventh semantic recognition result is higher than the priority of the sixth semantic recognition result includes one or more of the following: A priority of a function indicated by the seventh semantic recognition result is higher than a priority of a function indicated by the sixth semantic recognition result; a priority of an intention indicated by the seventh semantic recognition result is higher than a priority of an intention indicated by the sixth semantic recognition result; and a priority of a parameter indicated by the seventh semantic recognition result is higher than a priority of a parameter indicated by the sixth semantic recognition result.

For a related example in which the priority of the seventh semantic recognition result is higher than the priority of the sixth semantic recognition result, refer to a related example in which the priority of the seventh semantic recognition result is higher than the priority of the first semantic recognition result. Details are not described herein again.

Optionally, that the priority of the eighth semantic recognition result is higher than the priority of the first semantic recognition result includes one or more of the following: A priority of a function indicated by the eighth semantic recognition result is higher than a priority of a function indicated by the first semantic recognition result; a priority of an intention indicated by the eighth semantic recognition result is higher than a priority of an intention indicated by the first semantic recognition result; and a priority of a parameter indicated by the eighth semantic recognition result is higher than a priority of a parameter indicated by the first semantic recognition result.

For a related example in which the priority of the eighth semantic recognition result is higher than the priority of the first semantic recognition result, refer to a related example in which the priority of the seventh semantic recognition result is higher than the priority of the first semantic recognition result. Details are not described herein again.

Optionally, that the priority of the eighth semantic recognition result is higher than the priority of the sixth semantic recognition result includes one or more of the following: A priority of a function indicated by the eighth semantic recognition result is higher than a priority of a function indicated by the sixth semantic recognition result; a priority of an intention indicated by the eighth semantic recognition result is higher than a priority of an intention indicated by the sixth semantic recognition result; and a priority of a parameter indicated by the eighth semantic recognition result is higher than a priority of a parameter indicated by the sixth semantic recognition result.

For a related example in which the priority of the eighth semantic recognition result is higher than the priority of the sixth semantic recognition result, refer to a related example in which the priority of the seventh semantic recognition result is higher than the priority of the first semantic recognition result. Details are not described herein again.

With reference to the examples described above, the following describes some possible scenarios by using some examples. It should be understood that the solutions provided in embodiments of this application should not be limited to an example provided below.

Figure 8:
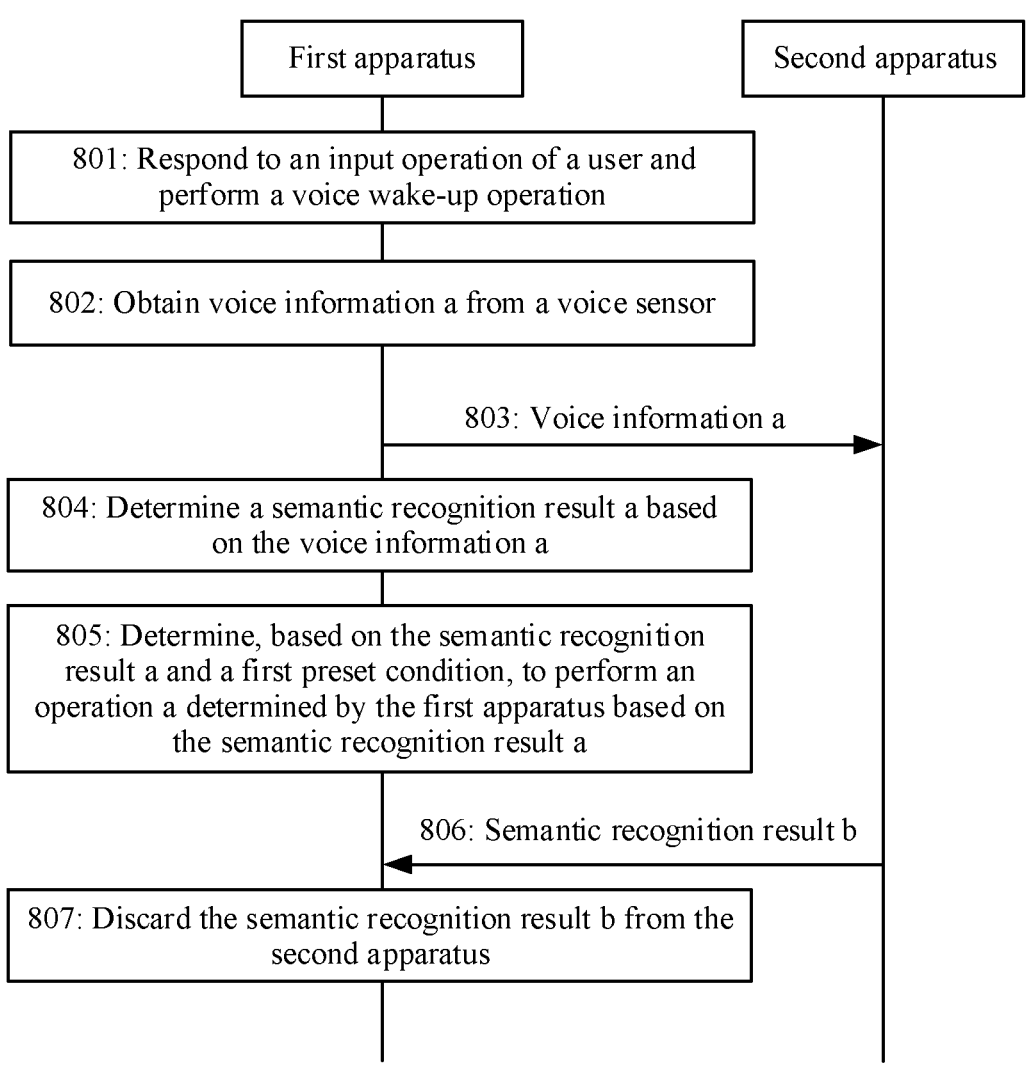
FIG. 8 is a schematic flowchart of a voice interaction method according to an embodiment of this application.

FIG. 8 is a schematic flowchart of a voice interaction method 800 according to an embodiment of this application. For example, the method 800 shown in FIG. 8 may be applied to the voice interaction system 500 shown in FIG. 5.

801: A first apparatus responds to an input operation of a user and performs a voice wake-up operation.

For example, for a specific implementation of 801, refer to 601 shown in FIG. 6 or 701 shown in FIG. 7. Details are not described herein again.

802: The first apparatus obtains voice information a from a voice sensor.

For example, for a specific implementation of 802, refer to 602 shown in FIG. 6 or 702 shown in FIG. 7. Details are not described herein again. Optionally, for example, the voice information a may correspond to the foregoing first voice information.

In a possible example, for example, the voice information a may be "turn on a device A".

803: The first apparatus sends the voice information a to a second apparatus.

For example, for a specific implementation of 803, refer to 603b shown in FIG. 6. Details are not described herein again.

804: The first apparatus determines a semantic recognition result a based on the voice information a.

For example, for a specific implementation of 804, refer to 603a shown in FIG. 6 or 703 shown in FIG. 7. Details are not described herein again. Optionally, for example, the semantic recognition result a may correspond to the foregoing first semantic recognition result.

In a possible example, for example, the semantic recognition result a may include a function a, an intention a, and a parameter a. The function a may be a "vehicle control function", the intention a may be "turn on", and the parameter a may be "device A". Optionally, for example, the function a may correspond to the foregoing first function. For example, the intention a may correspond to the foregoing first intention. For example, the parameter a may correspond to the foregoing first parameter.

805: The first apparatus determines, based on the semantic recognition result a and a first preset condition, to perform an operation a determined by the first apparatus based on the semantic recognition result a.

For example, for a specific implementation of 805, refer to 603a shown in FIG. 6 or 704 shown in FIG. 7. Details are not described herein again. Optionally, for example, the operation a may correspond to the foregoing first operation.

In a possible example, the first apparatus stores a semantic recognition list a (optionally, for example, the semantic recognition list a may correspond to the foregoing first semantic recognition list, or correspond to the foregoing general table, and the general table may include the foregoing first semantic recognition list, second semantic recognition list, and third semantic recognition list). A plurality of functions in the semantic recognition list a may include the "vehicle control function". A plurality of intentions in the semantic recognition list a may include "turn on". A plurality of parameters in the semantic recognition list a may include "device A". In addition, in the semantic recognition list a, the function "vehicle control function" may correspond to the intention "turn on", and the intention "turn on" may correspond to the parameter "device A". The first apparatus may determine, based on the semantic recognition result a and the semantic recognition list a, that the semantic recognition result a meets the first preset condition. Because the semantic recognition result a meets the first preset condition, the first apparatus may determine to perform the operation a determined by the first apparatus based on the semantic recognition result a. For example, the operation a may be turning on the device A.

806: The second apparatus sends a semantic recognition result b to the first apparatus.

For example, for a specific implementation of 806, refer to 603b shown in FIG. 6 or 704 shown in FIG. 7. Details are not described herein again. Optionally, for example, the semantic recognition result b may correspond to the foregoing sixth semantic recognition result.

In a possible example, for example, the semantic recognition result b may be the same as or similar to the semantic recognition result a. For example, the semantic recognition result b may include a function b, an intention b, and a parameter b. The function b may be the "vehicle control function", the intention b may be "turn on", and the parameter b may be "device A". Optionally, for example, the parameter b may correspond to the foregoing second parameter. Optionally, for example, the function b may correspond to the foregoing fourth function. For example, the intention b may correspond to the foregoing fourth intention. For example, the parameter b may correspond to the foregoing fourth parameter.

807: The first apparatus discards the semantic recognition result b from the second apparatus.

The first apparatus may determine to perform the operation a determined by the first apparatus based on the semantic recognition result a. Therefore, the first apparatus may ignore an indication of the second apparatus for the voice information a.

Herein, 807 may be an optional step. For example, for a specific implementation of 807, refer to 603b shown in FIG. 6. Details are not described herein again.

In the example shown in FIG. 8, the first apparatus may determine, based on the existing semantic recognition list, whether the semantic recognition result obtained through current recognition has high accuracy. When the semantic recognition result obtained through current recognition may have the high accuracy, the first apparatus may choose to determine the to-be-performed operation by the first apparatus. This helps quickly and accurately respond to a voice instruction of the user in a scenario that the first apparatus is good at.

FIG. 9 is a schematic flowchart of a voice interaction method 900 according to an embodiment of this application. For example, the method 900 shown in FIG. 9 may be applied to the voice interaction system 500 shown in FIG. 5.

901: A first apparatus responds to an input operation of a user and performs a voice wake-up operation.

For example, for a specific implementation of 901, refer to 601 shown in FIG. 6 or 701 shown in FIG. 7. Details are not described herein again.

902: The first apparatus obtains voice information b from a voice sensor.

For example, for a specific implementation of 902, refer to 602 shown in FIG. 6 or 702 shown in FIG. 7. Details are not described herein again. Optionally, for example, the voice information b may correspond to the foregoing first voice information.

In a possible example, for example, the voice information b may be "navigate to a location A".

903: The first apparatus sends the voice information b to a second apparatus.

For example, for a specific implementation of 903, refer to 603b shown in FIG. 6. Details are not described herein again.

904: The first apparatus determines a semantic recognition result c based on the voice information b.

For example, for a specific implementation of 904, refer to 603a shown in FIG. 6 or 703 shown in FIG. 7. Details are not described herein again. Optionally, for example, the semantic recognition result c may correspond to the foregoing first semantic recognition result.

In a possible example, for example, the semantic recognition result c may include a function c, an intention c, and a parameter c. The function c may be a "cloud navigation function", the intention c may be "path planning", and the parameter c may be a "location B". The "location A" and the "location B" may be the same or different. Optionally, for example, the function c may correspond to the foregoing first function. For example, the intention c may correspond to the foregoing first intention. For example, the parameter c may correspond to the foregoing first parameter. In another possible example, for example, the semantic recognition result c may include indication information a. The indication information a indicates supporting no semantic recognition.

905: The first apparatus determines, based on the semantic recognition result c and a first preset condition, to perform an operation b indicated by the second apparatus.

For example, for a specific implementation of 905, refer to 603a shown in FIG. 6 or 704 shown in FIG. 7. Details are not described herein again. Optionally, for example, the operation b may correspond to the foregoing second operation.

In a possible example, the first apparatus stores a semantic recognition list b (optionally, for example, the semantic recognition list b may correspond to the foregoing first semantic recognition list, or correspond to the foregoing general table, and the general table may include the foregoing first semantic recognition list, second semantic recognition list, and third semantic recognition list). A plurality of functions in the semantic recognition list b may not include the "cloud navigation function", and/or a plurality of parameters in the semantic recognition list b may not include the "location B", and/or in the semantic recognition list b, the function "cloud navigation function" may not correspond to the parameter "location B". The first apparatus may determine, based on the semantic recognition result c and the semantic recognition list b, that the semantic recognition result a does not meet the first preset condition. Because the semantic recognition result a does not meet the first preset condition, the first apparatus may determine to perform an operation b indicated by the second apparatus.

906: The second apparatus sends a semantic recognition result d for the voice information b to the first apparatus.

For example, for a specific implementation of 906, refer to 603b shown in FIG. 6 or 704 shown in FIG. 7. Details are not described herein again. Optionally, for example, the semantic recognition result d may correspond to the foregoing sixth semantic recognition result.

In a possible example, for example, the semantic recognition result d may include a function d, an intention d, and a parameter d. The function d may be the "cloud navigation function", the intention d may be "path planning", and the parameter d may be the "location A". Optionally, for example, the parameter d may correspond to the foregoing second parameter. Optionally, for example, the function d may correspond to the foregoing fourth function. For example, the intention d may correspond to the foregoing fourth intention. For example, the parameter d may correspond to the foregoing fourth parameter.

907: The first apparatus performs the operation b based on the semantic recognition result d.

For example, for a specific implementation of 907, refer to 603b shown in FIG. 6 or 704 shown in FIG. 7. Details are not described herein again. For example, the operation b may be planning a path to the location A.

Optionally, in the example shown in FIG. 9, the following steps may be further included.

908: The first apparatus determines the parameter d and a parameter type a based on the semantic recognition result d, and records an association relationship between the parameter d and the parameter type a in the semantic recognition list b.

For example, for a specific implementation of 908, refer to 603b shown in FIG. 6. Details are not described herein again. Optionally, for example, the parameter d may correspond to the foregoing second parameter. For example, the parameter type a may correspond to the foregoing second parameter type. For example, the semantic recognition list b may correspond to the foregoing third semantic recognition list.

In an example, the parameter type a may be a "location". An updated semantic recognition list b may include the following association relationship: the "location A"–the "location".

909: The first apparatus obtains voice information c from the voice sensor.

For example, for a specific implementation of 909, refer to 602 shown in FIG. 6 or 702 shown in FIG. 7. Details are not described herein again. Optionally, for example, the voice information c may correspond to the foregoing first voice information.

In a possible example, for example, the voice information c may be "navigate to a location A".

910: The first apparatus sends the voice information c to the second apparatus.

For example, for a specific implementation of 910, refer to 603b shown in FIG. 6. Details are not described herein again.

911: The first apparatus determines a semantic recognition result e based on the voice information c, where the semantic recognition result e includes the function c and the parameter d.

For example, for a specific implementation of 911, refer to 603a shown in FIG. 6. Details are not described herein again. Optionally, for example, the semantic recognition result e may correspond to the foregoing second semantic recognition result. For example, the function c may correspond to the foregoing second function. For example, the parameter d may correspond to the foregoing first parameter.

In a possible example, for example, the semantic recognition result e may include the function c, the intention c, and the parameter d. The function c may be the "cloud navigation function", the intention c may be "path planning", and the parameter d may be the "location A".

912: The first apparatus corrects, based on the semantic recognition result e and the semantic recognition list b, the function c of the semantic recognition result e to the function d, to obtain a semantic recognition result f, where the function d and the function c are two different functions of a same type.

For example, for a specific implementation of 912, refer to 603a shown in FIG. 6. Details are not described herein again. Optionally, for example, the function d may correspond to the foregoing first function. For example, the semantic recognition result f may correspond to the foregoing first semantic recognition result.

In a possible example, the plurality of parameters in the semantic recognition list b may include the "location A". Therefore, the first apparatus may modify the "cloud navigation function" of the semantic recognition result e to a "local navigation function", to obtain the semantic recognition result f. For example, the semantic recognition result f may include the function d, the intention c, and the parameter d. The function d may be the "local navigation function", the intention c may be "path planning", and the parameter d may be the "location A". Both the "cloud navigation function" and the "local navigation function" are navigation functions, and the "cloud navigation function" and the "local navigation function" are two different functions. Optionally, for example, the function d may correspond to the foregoing first function. For example, the intention c may correspond to the foregoing first intention. For example, the parameter d may correspond to the foregoing first parameter.

913: The first apparatus determines, based on the semantic recognition result f and the first preset condition, to perform an operation c determined by the first apparatus based on the semantic recognition result f.

For example, for a specific implementation of 913, refer to 603a shown in FIG. 6 or 704 shown in FIG. 7. Details are not described herein again. Optionally, for example, the operation c may correspond to the foregoing first operation.

In a possible example, the first apparatus stores the semantic recognition list b (optionally, for example, the semantic recognition list b may correspond to the foregoing first semantic recognition list, or correspond to the foregoing general table, and the general table may include the foregoing first semantic recognition list, second semantic recognition list, and third semantic recognition list). The plurality of functions in the semantic recognition list b may include the "local navigation function". In the semantic recognition list b, the function "local navigation function" may correspond to a parameter type "location". In addition, in a semantic recognition list c, the parameter "location A" may correspond to the parameter type "location". The first apparatus may determine, based on the semantic recognition result f, the semantic recognition list b, and the semantic recognition list c, that the semantic recognition result a meets the first preset condition. Because the semantic recognition result f meets the first preset condition, the first apparatus may determine to perform the operation c determined by the first apparatus based on the semantic recognition result f. For example, the operation c may be planning a path to the location A.

914: The first apparatus discards a semantic recognition result g for the voice information c from the second apparatus.

The first apparatus may determine to perform the operation c determined by the first apparatus based on the semantic recognition result f. Therefore, the first apparatus may ignore an indication of the second apparatus for the voice information c.

Herein, 914 may be an optional step. For example, for a specific implementation of 914, refer to 603b shown in FIG. 6. Details are not described herein again.

In the example shown in FIG. 9, the first apparatus may determine, based on the existing semantic recognition list, whether a semantic recognition result obtained through current recognition has high accuracy. When the semantic recognition result obtained through current recognition may not have high accuracy, the first apparatus may choose to perform an operation according to an indication of another apparatus. This helps the first apparatus accurately respond to a voice instruction of the user. In addition, the first apparatus may further learn the voice instruction of the user under the indication of the another apparatus. This helps broaden a scenario in which the first apparatus can respond to the voice instruction of the user by the first apparatus.

FIG. 10A and FIG. 10B are a schematic flowchart of a voice interaction method according to an embodiment of this application. For example, the method shown in FIG. 10A and FIG. 10B may be applied to the voice interaction system 500 shown in FIG. 5.

1001: A first apparatus responds to an input operation of a user and performs a voice wake-up operation.

For example, for a specific implementation of 1001, refer to 601 shown in FIG. 6 or 701 shown in FIG. 7. Details are not described herein again.

1002: The first apparatus obtains voice information d from a voice sensor.

For example, for a specific implementation of 1002, refer to 602 shown in FIG. 6 or 702 shown in FIG. 7. Details are not described herein again. Optionally, for example, the voice information d may correspond to the foregoing first voice information.

In a possible example, for example, the voice information d may be "navigate to a location C".

1003: The first apparatus sends the voice information d to a second apparatus.

For example, for a specific implementation of 1003, refer to 603b shown in FIG. 6. Details are not described herein again.

1004: The first apparatus determines a semantic recognition result h based on the voice information d.

For example, for a specific implementation of 1004, refer to 603a shown in FIG. 6 or 703 shown in FIG. 7. Details are not described herein again. Optionally, for example, the semantic recognition result h may correspond to the foregoing first semantic recognition result.

1005: The first apparatus determines, based on the semantic recognition result h and a first preset condition, to perform an operation d indicated by the second apparatus.

For example, for a specific implementation of 1005, refer to 603a shown in FIG. 6 or 704 shown in FIG. 7. Details are not described herein again. Optionally, for example, the operation d may correspond to the foregoing second operation.

1006: The second apparatus sends a semantic recognition result i for the voice information d to the first apparatus.

For example, for a specific implementation of 1006, refer to 603b shown in FIG. 6 or 704 shown in FIG. 7. Details are not described herein again. Optionally, for example, the semantic recognition result i may correspond to the foregoing sixth semantic recognition result.

1007: The first apparatus performs the operation d based on the semantic recognition result i.

For example, for a specific implementation of 1007, refer to 603b shown in FIG. 6 or 704 shown in FIG. 7. Details are not described herein again.

In a possible example, for example, the operation d may be broadcasting the following content: A plurality of related destinations are found, please select a location C-1, a location C-2, or a location C-3. The operation d may be used to query an accurate navigation destination.

Optionally, in a possible example, 1001 to 1007 may be a first round of cloud-side voice interaction.

1008: The first apparatus obtains voice information e from the voice sensor.

For example, for a specific implementation of 1008, refer to 705 shown in FIG. 7. Details are not described herein again. Optionally, for example, the voice information e may correspond to the foregoing second voice information. Optionally, the voice information e may be unrelated to the operation d.

In a possible example, for example, the voice information d may be "turn on a device A".

1009: The first apparatus sends the voice information e to the second apparatus.

For example, for a specific implementation of 1009, refer to 603b shown in FIG. 6. Details are not described herein again.

1010: The first apparatus determines a semantic recognition result j based on the voice information e.

For example, for a specific implementation of 1010, refer to 706 shown in FIG. 7. Details are not described herein again. Optionally, for example, the semantic recognition result j may correspond to the foregoing seventh semantic recognition result.

In an example, for example, the semantic recognition result j may indicate "turn on a device A".

1011: When the semantic recognition result j does not meet a second preset condition, the first apparatus obtains a semantic recognition result k for the voice information e from the second apparatus.

For example, for a specific implementation of 1011, refer to 707a shown in FIG. 7. Details are not described herein again. Optionally, for example, the semantic recognition result k may correspond to the foregoing eighth semantic recognition result.

If the semantic recognition result j does not meet the second preset condition, the first apparatus may determine not to perform an operation indicated by the semantic recognition result j. The first apparatus may obtain the semantic recognition result of the second apparatus for the voice information e, to determine whether to perform an operation indicated by the voice information e.

In a possible example, a priority of the semantic recognition result j may be lower than a priority of a semantic recognition result g or the semantic recognition result i.

1012: When the semantic recognition result k does not meet the second preset condition, the first apparatus determines to repeatedly perform the operation d.

For example, for a specific implementation of 1012, refer to 707a shown in FIG. 7. Details are not described herein again.

If the semantic recognition result k does not meet the second preset condition, the first apparatus may determine not to perform an operation indicated by the semantic recognition result k. The first apparatus may repeatedly perform the operation d, so that the first round of cloud-side voice interaction can be continued.

In a possible example, the priority of the semantic recognition result k may be lower than the priority of the semantic recognition result g or the semantic recognition result i.

1013: The first apparatus obtains voice information f from the voice sensor.

For example, for a specific implementation of 1013, refer to 705 shown in FIG. 7. Details are not described herein again. Optionally, for example, the voice information f may correspond to the foregoing second voice information. Optionally, the voice information f may be related to the operation d.

In a possible example, for example, the voice information f may be "the location C-1 via a location D".

1014: The first apparatus sends the voice information f to the second apparatus.

For example, for a specific implementation of 1014, refer to 603b shown in FIG. 6. Details are not described herein again.

1015: The first apparatus determines a semantic recognition result m based on the voice information f.

For example, for a specific implementation of 1015, refer to 706 shown in FIG. 7. Details are not described herein again. Optionally, for example, the semantic recognition result 5 may correspond to the foregoing seventh semantic recognition result.

In an example, for example, the semantic recognition result m may indicate that the first preset condition is not met.

1016: The first apparatus obtains a semantic recognition result n for the voice information f from the second apparatus.

For example, for a specific implementation of 1016, refer to 707c shown in FIG. 7. Details are not described herein again. Optionally, for example, the semantic recognition result n may correspond to the foregoing eighth semantic recognition result.

If the semantic recognition result m does not meet the first preset condition, the first apparatus may determine to perform an operation indicated by the second apparatus, or repeatedly perform a previous operation. The first apparatus may obtain the semantic recognition result n of the second apparatus for the voice information f, to determine whether to perform an operation indicated by the voice information f.

1017: When the semantic recognition result n is related to the operation d, determine to perform an operation e indicated by the second apparatus.

For example, for a specific implementation of 1017, refer to 707c shown in FIG. 7. Details are not described herein again.

That the semantic recognition result n is related to the operation d may mean that the voice information f is a reply to the previous round of voice interaction. The first apparatus may determine to perform the operation e indicated by the second apparatus. Herein, 1013 to 1017 may be a second round of cloud-side voice interaction. The first round of cloud-side voice interaction and the second round of cloud-side voice interaction may be two rounds of voice interaction in multi-round voice interaction.

In a possible example, for example, the operation e may be broadcasting the following content: A plurality of related way points are found, please select a location D-1, a location D-2, or a location D-3. The operation e may be used to query an accurate navigation way point.

1018: The first apparatus obtains voice information g from the voice sensor.

For example, for a specific implementation of 1018, refer to 602 shown in FIG. 6 or 702 shown in FIG. 7. Details are not described herein again. Optionally, for example, the voice information g may correspond to the foregoing second voice information.

In a possible example, for example, the voice information g may be "a vehicle accident occurs".

1019: The first apparatus sends the voice information f to the second apparatus.

For example, for a specific implementation of 1019, refer to 603b shown in FIG. 6. Details are not described herein again.

1020: The first apparatus determines a semantic recognition result p based on the voice information g.

For example, for a specific implementation of 1020, refer to 603a shown in FIG. 6 or 703 shown in FIG. 7. Details are not described herein again. Optionally, for example, the semantic recognition result p may correspond to the foregoing seventh semantic recognition result.

In an example, the semantic recognition result p may include a function e and an intention e. The function e may be a "safety control function", and the intention c may be "enabling an accident mode".

1021: When the semantic recognition result p meets the second preset condition, determine to perform an operation f determined by the first apparatus based on the semantic recognition result p.

For example, for a specific implementation of 1021, refer to 707b shown in FIG. 7. Details are not described herein again. Optionally, for example, the operation f may correspond to the foregoing third operation.

That the semantic recognition result p meets the second preset condition means that the first apparatus may end current cloud-side multi-round voice interaction. The first apparatus may determine to perform the operation indicated by the semantic recognition result p. The first apparatus may obtain the semantic recognition result of the second apparatus for the voice information e, to determine whether to perform the operation indicated by the voice information e.

In a possible example, a priority of the semantic recognition result p may be higher than a priority of the semantic recognition result n or the semantic recognition result m.

1022: The second apparatus sends a semantic recognition result q for the voice information g to the first apparatus.

For example, for a specific implementation of 1022, refer to 603*b* shown in FIG. 6 or 704 shown in FIG. 7. Details are not described herein again.

In a possible example, for example, the semantic recognition result q may indicate that the voice information g does not match the operation d.

1023: The first apparatus discards the semantic recognition result q from the second apparatus.

The first apparatus may determine to perform the operation f determined by the first apparatus based on the semantic recognition result p. Therefore, the first apparatus may ignore an indication of the second apparatus for the voice information g.

For example, for a specific implementation of 1023, refer to 603*b* shown in FIG. 6. Details are not described herein again.

In the example shown in FIG. 10A and FIG. 10B, when current voice information does not match a previous operation, the first apparatus may determine, based on a preset condition related to multi-round voice interaction, whether to end current multi-round voice interaction. This helps adaptively retain an advantage of multi-round voice interaction, and helps respond to an urgent and important voice instruction of the user in time in a special case.

Figure 11:
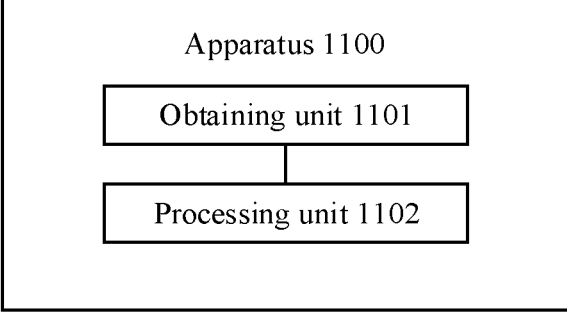
FIG. 11 is a schematic diagram of a structure of a voice interaction apparatus according to an embodiment of this application.

FIG. 11 is a schematic diagram of a structure of a voice interaction apparatus 1100 according to an embodiment of this application. The apparatus 1100 includes an obtaining unit 1101 and a processing unit 1102. The apparatus 1100 may be configured to perform the steps of the voice interaction method provided in embodiments of this application.

For example, the obtaining unit 1101 may be configured to perform 602 in the method 600 shown in FIG. 6, and the processing unit 1102 may be configured to perform 603*a* in the method 600 shown in FIG. 6. Optionally, the apparatus 1100 further includes a sending unit. The sending unit may be configured to perform 603*b* in the method 600 shown in FIG. 6.

For another example, the obtaining unit 1101 may be configured to perform 702 and 705 in the method 700 shown in FIG. 7, and the processing unit 1102 may be configured to perform 703, 704, 706, and 707 in the method 700 shown in FIG. 7.

The obtaining unit 1101 is configured to obtain first voice information from a voice sensor.

The processing unit 1102 is configured to determine, based on the first voice information, to perform a target operation indicated by the first voice information.

For example, the processing unit 1102 may include the semantic recognition module and the operation decision-making module in the example shown in FIG. 5.

Optionally, in an embodiment, the processing unit 1102 is specifically configured to: determine a first semantic recognition result based on the first voice information; and determine, based on the first semantic recognition result and a first preset condition, to perform a first operation determined by the first apparatus based on the first semantic recognition result, or to perform a second operation indicated by a second apparatus.

Optionally, in an embodiment, the processing unit 1102 is specifically configured to: when the first semantic recognition result meets the first preset condition, determine to perform the first operation.

Optionally, in an embodiment, a plurality of functions are preset on the first apparatus. That the first semantic recognition result meets the first preset condition includes: The first semantic recognition result indicates a first function, and the first function belongs to the plurality of functions.

Optionally, in an embodiment, a plurality of intentions are preset on the first apparatus. That the first semantic recognition result meets the first preset condition includes: The first semantic recognition result indicates a first intention, and the first intention belongs to the plurality of intentions.

Optionally, in an embodiment, a plurality of parameters are preset on the first apparatus. That the first semantic recognition result meets the first preset condition includes: The first semantic recognition result indicates a first parameter, and the first parameter belongs to the plurality of parameters.

Optionally, in an embodiment, the first semantic recognition result indicates the first function and indicates the first parameter. That the first semantic recognition result meets the first preset condition further includes: The first function indicated by the first semantic recognition result and the first parameter indicated by the first semantic recognition result correspond to a same parameter type.

Optionally, in an embodiment, the processing unit 1102 is specifically configured to: determine a second semantic recognition result based on the first voice information, where the second semantic recognition result indicates a second function and indicates the first parameter; and when the plurality of functions preset on the first apparatus do not include the second function, and the plurality of parameters preset on the first apparatus include the first parameter, correct the second function in the second semantic recognition result to the first function, to obtain the first semantic recognition result, where the first function and the second function are two different functions of a same type.

Optionally, in an embodiment, the first semantic recognition result indicates the first intention and indicates the first parameter. That the first semantic recognition result meets the first preset condition further includes: The first intention indicated by the first semantic recognition result and the first parameter indicated by the first semantic recognition result correspond to a same parameter type.

Optionally, in an embodiment, the processing unit 1102 is specifically configured to: determine a third semantic recognition result based on the first voice information, where the third semantic recognition result includes a second intention and indicates the first parameter; and when the plurality of intentions preset on the first apparatus do not include the second intention, and the plurality of parameters preset on the first apparatus include the first parameter, correct the second intention in the third semantic recognition result to the first intention, to obtain the first semantic recognition result, where the first intention and the second intention are two different intentions of a same type.

Optionally, in an embodiment, that the first semantic recognition result meets the first preset condition includes: The first semantic recognition result includes a first indicator bit, and the first indicator bit indicates that the first semantic recognition result meets the first preset condition.

Optionally, in an embodiment, the processing unit 1102 is specifically configured to: determine a fourth semantic recognition result based on the first voice information, where the fourth semantic recognition result includes a first function and a first parameter; and when the first function belongs to a plurality of functions preset on the first apparatus, the first parameter belongs to a plurality of parameters preset on the first apparatus, and the first function and the first parameter correspond to a same parameter type, determine the first semantic recognition result, where the semantic recognition result includes the first indicator bit.

Optionally, in an embodiment, the processing unit 1102 is specifically configured to: determine a fifth semantic recognition result based on the first voice information, where the fifth semantic recognition result includes a first intention and a first parameter; and when the first intention belongs to a plurality of intentions preset on the first apparatus, the first parameter belongs to a plurality of parameters preset on the first apparatus, and the first intention and the first parameter correspond to a same parameter type, determine the first semantic recognition result, where the semantic recognition result includes the first indicator bit.

Optionally, in an embodiment, the apparatus further includes the sending unit, configured to send the first voice information to the second apparatus. The processing unit 1102 is further configured to discard a sixth semantic recognition result from the second apparatus.

Optionally, in an embodiment, the processing unit 1102 is specifically configured to: when the first semantic recognition result does not meet the first preset condition, obtain a sixth semantic recognition result from the second apparatus, where the sixth semantic recognition result indicates the second operation; and determine, based on the sixth semantic recognition result, to perform the second operation.

Optionally, in an embodiment, the processing unit 1102 is further configured to determine a second parameter and a second parameter type based on the sixth semantic recognition result. The apparatus further includes a storage unit, configured to store an association relationship between the second parameter and the second parameter type.

Optionally, in an embodiment, the obtaining unit 1101 is further configured to obtain second voice information from the voice sensor. The processing unit 1102 is further configured to determine a seventh semantic recognition result based on the second voice information. The processing unit 1102 is further configured to determine, based on the seventh semantic recognition result and a second preset condition, to perform an operation indicated by the first voice information, or to perform a third operation determined by the first apparatus based on the seventh semantic recognition result, or to perform a fourth operation indicated by the second apparatus.

Optionally, in an embodiment, the processing unit 1102 is specifically configured to: when the seventh semantic recognition result meets the first preset condition and meets the second preset condition, determine to perform the third operation; or when the seventh semantic recognition result does not meet the first preset condition and meets the second preset condition, determine to perform the fourth operation; or when the seventh semantic recognition result does not meet the second preset condition, determine to perform the operation corresponding to the first semantic recognition result.

Optionally, in an embodiment, that the seventh semantic recognition result meets the second preset condition includes: a priority of the seventh semantic recognition result is higher than a priority of the first semantic recognition result.

Optionally, in an embodiment, that the priority of the seventh semantic recognition result is higher than the priority of the first semantic recognition result includes one or more of the following: A priority of a function indicated by the seventh semantic recognition result is higher than a priority of a function indicated by the first semantic recognition result; a priority of an intention indicated by the seventh semantic recognition result is higher than a priority of an intention indicated by the first semantic recognition result; and a priority of a parameter indicated by the seventh semantic recognition result is higher than a priority of a parameter indicated by the first semantic recognition result.

Optionally, in an embodiment, the processing unit is specifically configured to: when the first semantic recognition result does not meet the first preset condition, obtain the sixth semantic recognition result from the second apparatus, where the sixth semantic recognition result indicates the second operation; and determine, based on the sixth semantic recognition result, to perform the second operation. That the seventh semantic recognition result meets the second preset condition includes: A priority of the seventh semantic recognition result is higher than a priority of the sixth semantic recognition result.

Optionally, in an embodiment, that the priority of the seventh semantic recognition result is higher than the priority of the sixth semantic recognition result includes one or more of the following: A priority of a function indicated by the seventh semantic recognition result is higher than a priority of a function indicated by the sixth semantic recognition result; a priority of an intention indicated by the seventh semantic recognition result is higher than a priority of an intention indicated by the sixth semantic recognition result; and a priority of a parameter indicated by the seventh semantic recognition result is higher than a priority of a parameter indicated by the sixth semantic recognition result.

Optionally, in an embodiment, the apparatus further includes the sending unit, configured to send the second voice information to the second apparatus. The processing unit 1102 is specifically configured to: when the seventh semantic recognition result does not meet the first preset condition, or when the seventh semantic recognition result does not meet the second preset condition and the first semantic recognition result does not meet the first preset condition, obtain an eighth semantic recognition result from the second apparatus; and determine, based on the eighth semantic recognition result and the second preset condition, to perform the operation indicated by the first voice information, or to perform the fourth operation.

For example, the sending unit may be the transceiver module in the example shown in FIG. 5.

Optionally, in an embodiment, the processing unit 1102 is specifically configured to: when the eighth semantic recognition result meets the second preset condition, determine to perform the fourth operation; or when the eighth semantic recognition result does not meet the second preset condition, determine to perform the operation indicated by the first voice information.

Optionally, in an embodiment, that the eighth semantic recognition result meets the second preset condition includes: A priority of the eighth semantic recognition result is higher than a priority of the first semantic recognition result.

Optionally, in an embodiment, that the priority of the eighth semantic recognition result is higher than the priority of the first semantic recognition result includes one or more of the following: A priority of a function indicated by the eighth semantic recognition result is higher than a priority of a function indicated by the first semantic recognition result; a priority of an intention indicated by the eighth semantic recognition result is higher than a priority of an intention indicated by the first semantic recognition result; and a priority of a parameter indicated by the eighth semantic recognition result is higher than a priority of a parameter indicated by the first semantic recognition result.

Optionally, in an embodiment, the processing unit 1102 is specifically configured to: when the first semantic recognition result does not meet the first preset condition, obtain the sixth semantic recognition result from the second apparatus, where the sixth semantic recognition result indicates the second operation; and determine, based on the sixth semantic recognition result, to perform the second operation. That the eighth semantic recognition result meets the second preset condition includes: A priority of the eighth semantic recognition result is higher than a priority of the sixth semantic recognition result.

Optionally, in an embodiment, that the priority of the eighth semantic recognition result is higher than the priority of the sixth semantic recognition result includes one or more of the following: A priority of a function indicated by the eighth semantic recognition result is higher than a priority of a function indicated by the sixth semantic recognition result; a priority of an intention indicated by the eighth semantic recognition result is higher than a priority of an intention indicated by the sixth semantic recognition result; and a priority of a parameter indicated by the eighth semantic recognition result is higher than a priority of a parameter indicated by the sixth semantic recognition result.

Optionally, in an embodiment, the second voice information is unrelated to the operation indicated by the first voice information.

Optionally, in an embodiment, the apparatus further includes a wake-up module, configured to: respond to an input operation of a user and perform a voice wake-up operation.

Figure 12:
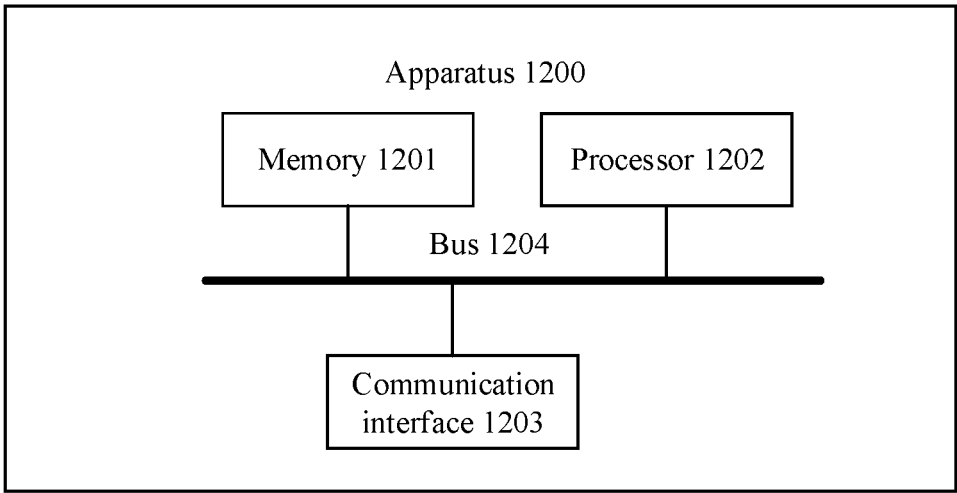
FIG. 12 is a schematic diagram of a structure of a voice interaction apparatus according to an embodiment of this application.

FIG. 12 is a schematic diagram of a structure of a voice interaction apparatus 1200 according to an embodiment of this application. The apparatus 1200 may include at least one processor 1202 and a communication interface 1203.

Optionally, the apparatus 1200 may further include one or more of a memory 1201 and a bus 1204. Any two or all three of the memory 1201, the processor 1202, and the communication interface 1203 may be communicatively connected to each other through the bus 1204.

Optionally, the memory 1201 may be a read-only memory (ROM), a static storage device, a dynamic storage device, or a random access memory (RAM). The memory 1201 may store a program. When the program stored in the memory 1201 is executed by the processor 1202, the processor 1202 and the communication interface 1203 are configured to perform the steps of the voice interaction method provided in embodiments of this application. In other words, the processor 1202 may obtain stored instructions from the memory 1201 through the communication interface 1203, to perform the steps of the voice interaction method provided in embodiments of this application.

Optionally, the memory 1201 may have a function of the memory 152 shown in FIG. 1, to implement the foregoing function of storing the program. Optionally, the processor 1202 may be a general-purpose central processing unit (CPU), a microprocessor, an application-specific integrated circuit (ASIC), a graphics processing unit (GPU), or one or more integrated circuits, and is configured to execute a related program, to implement a function that needs to be performed by a unit in the voice interaction apparatus provided in this embodiment of this application, or perform the steps of the voice interaction method provided in embodiments of this application.

Optionally, the processor 1202 may have a function of the processor 151 shown in FIG. 1, to implement the foregoing function of executing the related program.

Optionally, the processor 1202 may alternatively be an integrated circuit chip, and has a signal processing capability. In an implementation process, the steps of the voice interaction method provided in embodiments of this application may be completed by using a hardware integrated logic circuit in the processor or by using instructions in a form of software.

Optionally, the processor 1202 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps in the method disclosed with reference to embodiments of this application may be directly performed and completed by a hardware decoding processor, or may be performed and completed by using a combination of hardware in a decoding processor and a software module. The software module may be located in a mature storage medium in the art, for example, a random access memory, a flash memory, a read-only memory, a programmable read-only memory, an electrically erasable programmable memory, or a register. The storage medium is located in the memory. The processor reads information in the memory, and completes, in combination with hardware of the processor, the function that needs to be performed by the unit included in the voice interaction apparatus in embodiments of this application, or performs the steps of the voice interaction method provided in embodiments of this application.

Optionally, for example, the communication interface 1203 may be but is not limited to a transceiver apparatus, for example, a transceiver, to implement communication between the apparatus and another device or a communication network. For example, the communication interface 1203 may alternatively be an interface circuit.

The bus 1204 may include a path for transmitting information between the components (for example, the memory, the processor, and the communication interface) of the apparatus.

An embodiment of this application further provides a computer program product including instructions. When the instructions are executed by a computer, the computer is enabled to implement the voice interaction method provided in the foregoing method embodiments.

An embodiment of this application further provides a terminal device. The terminal device includes any one of the foregoing voice interaction apparatuses, for example, the voice interaction apparatus shown in FIG. 11 or FIG. 12.

For example, the terminal may be a vehicle. Alternatively, the terminal may be a terminal that performs remote control on a vehicle.

The foregoing voice interaction apparatus may be mounted on the vehicle, or may be independent of the vehicle. For example, the target vehicle may be controlled by using an uncrewed aerial vehicle, another vehicle, or a robot.

Unless otherwise defined, all technical and scientific terms used in this application have a same meaning as commonly understood by a person skilled in the art to which this application pertains. In this application, the terms used in the specification of this application are merely for the purpose of describing specific embodiments, and are not intended to limit this application.

Aspects or features of this application may be implemented as a method, an apparatus, or a product that uses standard programming and/or engineering technologies. The term "product" used in this application may cover a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive).

Various storage media described in this application may represent one or more devices and/or other machine-readable media that are configured to store information. The term "machine-readable media" may include but is not limited to a radio channel and various other media that can store, include, and/or carry instructions and/or data.

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should be further noted that the memory described in this application is intended to include but is not limited to these memories and any other memory of a suitable type.

Terms "component", "module", "system", and the like used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on a computing device may be components. One or more components may reside in a process and/or an execution thread, and the component may be located on one computer and/or distributed between two or more computers. In addition, these components may be executed from various computer-readable media that store various data structures. For example, the components may communicate by using a local and/or remote process and based on a signal having one or more data packets (for example, data from two components interacting with another component in a local system and/or a distributed system, and/or across a network, for example, the internet interacting with another system by using the signal).

A person of ordinary skill in the art may be aware that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to the conventional technology, or some of the technical solutions may be implemented in a form of a software product. The computer software product is stored in a storage medium, and includes a plurality of instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A voice interaction method, applied to a first apparatus, wherein the method comprises:

obtaining first voice information from a voice sensor;

determining a first semantic recognition result based on the first voice information; and determining, based on the first semantic recognition result and a first preset condition, to perform a first operation or a second operation, wherein the first operation is determined by the first apparatus based on the first semantic recognition result, and wherein the second operation is indicated by a second apparatus, wherein:

a plurality of functions are preset on the first apparatus, and the first preset condition comprises: the first semantic recognition result indicates a first function, and the first function belongs to the plurality of functions; or a plurality of intentions are preset on the first apparatus, and the first preset condition comprises: the first semantic recognition result indicates a first intention, and the first intention belongs to the plurality of intentions; or a plurality of parameters are preset on the first apparatus, and the first preset condition comprises: the first semantic recognition result indicates a first parameter, and the first parameter belongs to the plurality of parameters.

2. The method according to claim 1, wherein the determining to perform the first operation comprises:

in response to determining that the first semantic recognition result satisfies the first preset condition, determining to perform the first operation.

3. The method according to claim 2, wherein the method further comprises:

sending the first voice information to the second apparatus; and discarding a semantic recognition result from the second apparatus.

4. The method according to claim 1, wherein the first semantic recognition result indicates the first function and the first parameter, and the first preset condition comprises:

the first function and the first parameter correspond to a same parameter type.

5. The method according to claim 4, wherein the determining the first semantic recognition result based on the first voice information comprises:

determining a second semantic recognition result based on the first voice information, wherein the second semantic recognition result indicates a second function and the first parameter; and when the second function is absent from the plurality of functions preset on the first apparatus, and the plurality of parameters preset on the first apparatus comprise the first parameter, correcting the second function in the second semantic recognition result to the first function, to obtain the first semantic recognition result, wherein the first function and the second function are different functions of a same type.

6. The method according to claim 1, wherein the method further comprises:

obtaining second voice information from the voice sensor;

determining a third semantic recognition result based on the second voice information; and determining, based on the third semantic recognition result and a second preset condition, to perform an operation indicated by the first voice information, a third operation determined by the first apparatus based on the third semantic recognition result, or a fourth operation indicated by the second apparatus.

7. The method according to claim 6, wherein the determining to perform an operation indicated by the first voice information, a third operation determined by the first apparatus, or a fourth operation indicated by the second apparatus comprises:

when the third semantic recognition result satisfies the first preset condition and satisfies the second preset condition, determining to perform the third operation; or when the third semantic recognition result does not satisfies the first preset condition and satisfies the second preset condition, determining to perform the fourth operation; or when the third semantic recognition result does not satisfy the second preset condition, determining to perform the operation corresponding to the first semantic recognition result.

8. The method according to claim 7, wherein the determining to perform the second operation indicated by the second apparatus comprises:

when the first semantic recognition result does not satisfy the first preset condition, obtaining a semantic recognition result from the second apparatus, wherein the semantic recognition result indicates the second operation; and determining, based on the semantic recognition result, to perform the second operation; and wherein the second preset condition comprises:

a priority of the third semantic recognition result is higher than a priority of the semantic recognition result indicated by the second apparatus.

9. The method according to claim 1, wherein the method further comprises:

when the first preset condition is met, skipping or discarding a result fed back by the second apparatus based on the first voice information.

10. A voice interaction apparatus, comprising:

at least one processor configured to:

obtain first voice information from a voice sensor; and determine a first semantic recognition result based on the first voice information, wherein determine, based on the first semantic recognition result and a first preset condition, to perform a first operation or a second operation, wherein the first operation is determined by a first apparatus based on the first semantic recognition result, and wherein the second operation is indicated by a second apparatus, wherein:

a plurality of functions are preset on the first apparatus, and the first preset condition comprises: the first semantic recognition result indicates a first function, and the first function belongs to the plurality of functions; or a plurality of intentions are preset on the first apparatus, and the first preset condition comprises: the first semantic recognition result indicates a first intention, and the first intention belongs to the plurality of intentions; or a plurality of parameters are preset on the first apparatus, and the first preset condition comprises: the first semantic recognition result indicates a first parameter, and the first parameter belongs to the plurality of parameters.

11. The apparatus according to claim 10, wherein the at least one processor is further configured to:

in response to determine that the first semantic recognition result satisfies the first preset condition, determining to perform the first operation.

12. The apparatus according to claim 11, wherein the apparatus further comprises:

a transmitter configured to send the first voice information to the second apparatus; and the at least one processor is further configured to discard a semantic recognition result from the second apparatus.

13. The apparatus according to claim 10, wherein the first semantic recognition result indicates the first function and the first parameter, and the first preset condition comprises:

the first function and the first parameter correspond to a same parameter type.

14. The apparatus according to claim 13, wherein the at least one processor is further configured to:

determine a second semantic recognition result based on the first voice information, wherein the second semantic recognition result indicates a second function and the first parameter; and when the second function is absent from the plurality of functions preset on the first apparatus, and the plurality of parameters preset on the first apparatus comprise the first parameter, correct the second function in the second semantic recognition result to the first function, to obtain the first semantic recognition result, wherein the first function and the second function are different functions of a same type.

15. The apparatus according to claim 10, wherein the at least one processor is further configured to:

obtain second voice information from the voice sensor;

determine a third semantic recognition result based on the second voice information; and determine, based on the third semantic recognition result and a second preset condition, to perform an operation indicated by the first voice information, a third operation determined by the first apparatus based on the third semantic recognition result, or a fourth operation indicated by the second apparatus.

16. The apparatus according to claim 15, wherein the at least one processor is further configured to:

when the third semantic recognition result satisfies the first preset condition and satisfies the second preset condition, determine to perform the third operation; or when the third semantic recognition result does not satisfies the first preset condition and satisfies the second preset condition, determine to perform the fourth operation; or when the third semantic recognition result does not satisfy the second preset condition, determine to perform the operation corresponding to the first semantic recognition result.

17. The apparatus according to claim 16, wherein the at least one processor is further configured to:

when the first semantic recognition result does not satisfy the first preset condition, obtain a semantic recognition result from the second apparatus, wherein the semantic recognition result indicates the second operation; and determine, based on the semantic recognition result, to perform the second operation; and wherein the second preset condition comprises:

a priority of the third semantic recognition result is higher than a priority of the semantic recognition result indicated by the second apparatus.

18. The apparatus according to claim 17, wherein that the priority of the third semantic recognition result and the priority of the semantic recognition result indicated by the second apparatus are one or more of:

a priority of a function, a priority of an intention, or a priority of a parameter.

19. The apparatus according to claim 10, wherein the at least one processor is further configured to:

when the first preset condition is met, skip or discard a result fed back by the second apparatus based on the first voice information.

20. A non-transitory computer-readable medium, wherein the computer-readable medium stores program code for execution by a device to perform operations comprising:

obtaining first voice information from a voice sensor;

determining a first semantic recognition result based on the first voice information; and determining, based on the first semantic recognition result and a first preset condition, to perform a first operation or a second operation, wherein the first operation is determined by a first apparatus based on the first semantic recognition result, and wherein the second operation is indicated by a second apparatus, wherein:

a plurality of functions are preset on the first apparatus, and the first preset condition comprises: the first semantic recognition result indicates a first function, and the first function belongs to the plurality of functions; or a plurality of intentions are preset on the first apparatus, and the first preset condition comprises: the first semantic recognition result indicates a first intention, and the first intention belongs to the plurality of intentions; or a plurality of parameters are preset on the first apparatus, and the first preset condition comprises: the first semantic recognition result indicates a first parameter, and the first parameter belongs to the plurality of parameters.

* * * * *